US011076600B2

(12) United States Patent
Mazuir et al.

(10) Patent No.: US 11,076,600 B2
(45) Date of Patent: Aug. 3, 2021

(54) MIXTURES OF CIS-JASMONE AND BACILLUS AMYLOLIQUEFACIENS

(71) Applicant: BASF SE, Ludwigshafen (DE)

(72) Inventors: Florent Mazuir, Friedelsheim (DE); Shaun Berry, Morrisville, NC (US); Eda Reinot, Chapel Hill, NC (US); John Hofer, Cary, NC (US); Hendrik Ypema, Cary, NC (US)

(73) Assignee: BASF SE, Ludwigshafen (DE)

( * ) Notice: Subject to any disclaimer, the term of this patent is extended or adjusted under 35 U.S.C. 154(b) by 42 days.

(21) Appl. No.: 15/779,307

(22) PCT Filed: Nov. 28, 2016

(86) PCT No.: PCT/EP2016/078949
§ 371 (c)(1),
(2) Date: May 25, 2018

(87) PCT Pub. No.: WO2017/093163
PCT Pub. Date: Jun. 8, 2017

(65) Prior Publication Data
US 2018/0317498 A1 Nov. 8, 2018

Related U.S. Application Data

(60) Provisional application No. 62/260,673, filed on Nov. 30, 2015.

(30) Foreign Application Priority Data

Jan. 18, 2016 (EP) ..................................... 16151630

(51) Int. Cl.
*A01N 63/00* (2020.01)
*A01N 35/06* (2006.01)
*A01N 63/10* (2020.01)

(52) U.S. Cl.
CPC ............. *A01N 63/00* (2013.01); *A01N 35/06* (2013.01); *A01N 63/10* (2020.01); *Y02A 50/30* (2018.01)

(58) Field of Classification Search
CPC ................................ A01N 63/00; A01N 35/06
See application file for complete search history.

(56) References Cited

U.S. PATENT DOCUMENTS

| 5,665,344 A | 9/1997 | Pair et al. |
| 6,890,525 B2 | 5/2005 | Hick et al. |
| 2012/0149571 A1 | 6/2012 | Kloepper et al. |
| 2015/0289516 A1 | 10/2015 | Margolis et al. |
| 2016/0212995 A1 | 7/2016 | Cargeeg et al. |

FOREIGN PATENT DOCUMENTS

| EP | 2962568 | 1/2016 |
| WO | 2011117272 | 9/2011 |
| WO | WO-12/047608 A2 | 4/2012 |
| WO | 2014056780 | 4/2014 |
| WO | 2015177021 | 11/2015 |
| WO | 2015180983 | 12/2015 |
| WO | 2015180985 | 12/2015 |
| WO | 2015180987 | 12/2015 |
| WO | 2015180999 | 12/2015 |
| WO | 2015181008 | 12/2015 |
| WO | 2015181009 | 12/2015 |

OTHER PUBLICATIONS

Search Report, issued in EP Application No. 16151630.7, dated Mar. 15, 2016.
Kumar et al., "Plant Growth-Promoting Activities of Bacillus Subtilis MBI 600 (Integral®) and its Compatibility with commonly Used Fungicides in Rice Sheath Blight Management," International Journal of Microbiology Research, vol. 3, Issue 2, (2011), pp. 120-130.
International Search Report, issue in PCT/EP2016/078949, dated Jan. 17, 2017.
Edmonds, "Investigating Induced Resistance in Sugarcane," Masters Thesis, University of KwaZulu-Natal, 95 pages.
Joshi and Gardener, "Identification and Characterization of Novel Genetic Markers Associated with Biological ontrol Activities in Bacillus subtilis," Phytopathology, vol. 96, No. 2 (2006), pp. 145-154.
International Preliminary Report on Patentability, issued in PCT/EP2016/078949, dated Jun. 5, 2018.
Baldwin et al., "Effects of octadecanoid metabolites and inhibitors on induced nicotine accumulation in Nicotiana sylvestris", Journal of Chemical Ecology, vol. 22, Issue 1, Jan. 1996, pp. 61-74.
Colby, "Calculating Synergistic and Antagonistic Responses of Herbicide Combinations", Weeds, vol. 15, Issue 1, Jan. 1967, pp. 20-22.
Gullino et al., "Uses and challenges of novel compounds for plant disease control", Crop Protection, vol. 19, Issue 1, Feb. 2000, pp. 1-11.
Loughrin, et al., "Volatiles emitted by different cotton varieties damaged by feeding beet armyworm larvae", Journal of Chemical Ecology, vol. 21, Issue 8, Aug. 1995, pp. 1217-1227.

*Primary Examiner* — Heidi Reese
(74) *Attorney, Agent, or Firm* — Marshall, Gerstein & Borun LLP

(57) ABSTRACT

The invention relates to pesticidal mixtures of *Bacillus amyloliquefaciens* and cis-jasmone in synergistically effective amounts; methods of application of the pesticidal mixtures for controlling pests; and plant propagation material comprising the pesticidal mixtures.

15 Claims, No Drawings

MIXTURES OF CIS-JASMONE AND BACILLUS AMYLOLIQUEFACIENS

This application is a National Stage application of International Application No. PCT/EP2016/078949, filed Nov. 28, 2016, which claims the benefit of U.S. Provisional Application No. 62/260,673, filed Nov. 30, 2015. This application also claims priority under 35 U.S.C. § 119 to European Patent Application No. 16151630.7, filed Jan. 18, 2016.

DESCRIPTION

The invention relates to pesticidal mixtures of *Bacillus amyloliquefaciens* and cis-jasmone in synergistically effective amounts. In a preferred embodiment, the invention relates to pesticidal mixtures comprising, as active components, *Bacillus amyloliquefaciens* ssp. *plantarum* strain MBI600 (component A) and cis-jasmone (component B) in synergistically effective amounts.

It further relates to methods for controlling pests, which method comprises the application of the pesticidal mixtures to plants, plant propagation material, or the locus of growth of the plants; the pests or their food supply, habitat or breeding grounds. It also relates to plant propagation material comprising the pesticidal mixtures.

Invertebrate pests and in particular insects, arachnids and nematodes destroy growing and harvested crops, thereby causing large economic loss to the food supply and to property. Regulatory requirements, pesticide resistance, reduced application rates and toxicity, as well as an enhanced applicant safety are just a few of the innovation-driving issues that trigger the search for improved agrochemical products. Pesticidal mixtures are favorably used to combate pests, because they convey the benefit of a reduced induction of resistance, and an application range against a broader spectrum of pests. In case the pesticides act synergistically, the application rates can be reduced. Accordingly, there is an ongoing need for pesticidal mixtures for combating pests that address the above problems and objectives.

In this regard, it is noted that row crops selected from wheat, maize, barley, oat, rye, rice, soybean, cotton, sugar beet, rapeseed, and potato, which are of particular commercial importance, are highly vulnerable in terms of the attack or infestation by certain invertebrate pests and phytopathogenic harmful fungi. Relevant invertebrate pests for the above row crops include aphids, diptera, leafhopper, *thrips*, nematodes and whitefly. Consequently, a pesticidal mixture is required, which has pesticidal activity against the above listed pests. It is therefore an object of the present invention to provide pesticidal mixtures, which are suitable for protecting a plant selected from wheat, maize, barley, oat, rye, rice, soybean, cotton, sugar beet, rapeseed, and potato against the harmful effects of the above listed pests.

Furthermore, there is a desire for pesticidal mixtures that improve "plant health" as defined below. It is therefore another object of the invention to provide pesticidal mixtures, which are suitable for improving the plant health.

In connection with the above objects, it is emphasized that in certain situations, in particular seeds and plant roots and shoots are threatened by harmful pests. Accordingly, there is also an ongoing need for pesticidal mixtures and seed treatment compositions comprising said pesticidal mixtures, which are suitable for protecting the plant propagation material, in particular the seeds, and the plant roots and shoots of the plant from attack and infestation by harmful pests. It is particularly desired to provide pesticidal mixtures and seed treatment compositions, which not only have activity against pests in the soil, which threaten the seeds and the roots of the plant, but which also ensure protection against foliar pests, when applied to the seeds only, e.g. by seed dressing, seed coating, seed dusting, seed soaking or seed pelleting, in order to protect the shoots of the plant. It is therefore another object of the present invention to provide pesticidal mixtures and seed treatment compositions, which are suitable for protecting the plant propagation material, in particular the seeds and the roots and shoots of a plant, against the harmful effects of pests. In particular, it is an object to provide pesticidal mixtures and seed treatment compositions, which are suitable for protecting the shoots of a plant.

Pests that are particularly relevant to crop plants are nematodes, which are among the most harmful pests for the above crop plants. Because most of them live in the soil, they represent one of the most difficult pest problems to identify, demonstrate, and control. It has been estimated that about 10 percent of the world crop production is lost as a result of plant nematode damage (Whitehead, Plant nematode control, 1998). Economically relevant species are inter alia cereal cyst nematodes (*Heterodera* spp.), root lesion nematodes (*Pratylenchus* spp.), potato cyst nematode (*Globodera* sp.) root knot nematodes (*Meloidogyne* spp.), seed gall nematodes (*Anguina tritici*), and stem nematodes (*Ditylenchus* spp.). Typically, these nematodes infest the roots of the crop plant, or feed on plant propagation material, such as seed, which has been distributed.

Above problems and objectives were successfully addressed by pesticidal mixtures of *Bacillus amyloliquefaciens*, and cis-jasmone in synergistically effective amounts; and by methods of application of the pesticidal mixtures, in particular against nematodes. Advantages of the inventive subject-matter are a synergistic effect of the pesticidal mixtures, in particular against nematodes, a reduced application rate, higher selectivities for certain pests, a reduced toxicity for humans, and safer application and handling of the pesticidal mixtures. Furthermore, the pesticidal mixtures can be admixed to other pesticides in seed treatment compositions, such as insecticides, and/or fungicides, in order to either act synergistically, or to act against a broader range of pests.

WO 2015/177021 relates to mixtures comprising, as active components the *Bacillus* strains AP-136, AP-188, APP-218, AP-219, AP-295, AP-209 and/or AP-217 and a pesticide.

WO 2011/117272 relates to mixtures of cis-jasmone and to methods of using the mixtures in the field of agriculture. However, mixtures comprising cis-jasmone and strains from the genus *Bacillus* are not disclosed.

US 2015/289516 relates to the control of plant parasitic nematodes and a composition comprising *Bacillus amyloliquefaciens* strain FZB42 and at least one other nematicide in a synergiscitally effective amount. However, mixtures comprising cis-jasmone are not disclosed.

Cis-jasmone is a natural plant-derived organic product. Cis-jasmone (IUPAC name 1-methyl-3-methylene-2-[(Z)-pent-2-enyl]cyclopentene) is a commercially available compound of formula A:

A

[Chemical structure of cis-jasmone: a cyclopentenone with a methyl group on the ring and a pentenyl side chain]

Several plant-associated strains of the genus *Bacillus* have been described as belonging to the species *Bacillus amyloliquefaciens* or *Bacillus subtilis*. They are used commercially to promote the growth and improve the health of crop plants (Phytopathology 96, 145-154, 2006). Recently, the *Bacillus subtilis* strain MBI600 has been re-classified as *Bacillus amyloliquefaciens* ssp. *plantarum* MBI600 based on polyphasic testing which combines classical microbiological methods relying on a mixture of traditional tools (such as culture-based methods) and molecular tools (such as genotyping and fatty acids analysis). Thus, *Bacillus subtilis* MBI600 (or MBI 600 or MBI-600) is identical to *Bacillus amyloliquefaciens* ssp. *plantarum* MBI600, formerly *Bacillus subtilis* MBI600. For the purpose of this invention, *Bacillus subtilis* MBI600 shall mean *Bacillus amyloliquefaciens* ssp. *plantarum* MBI600, formerly *Bacillus subtilis* MBI600.

*Bacillus amyloliquefaciens* ssp. *plantarum* MBI600 (component A) is deposited with the American Type Culture Collection (ATCC) having the Safe Deposit Number SD-1414. In addition, it has the accession number NRRL B-50595 and is deposited with the United States Department of Agriculture on Nov. 10, 2011 under the strain designation *Bacillus subtilis* 1430. It has also been deposited at The National Collections of Industrial and Marine Bacteria Ltd. (NCIB), Torry Research Station, P.O. Box 31, 135 Abbey Road, Aberdeen, AB9 8DG, Scotland under accession number 1237 on Dec. 22, 1986.

MBI600 is known as plant growth-promoting rice seed treatment from Int. J. Microbiol. Res. ISSN 0975-5276, 3(2) (2011), 120-130 and further described e.g. in US 2012/0149571 A1. This strain MBI600 is commercially available as liquid formulation product Integral® (BASF Corp., USA).

The bacteria *Bacillus amyloliquefaciens* and/or *Bacillus subtilis* are naturally occurring spore-forming bacteria found e.g. in soils or on plant surfaces all over the world. The *Bacillus subtilis* strain MBI600 was isolated from a *faba* bean plant leaf surface growing at Nottingham University School of Agriculture, Sutton Bonington, United Kingdom. *Bacillus subtilis* MBI600 were cultivated using media and fermentation techniques known in the art, e.g. in Tryptic Soy Broth (TSB) at 27° C. for 24-72 hrs. The bacterial cells (vegatitive cells and spores) can be washed and concentrated (e.g. by centrifugation at room temperature for 15 min at 7000×g). To produce a dry formulation, bacterial cells, preferably spores were suspended in a suitable dry carrier (e.g. clay). To produce a liquid formulation, cells, preferably spores, were re-suspended in a suitable liquid carrier (e.g. water-based) to the desired spore density. The spore density number of spores per mL was determined by identifying the number of heat-resistant colony-forming units (70° C. for 10 min) on Trypticase Soy Agar after incubation for 18-24 hrs at 37° C.

*Bacillus subtilis* MBI600 is active in temperatures between 7° C. and 52° C. (Holtmann, G. & Bremer, E. (2004), J. Bacteriol. 186, 1683-1693).

The species *Bacillus amyloliquefaciens*, before 1987 known as a subspecies of *Bacillus subtilis*, comprises several subspecies that are commercially available or accessible as follows: *Bacillus amyloliquefaciens* strain AP-188 (NRRL O-50615 and O-50331; U.S. Pat. No. 8,445,255); *B. amyloliquefaciens* ssp. *plantarum* D747 isolated from air in Kikugawa-shi, Japan (US20130236522 A1; FERM BP-8234; e.g. Double Nickel™ 55 WDG from Certis LLC, USA), B. *amyloliquefaciens* ssp. *plantarum* FZB24 isolated from soil in Brandenburg, Germany (also called SB3615; DSM 96-2; J. Plant Dis. Prot. 105, 181-197, 1998; e.g. Taegro® from Novozyme Biologicals, Inc., USA), *B. amyloliquefaciens* ssp. *plantarum* FZB42 isolated from soil in Brandenburg, Germany (DSM 23117; J. Plant Dis. Prot. 105, 181-197, 1998; e.g. RhizoVital® 42 from AbiTEP GmbH, Germany), *B. amyloliquefaciens* ssp. *plantarum* strain MBI600 isolated from *faba* bean in Sutton Bonington, Nottinghamshire, U.K. at least before 1988 (obtainable at the American Type Culture Collection (ATCC) having the Safe Deposit Number SD-1414; also called 1430; NRRL O-50595; US 2012/0149571 A1; e.g. Integral® from BASF Corp., USA), *B. amyloliquefaciens* ssp. *plantarum* QST-713 isolated from peach orchard in 1995 in California, U.S.A. (NRRL O-21661; e.g. Serenade® MAX from Bayer Crop Science LP, USA), *B. amyloliquefaciens* ssp. *plantarum* TJ1000 isolated in 1992 in South Dakoda, U.S.A. (also called 1BE; ATCC BAN-390; CA 2471555 A1; e.g. Quick-Roots™ from TJ Technologies, Watertown, S. Dak., USA), *B. subtilis* FB17 also called UD 1022 or UD10-22 isolated from red beet roots in North America (ATCC PTA-11857; System. Appl. Microbiol. 27, 372-379, 2004; US 2010/0260735; WO 2011/109395).

A combination of different embodiments is also within the scope of the invention.

In one embodiment, the *B. amyloliquefaciens* is *Bacillus amyloliquefaciens* strain AP-188. In another embodiment, the *B. amyloliquefaciens* is *Bacillus amyloliquefaciens* ssp. *plantarum* D747. In another embodiment, the *B. amyloliquefaciens* is *B. amyloliquefaciens* ssp. *plantarum* FZB24. In another embodiment, the *B. amyloliquefaciens* is *B. amyloliquefaciens* ssp. *plantarum* FZB42.

In another embodiment, the *Bacillus amyloliquefaciens* is *Bacillus amyloliquefaciens* ssp. *plantarum* MBI600.

In another embodiment, the *B. amyloliquefaciens* is *B. amyloliquefaciens* ssp. *plantarum* QST-713. In another embodiment, the *B. amyloliquefaciens* is *B. amyloliquefaciens* ssp. *plantarum* TJ1000. In another embodiment, the *B. amyloliquefaciens* relates to mixtures of the above Bacilli *amyloliquefaciens*.

Said pesticidal mixtures are referred to as pesticidal mixtures 1-1 to 1-8, comprising each Cis-jasmone and a *Bacillus amyloliquefaciens* in accordance with the corresponding row of Table A.

TABLE A

| Pesticidal mixture | *Bacillus amyloliquefaciens* |
|---|---|
| I-1 | *Bacillus amyloliquefaciens* strain AP-188 |
| I-2 | *Bacillus amyloliquefaciens* ssp. *plantarum* D747 |
| I-3 | *Bacillus amyloliquefaciens* relates to *B. amyloliquefaciens* ssp. *plantarum* FZB24 |
| I-4 | *Bacillus amyloliquefaciens* relates to *B. amyloliquefaciens* ssp. *plantarum* FZB42 |
| I-5 | *Bacillus amyloliquefaciens* relates to *B. amyloliquefaciens* ssp. *plantarum* MBI600 |

TABLE A-continued

| Pesticidal mixture | Bacillus amyloliquefaciens |
|---|---|
| I-6 | Bacillus amyloliquefaciens relates to B. amyloliquefaciens ssp. plantarum QST-713 |
| I-7 | Bacillus amyloliquefaciens relates to B. amyloliquefaciens ssp. plantarum TJ1000 |
| I-8 | Mixtures of the above Bacilli amyloliquefaciens |

The most preferred pesticidal mixture according to the invention is I-5 comprising, as active components, *Bacillus amyloliquefaciens* ssp. *plantarum* strain MBI600 (component A) and cis-jasmone (component B).

The term *Bacillus amyloliquefaciens* comprises the species *Bacillus amyloliquefaciens* (including all subspecies, strains, and mutants thereof), and related bacteria within the genus *Bacillus*—e.g. species, subspecies, strains, and mutants thereof —which have a genomic sequence that has at least 60%, preferably at least 80%, more preferably at least 85%, especially preferably at least 95%, and in particular at least 99% sequence identity to the genome sequence of *Bacillus amyloliquefacienes* (e.g. to one of the strains in Table A). Sequence identity refers to the percentage of same bases of aligned DNA sequences. A suitable informatic tools to determine the sequence identity of genomes is Wise2DBA offered by EMBL. In one embodiment, *Bacillus amyloliquefaciens* only relates to the species *B. amyloliquefaciens*, and all subspecies, strains, and mutants thereof. In another embodiment, *Bacillus amyloliquefaciens* relates to the species *B. amyloliquefaciens*, to all subspecies, strains, and mutants thereof, as well as to related bacteria within the genus *Bacillus*, which have a genome sequence identity of at least 85%, preferably at least 95%, and most preferably at least 99%

In one embodiment, mutants relate to bacteria that have at least 1 single nucleotide exchange, deletion, or insertion, preferably at least 5, and in particular at least 10. In another embodiment, mutants relate to transgenic bacteria. Transgenic bacteria carry at least one gene of a different species, or a derivative thereof (e.g. a truncation, fusion, or mutation). Such mutants may be obtained by treatment with a chemical, such as N-methyl-N'-nitro-N-nitrosoguanidine, ethylmethanesulfone, or by irradiation using gamma, x-ray, or UV-irradiation, or by other means well known to those skilled in the art. Mutants may also be obtained by selecting spontaneous mutants (such as phage resistant mutants) from a population of cells.

The microorganisms and particular strains described herein, unless specifically noted otherwise, are all separated from nature and grown under artificial conditions, such as in cultures or through scaled-up manufacturing processes, such as fermentation, described herein. According to one embodiment of the present invention the term *Bacillus amyloliquefaciens* does not only relate to the isolated, pure cultures of the respective microorganisms, but also their suspensions in a whole broth culture; or a metabolite-containing supernatant or a purified metabolite obtained from whole broth culture of the strain. Whole broth culture refers to a liquid culture containing both cells and media. Supernatant refers to the liquid broth remaining when cells grown in broth are removed by centrifugation, filtration, sedimentation, or other means well known in the art.

Compositions of the present invention can be obtained by culturing *Bacillus amyloliquefaciens* according to methods well known in the art. Conventional large-scale microbial culture processes include submerged fermentation, solid state fermentation, or liquid surface culture. Towards the end of fermentation, as nutrients are depleted, *Bacillus* cells begin the transition from growth phase to sporulation phase, such that the final product of fermentation is largely spores, metabolites and residual fermentation medium. Fermentation is configured to obtain high levels of colony forming units of *Bacillus* and to promote sporulation. The bacterial cells, spores and metabolites in culture media resulting from fermentation may be used directly or concentrated by centrifugation, tangential-flow filtration, depth filtration, and evaporation. In some embodiments, the concentrated fermentation broth is washed, for example, via a diafiltration process, to remove residual fermentation broth and metabolites. The fermentation broth or broth concentrate can also be dried with or without the addition of carriers using conventional drying processes or methods such as spray drying, freeze drying, tray drying, fluidized-bed drying, drum drying, or evaporation. Fermentation broth, broth concentrate, and dry products are all referred to herein as fermentation products. Pesticidal mixtures of the present invention may include fermentation products of *Bacillus amyloliquefaciens*. *Bacillus amyloliquefaciens* may also relate to a metabolite produced by the respective strain that exhibits pesticidal activity.

The term "in synergistically effective amounts" relates to a range of ratios of *Bacillus amyloliquefaciens* and cis-jasmone in which both compounds act synergistically in combating pests. One way to measure the synergistic effect is by comparing the effect of the single compounds with the combined effect of the mixed compounds according to the Colby formula given below.

In one embodiment, the pesticidal mixtures comprise, as active components, *Bacillus amyloliquefaciens* ssp. *plantarum* strain MBI600 and cis-jasmone in synergistically effective amounts.

In another embodiment, the pesticidal mixture consists of, as active components, *Bacillus amyloliquefaciens* ssp. *plantarum* strain MBI600 and cis-jasmone in synergistically effective amounts.

Typically, the ratio of *Bacillus amyloliquefaciens* to cis-jasmone is from $10^{18}$ CFU:1 g to $10^4$ CFU:1 g. In one embodiment, the ratio of *Bacillus amyloliquefaciens* to cis-jasmone is from $10^{16}$ CFU:1 g to $10^5$ CFU:1 g. In another embodiment, the ratio of *Bacillus amyloliquefaciens* to cis-jasmone is from $10^{15}$ CFU:1 g to $10^8$ CFU:1 g. In yet another embodiment, the ratio of *Bacillus amyloliquefaciens* to cis-jasmone is from $10^{13}$ CFU:1 g to $10^9$ CFU:1 g. In yet another embodiment, the ratio of *Bacillus amyloliquefaciens* to cis-jasmone is from $10^{13}$ CFU:1 g to $10^{10}$ CFU:1 g. In yet another embodiment, the ratio of *Bacillus amyloliquefaciens* to cis-jasmone is from $5*10^{12}$ CFU:1 g to $10^{10}$ CFU:1 g. In yet another embodiment, the ratio of *Bacillus amyloliquefaciens* to cis-jasmone is $10^{11}$ CFU:1 g. Colony forming unit (CFU) is measure of viable microbial cells, in particular fungal and bacterial cells.

In one embodiment, the ratio of *Bacillus amyloliquefaciens* ssp. *plantarum* strain MBI600 to cis-jasmone is from $10^{15}$ CFU:1 g to $10^8$ CFU: 1 g.

The ratio of *Bacillus amyloliquefaciens* to cis-jasmone can also be expressed as a weight ratio. The total weight ratios can be determined using the amount of CFU of *Bacillus amyloliquefaciens* to calculate the total weight of the respective active component with the following equation that $1 \times 10^{10}$ CFU equals one gram of total weight of the respective active component. Thus, the weight ratio of *Bacillus amyloliquefaciens* to cis-jasmone is usually from $10^8$:1 to 1:$10^6$. In one embodiment, the weight ratio of

*Bacillus amyloliquefaciens* to cis-jasmone is from $10^6$:10 to 1:100,000. In yet another embodiment, the ratio of *Bacillus amyloliquefaciens* to cis-jasmone is from 100,000:1 to 1:100. In yet another embodiment, the ratio of *Bacillus amyloliquefaciens* to cis-jasmone is from 1000:1 to 1:10. In yet another embodiment, the ratio of *Bacillus amyloliquefaciens* to cis-jasmone is from 1000:1 to 1:1. In yet another embodiment, the ratio of *Bacillus amyloliquefaciens* to cis-jasmone is from 500:1 to 1:1.

The pesticidal mixtures and/or compositions may also contain a component C. In another embodiment, the pesticidal mixtures and/or compositions comprise at least one component C. Component C may be selected from insecticides, nematicides, and acaricides, fungicides, herbicides, plant growth regulators, and the like. Preferred components C are insecticides, nematicides and fungicides. The admixture of a component C to the pesticidal mixtures may also result in a synergistic effect of component C with either *Bacillus amyloliquefaciens*, or cis-jasmone, or with both *Bacillus amyloliquefaciens* and cis-jasmone. A further advantage is a broader application range, lower application rates, and higher selectivity. Pesticidal mixtures comprising component C are advantageously used in the application methods, and are also preferably comprised in the plant propagation material of the instant invention. Combinations of more than one component C are also suitable.

The following list M of pesticides, grouped and numbered according the Mode of Action Classification of the Insecticide Resistance Action Committee (IRAC), together with which the pesticidal mixtures of the present invention can be used and with which potential synergistic effects might be produced, is intended to illustrate the possible combinations, but not to impose any limitation.

M.1 Acetylcholine esterase (AChE) inhibitors from the class of: M.1A carbamates, for example aldicarb, alanycarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, trimethacarb, XMC, xylylcarb and triazamate; or from the class of M.1B organophosphates, for example acephate, azamethiphos, azinphos-ethyl, azinphos-methyl, cadusafos, chlorethoxyfos, chlorfenvinphos, chlormephos, chlorpyrifos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothio-phosphoryl) salicylate, isoxathion, malathion, mecarbam, methamidophos, methidathion, mevinphos, monocrotophos, naled, omethoate, oxydemeton-methyl, parathion, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon and vamidothion;

M.2. GABN-gated chloride channel antagonists such as: M.2A cyclodiene organochlorine compounds, as for example endosulfan or chlordane; or M.2B fiproles (phenylpyrazoles), as for example ethiprole, fipronil, flufiprole, pyrafluprole and pyriprole;

M.3 Sodium channel modulators from the class of M.3A pyrethroids, for example acrinathrin, allethrin, d-cis-trans allethrin, d-trans allethrin, bifenthrin, bioallethrin, bioallethrin S-cylclopentenyl, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin, deltamethrin, empenthrin, esfenvalerate, etofenprox, fenpropathrin, fenvalerate, flucythrinate, flumethrin, tau-fluvalinate, halfenprox, heptafluthrin, imiprothrin, meperfluthrin, metofluthrin, momfluorothrin, permethrin, phenothrin, prallethrin, profluthrin, pyrethrin (pyrethrum), resmethrin, silafluofen, tefluthrin, tetramethylfluthrin, tetramethrin, tralomethrin and transfluthrin; or M.3B sodium channel modulators such as DDT or methoxychlor;

M.4 Nicotinic acetylcholine receptor agonists (nAChR) from the class of M.4A neonicotinoids, for example acetamiprid, clothianidin, cycloxaprid, dinotefuran, imidacloprid, nitenpyram, thiacloprid and thiamethoxam; or the compounds M.4A.2: (2E+1-[(6-Chloropyridin-3-yl)methyl]-N'-nitro-2-pentylidenehydrazinecarboximidamide; or M4.A.3: 1-[(6-Chloropyridin-3-yl)methyl]-7-methyl-8-nitro-5-propoxy-1,2,3,5,6,7-hexahydroimidazo[1,2-a]pyridine; or from the class M.4B nicotine;

M.5 Nicotinic acetylcholine receptor allosteric activators from the class of spinosyns, for example spinosad or spinetoram;

M.6 Chloride channel activators from the class of avermectins and milbemycins, for example abamectin, emamectin benzoate, ivermectin, lepimectin or milbemectin;

M.7 Juvenile hormone mimics, such as M.7A juvenile hormone analogues as hydroprene, kinoprene and methoprene; or others as M.7B fenoxycarb or M.7C pyriproxyfen;

M.8 miscellaneous non-specific (multi-site) inhibitors, for example M.8A alkyl halides as methyl bromide and other alkyl halides, or M.8B chloropicrin, or M.8C sulfuryl fluoride, or M.8D borax, or M.8E tartar emetic;

M.9 Selective homopteran feeding blockers, for example M.9B pymetrozine, or M.9C flonicamid;

M.10 Mite growth inhibitors, for example M.10A clofentezine, hexythiazox and diflovidazin, or M.10B etoxazole;

M.11 Microbial disruptors of insect midgut membranes, for example *Bacillus thuringiensis* or *Bacillus sphaericus* and the insecticidal proteins they produce such as *Bacillus thuringiensis* subsp. *israelensis*, *Bacillus sphaericus*, *Bacillus thuringiensis* subsp. *aizawai*, *Bacillus thuringiensis* subsp. *kurstaki* and *Bacillus thuringiensis* subsp. *tenebrionis*, or the Bt crop proteins: Cry1Ab, Cry1Ac, Cry1Fa, Cry2Ab, mCry3A, Cry3Ab, Cry3Bb and Cry34/35Ab1;

M.12 Inhibitors of mitochondrial ATP synthase, for example M.12A diafenthiuron, or M.12B organotin miticides such as azocyclotin, cyhexatin or fenbutatin oxide, or M.12C propargite, or M.12D tetradifon;

M.13 Uncouplers of oxidative phosphorylation via disruption of the proton gradient, for example chlorfenapyr, DNOC or sulfluramid;

M.14 Nicotinic acetylcholine receptor (nAChR) channel blockers, for example nereistoxin analogues as bensultap, cartap hydrochloride, thiocyclam or thiosultap sodium;

M.15 Inhibitors of the chitin biosynthesis type 0, such as benzoylureas as for example bistrifluron, chlorfluazuron, diflubenzuron, flucycloxuron, flufenoxuron, hexaflumuron, lufenuron, novaluron, noviflumuron, teflubenzuron or triflumuron;

M.16 Inhibitors of the chitin biosynthesis type 1, as for example buprofezin;

M.17 Moulting disruptors, Dipteran, as for example cyromazine;

M.18 Ecdyson receptor agonists such as diacylhydrazines, for example methoxyfenozide, tebufenozide, halofenozide, fufenozide or chromafenozide;

M.19 Octopamin receptor agonists, as for example amitraz;

M.20 Mitochondrial complex III electron transport inhibitors, for example M.20A hydramethylnon, or M.206 acequinocyl, or M.20C fluacrypyrim;

M.21 Mitochondrial complex I electron transport inhibitors, for example M.21A METI acaricides and insecticides such as fenazaquin, fenpyroximate, pyrimidifen, pyridaben, tebufenpyrad or tolfenpyrad, or M.216 rotenone;

M.22 Voltage-dependent sodium channel blockers, for example M.22A indoxacarb, or M.226 metaflumizone, or M.226.1: 2-[2-(4-Cyanophenyl)-1-[3-(trifluoromethyl)phenyl]ethylidene]-N-[4-(difluoromethoxy)phenyl]-hydrazinecarboxamide or M.226.2: N-(3-Chloro-2-methylphenyl)-2-[(4-chlorophenyl)[4-[methyl(methylsulfonyl)amino]phenyl]methylene]-hydrazinecarboxamide;

M.23 Inhibitors of the of acetyl CoA carboxylase, such as Tetronic and Tetramic acid derivatives, for example spirodiclofen, spiromesifen or spirotetramat;

M.24 Mitochondrial complex IV electron transport inhibitors, for example M.24A phosphine such as aluminium phosphide, calcium phosphide, phosphine or zinc phosphide, or M.246 cyanide;

M.25 Mitochondrial complex II electron transport inhibitors, such as beta-ketonitrile derivatives, for example cyenopyrafen or cyflumetofen;

M.28 Ryanodine receptor-modulators from the class of diamides, as for example flubendiamide, chlorantraniliprole (Rynaxypyr®), cyantraniliprole (Cyazypyr®), tetraniliprole, or the phthalamide compounds M.28.1: (R)-3-Chlor-N1-{2-methyl-4-[1,2,2,2-tetrafluor-1-(trifluormethyl)ethyl]phenyl}-N2-(1-methyl-2-methylsulfonylethyl)phthalamid and M.28.2: (S)-3-Chlor-N1-{2-methyl-4-[1,2,2,2-tetrafluor-1-(trifluormethyl)ethyl]phenyl}-N2-(1-methyl-2-methylsulfonyl-ethyl)phthalamid, or the compound M.28.3: 3-bromo-N-{2-bromo-4-chloro-6-[(1-cyclopropylethyl)carbamoyl]phenyl}-1-(3-chlorpyridin-2-yl)-1H-pyrazole-5-carboxamide (proposed ISO name: cyclaniliprole), or the compound M.28.4: methyl-2-[3,5-dibromo-2-({[3-bromo-1-(3-chlorpyridin-2-yl)-1H-pyrazol-5-yl]carbonyl}amino)benzoyl]-1,2-dimethylhydrazinecarboxylate; or a compound selected from M.28.5a) to M.28.5d) and M.28.5h) to M.28.5l): M.28.5a) N-[4,6-dichloro-2-[(diethyl-lambda-4-sulfanylidene)carbamoyl]-phenyl]-2-(3-chloro-2-pyridyl)-5-(trifluoromethyl)pyrazole-3-carboxamide; M.28.5b) N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide; M.28.5c) N-[4-chloro-2-[(di-propyl-lambda-4-sulfanylidene)carbamoyl]-6-methyl-phenyl]-2-(3-chloro-2-pyridyl)-5-(trifluoromethyl)pyrazole-3-carboxamide; M.28.5d) N-[4,6-dichloro-2-[(di-2-propyl-lambda-4-sulfanylidene)carbamoyl]-phenyl]-2-(3-chloro-2-pyridyl)-5-(trifluoromethyl)pyrazole-3-carboxamide; M.28.5h) N-[4,6-dibromo-2-[(diethyl-lambda-4-sulfanylidene)carbamoyl]-phenyl]-2-(3-chloro-2-pyridyl)-5-(trifluoromethyl)pyrazole-3-carboxamide; M.28.5i) N-[2-(5-Amino-1,3,4-thiadiazol-2-yl)-4-chloro-6-methylphenyl]-3-bromo-1-(3-chloro-2-pyridinyl)-1H-pyrazole-5-carboxamide; M.28.5j) 3-Chloro-1-(3-chloro-2-pyridinyl)-N-[2,4-dichloro-6-[[(1-cyano-1-methylethyl)amino]carbonyl]phenyl]-1H-pyrazole-5-carboxamide; M.28.5k) 3-Bromo-N-[2,4-dichloro-6-(methylcarbamoyl)phenyl]-1-(3,5-dichloro-2-pyridyl)-1H-pyrazole-5-carboxamide; M.28.5l) N-[4-Chloro-2-[[(1,1-dimethylethyl)amino]carbonyl]-6-methylphenyl]-1-(3-chloro-2-pyridinyl)-3-(fluoromethoxy)-1H-pyrazole-5-carboxamide; or M.28.6: cyhalodiamide; or;

M.29. insecticidal active compounds of unknown or uncertain mode of action, as for example afidopyropen, afoxolaner, azadirachtin, amidoflumet, benzoximate, bifenazate, broflanilide, bromopropylate, chinomethionat, cryolite, dicloromezotiaz, dicofol, flufenerim, flometoquin, fluensulfone, fluhexafon, fluopyram, flupyradifurone, fluralaner, metoxadiazone, piperonyl butoxide, pyflubumide, pyridalyl, pyrifluquinazon, sulfoxaflor, tioxazafen, triflumezopyrim, or the compounds M.29.3: 11-(4-chloro-2,6-dimethylphenyl)-12-hydroxy-1,4-dioxa-9-azadispiro[4.2.4.2]-tetradec-11-en-10-one, or the compound M.29.4: 3-(4'-fluoro-2,4-dimethylbiphenyl-3-yl)-4-hydroxy-8-oxa-1-azaspiro[4.5]dec-3-en-2-one, or the compound M.29.5: 1-[2-fluoro-4-methyl-5-[(2,2,2-trifluoroethyl)sulfinyl]phenyl]-3-(trifluoromethyl)-1H-1,2,4-triazole-5-amine, or actives on basis of *bacillus firmus* (Votivo, I-1582); or a compound selected from the group of M.29.6, wherein the compound is selected from M.29.6a) to M.29.6k): M.29.6a) (E/Z)—N-[1-[(6-chloro-3-pyridyl)methyl]-2-pyridylidene]-2,2,2-trifluoro-acetamide; M.29.6b) (E/Z)—N-[1-[(6-chloro-5-fluoro-3-pyridyl)methyl]-2-pyridylidene]-2,2,2-trifluoro-acetamide; M.29.6c) (E/Z)-2,2,2-trifluoro-N-[1-[(6-fluoro-3-pyridyl)methyl]-2-pyridylidene]acetamide; M.29.6d) (E/Z)—N-[1-[(6-bromo-3-pyridyl)methyl]-2-pyridylidene]-2,2,2-trifluoro-acetamide; M.29.6e) (E/Z)—N-[1-[1-(6-chloro-3-pyridyl)ethyl]-2-pyridylidene]-2,2,2-trifluoro-acetamide; M.29.6f) (E/Z)—N-[1-[(6-chloro-3-pyridyl)methyl]-2-pyridylidene]-2,2-difluoro-acetamide; M.29.6g) (E/Z)-2-chloro-N-[1-[(6-chloro-3-pyridyl)methyl]-2-pyridylidene]-2,2-difluoro-acetamide; M.29.6h) (E/Z)—N-[1-[(2-chloropyrimidin-5-yl)methyl]-2-pyridylidene]-2,2,2-trifluoro-acetamide; M.29.6i) (E/Z)—N-[1-[(6-chloro-3-pyridyl)methyl]-2-pyridylidene]-2,2,3,3,3-pentafluoro-propanamide.); M.29.6j) N-[1-[(6-chloro-3-pyridyl)methyl]-2-pyridylidene]-2,2,2-trifluoro-thioacetamide; or M.29.6k) N-[1-[(6-chloro-3-pyridyl)methyl]-2-pyridylidene]-2,2,2-trifluoro-M-isopropyl-acetamidine; or the compounds M.29.8: fluazaindolizine; or the compounds M.29.9.a): 4-[5-(3,5-dichlorophenyl)-5-(trifluoromethyl)-4H-isoxazol-3-yl]-2-methyl-N-(1-oxothietan-3-yl)benzamide; or M.29.9.b): fluxametamide; or M.29.10: 5-[3-[2,6-dichloro-4-(3,3-dichloroallyloxy)phenoxy]propoxy]-1H-pyrazole; or a compound selected from the group of M.29.11, wherein the compound is selected from M.29.11.b) to M.29.11p): M.29.11.b) 3-(benzoylmethylamino)-N-[2-bromo-4-[1,2,2,3,3,3-hexafluoro-1-(trifluoromethyl)propyl]-6-(trifluoromethyl)phenyl]-2-fluoro-benzamide; M.29.11.c) 3-(benzoylmethylamino)-2-fluoro-N-[2-iodo-4-[1,2,2,2-tetrafluoro-1-(trifluoromethyl)ethyl]-6-(trifluoromethyl)phenyl]-benzamide; M.29.11.d) N-[3-[[[2-iodo-4-[1,2,2,2-tetrafluoro-1-(trifluoromethyl)ethyl]-6-(trifluoromethyl)phenyl]amino]carbonyl]phenyl]-N-methyl-benzamide;

M.29.11.e) N-[[[3-[[[2-bromo-4-[1,2,2,2-tetrafluoro-1-(trifluoromethyl)ethyl]-6-(trifluoromethyl)phenyl]amino]carbonyl]-2-fluorophenyl]-4-fluoro-N-methyl-benzamide;

M.29.11.f) 4-fluoro-N-[2-fluoro-3-[[[2-iodo-4-[1,2,2,2-tetrafluoro-1-(trifluoromethyl)ethyl]-6-(trifluoromethyl)phenyl]amino]carbonyl]phenyl]-N-methyl-benzamide;

M.29.11.g) 3-fluoro-N-[2-fluoro-3-[[[2-iodo-4-[1,2,2,2-tetrafluoro-1-(trifluoromethyl)ethyl]-6-(trifluoromethyl)phenyl]amino]carbonyl]phenyl]-N-methyl-benzamide;

M.29.11.h) 2-chloro-N-[3-[[[2-iodo-4-[1,2,2,2-tetrafluoro-1-(trifluoromethyl)ethyl]-6-(trifluoromethyl)phenyl]amino]carbonyl]phenyl]-3-pyridinecarboxamide; M.29.11.i) 4-cyano-N-[2-cyano-5-[[2,6-dibromo-4-[1,2,2,3,3,3-hexafluoro-1-(trifluoromethyl)-propyl]phenyl]carbamoyl]phenyl]-2-methyl-benzamide; M.29.11.j) 4-cyano-3-[(4-cyano-2-methyl-benzoyl)amino]-N-[2,6-dichloro-4-[1,2,2,3,3,3-hexafluoro-1-(trifluoromethyl)propyl]phenyl]-2-fluoro-benzamide; M.29.11.k) N-[5-[[2-chloro-6-cyano-4-[1,2,2,3,3,3-hexafluoro-1-(trifluoromethyl)propyl]phenyl]carbamoyl]-2-cyano-phenyl]-4-cyano-2-methyl-benzamide;

M.29.11.l) N-[5-[[2-bromo-6-chloro-4-[2,2,2-trifluoro-1-hydroxy-1-(trifluoromethyl)ethyl]phenyl]carbamoyl]-2-cyano-phenyl]-4-cyano-2-methyl-benzamide;

M.29.11.m) N-[5-[[2-bromo-6-chloro-4-[1,2,2,3,3,3-hexafluoro-1-(trifluoromethyl)-propyl]phenyl]carbamoyl]-2-cyano-phenyl]-4-cyano-2-methyl-benzamide; M.29.11.n) 4-cyano-N-[2-cyano-5-[[2,6-dichloro-4-[1,2,2,3,3,3-hexafluoro-1-(trifluoromethyl)-propyl]phenyl]carbamoyl]phenyl]-2-methyl-benzamide; M.29.11.o) 4-cyano-N-[2-cyano-5-[[2,6-dichloro-4-[1,2,2,2-tetrafluoro-1-(trifluoromethyl)ethyl]phenyl]carbamoyl]phenyl]-2-methyl-benzamide; M.29.11.p) N-[5-[[2-bromo-6-chloro-4-[1,2,2,2-tetrafluoro-1-(trifluoromethyl)ethyl]phenyl]carbamoyl]-2-cyano-phenyl]-4-cyano-2-methyl-benzamide; or a compound selected from the group of M.29.12, wherein the compound is selected from M.29.12a) to M.29.12m): M.29.12.a) 2-(1,3-Dioxan-2-yl)-6-[2-(3-pyridinyl)-5-thiazolyl]-pyridine;

M.29.12.b) 2-[6-[2-(5-Fluoro-3-pyridinyl)-5-thiazolyl]-2-pyridinyl]-pyrimidine; M.29.12.c) 2-[6-[2-(3-Pyridinyl)-5-thiazolyl]-2-pyridinyl]-pyrimidine; M.29.12.d) N-Methylsulfonyl-6-[2-(3-pyridyl)thiazol-5-yl]pyridine-2-carboxamide; M.29.12.e) N-Methylsulfonyl-6-[2-(3-pyridyl)thiazol-5-yl]pyridine-2-carboxamide; M.29.12.f) N-Ethyl-N-[4-methyl-2-(3-pyridyl)thiazol-5-yl]-3-methylthio-propanamide; M.29.12.g) N-Methyl-N-[4-methyl-2-(3-pyridyl)thiazol-5-yl]-3-methylthio-propanamide; 
M.29.12.h) N,2-Dimethyl-N-[4-methyl-2-(3-pyridyl)thiazol-5-yl]-3-methylthio-propanamide; M.29.12.i) N-Ethyl-2-methyl-N-[4-methyl-2-(3-pyridyl)thiazol-5-yl]-3-methylthio-propanamide; M.29.12.j) N-[4-Chloro-2-(3-pyridyl)thiazol-5-yl]-N-ethyl-2-methyl-3-methylthio-propanamide; M.29.12.k) N-[4-Chloro-2-(3-pyridyl)thiazol-5-yl]-N,2-dimethyl-3-methylthio-propanamide; M.29.12.l) N-[4-Chloro-2-(3-pyridyl)thiazol-5-yl]-N-methyl-3-methylthio-propanamide; M.29.12.m) N-[4-Chloro-2-(3-pyridyl)thiazol-5-yl]-N-ethyl-3-methylthio-propanamide; or the compounds M.29.14a) 1-[(6-Chloro-3-pyridinyl)methyl]-1,2,3,5,6,7-hexahydro-5-methoxy-7-methyl-8-nitro-imidazo[1,2-a]pyridine; or M.29.14b) 1-[(6-Chloropyridin-3-yl)methyl]-7-methyl-8-nitro-1,2,3,5,6,7-hexahydroimidazo[1,2-a]pyridin-5-ol; or the compounds M.29.16a) 1-isopropyl-N,5-dimethyl-N-pyridazin-4-yl-pyrazole-4-carboxamide; or M.29.16b) 1-(1,2-dimethylpropyl)-N-ethyl-5-methyl-N-pyridazin-4-yl-pyrazole-4-carboxamide; M.29.16c) N,5-dimethyl-N-pyridazin-4-yl-1-(2,2,2-trifluoro-1-methyl-ethyl)pyrazole-4-carboxamide; M.29.16d) 1-[1-(1-cyanocyclopropyl)ethyl]-N-ethyl-5-methyl-N-pyridazin-4-yl-pyrazole-4-carboxamide; M.29.16e) N-ethyl-1-(2-fluoro-1-methyl-propyl)-5-methyl-N-pyridazin-4-yl-pyrazole-4-carboxamide; M.29.16f) 1-(1,2-dimethylpropyl)-N,5-dimethyl-N-pyridazin-4-yl-pyrazole-4-carboxamide; M.29.16g) 1-[1-(1-cyanocyclopropyl)ethyl]-N,5-dimethyl-N-pyridazin-4-yl-pyrazole-4-carboxamide; M.29.16h) N-methyl-1-(2-fluoro-1-methyl-propyl)-5-methyl-N-pyridazin-4-yl-pyrazole-4-carboxamide; M.29.16i) 1-(4,4-difluorocyclohexyl)-N-ethyl-5-methyl-N-pyridazin-4-yl-pyrazole-4-carboxamide; or M.29.16j) 1-(4,4-difluorocyclohexyl)-N,5-dimethyl-N-pyridazin-4-yl-pyrazole-4-carboxamide, or M.29.17 a compound selected from the compounds M.29.17a) to M.29.17j): M.29.17a) N-(1-methylethyl)-2-(3-pyridinyl)-2H-indazole-4-carboxamide; M.29.17b) N-cyclopropyl-2-(3-pyridinyl)-2H-indazole-4-carboxamide; M.29.17c) N-cyclohexyl-2-(3-pyridinyl)-2H-indazole-4-carboxamide; M.29.17d) 2-(3-pyridinyl)-N-(2,2,2-trifluoroethyl)-2H-indazole-4-carboxamide;

M.29.17e) 2-(3-pyridinyl)-N-[(tetrahydro-2-furanyl)methyl]-2H-indazole-5-carboxamide;

M.29.17f) methyl 2-[[2-(3-pyridinyl)-2H-indazol-5-yl]carbonyl]hydrazinecarboxylate; M.29.17g) N-[(2,2-difluorocyclopropyl)methyl]-2-(3-pyridinyl)-2H-indazole-5-carboxamide; M.29.17h) N-(2,2-difluoropropyl)-2-(3-pyridinyl)-2H-indazole-5-carboxamide; M.29.17i) 2-(3-pyridinyl)-N-(2-pyrimidinylmethyl)-2H-indazole-5-carboxamide; M.29.17j) N-[(5-methyl-2-pyrazinyl)methyl]-2-(3-pyridinyl)-2H-indazole-5-carboxamide, or M.29.18 a compound selected from the compounds M.29.18a) to M.29.18d): M.29.18a) N-[3-chloro-1-(3-pyridyl)pyrazol-4-yl]-N-ethyl-3-(3,3,3-trifluoropropylsulfanyl)propanamide; M.29.18b) N-[3-chloro-1-(3-pyridyl)pyrazol-4-yl]-N-ethyl-3-(3,3,3-trifluoropropylsulfinyl)propanamide;

M.29.18c) N-[3-chloro-1-(3-pyridyl)pyrazol-4-yl]-3-[(2,2-difluorocyclopropyl)methylsulfanyl]-N-ethyl-propanamide; M.29.18d) N-[3-chloro-1-(3-pyridyl)pyrazol-4-yl]-3-[(2,2-difluorocyclopropyl)methylsulfinyl]-N-ethyl-propanamide; or the compound M.29.19 sarolaner, or the compound M.29.20 lotilaner.

The commercially available compounds of the group M listed above may be found in "The Pesticide Manual, 16th Edition, C. MacBean, British Crop Protection Council (2013)" among other publications. The online Pesticide Manual is updated regularly and is accessible through http://bcpcdata.com/pesticide-manual.html. Another online data base for pesticides providing the ISO common names is http://www.alanwood.net/pesticides. The M.4 neonicotinoid cycloxaprid is known from WO2010/069266 and WO2011/069456, the neonicotinoid M.4A.2, sometimes also to be named as guadipyr, is known from WO2013/003977, and the neonicotinoid M.4A.3 (approved as paichongding in China) is known from WO2007/101369. The metaflumizone analogue M.226.1 is described in CN10171577 and the analogue M.226.2 in CN102126994. The phthalamides M.28.1 and M.28.2 are both known from WO2007/101540. The anthranilamide M.28.3 is described in WO2005/077934. The hydrazide compound M.28.4 is described in WO2007/043677. The anthranilamides M.28.5a) to M.28.5d) and M.28.5h) are described in WO 2007/006670, WO2013/024009 and WO2013/024010, the anthranilamide M.28.5i) is described in WO2011/085575, M.28.5j) in WO2008/134969, M.28.5k) in US2011/046186 and M.28.5l) in WO2012/034403. The diamide compound M.28.6 can be found in WO2012/034472. The spiroketal-substituted cyclic ketoenol derivative M.29.3 is known from WO2006/089633 and the biphenyl-substituted spirocyclic ketoenol derivative M.29.4 from WO2008/067911. The triazoylphenylsulfide M.29.5 is described in WO2006/043635, and biological control agents on the basis of *bacillus firmus* are described in WO2009/124707. The compounds M.29.6a) to M.29.6i) listed under M.29.6 are described in WO2012/029672, and M.29.6j) and M.29.6k) in WO2013/129688. The nematicide M.29.8 is known from WO2013/055584. The isoxazoline M.29.9.a) is described in WO2013/050317. The isoxazoline M.29.9.b) is described in WO2014/126208. The pyridalyl-type analogue M.29.10 is known from WO2010/060379. The carboxamides broflanilide and M.29.11.b) to M.29.11.h) are described in WO2010/018714, and the carboxamides M.29.11i) to M.29.11.p) in WO2010/127926. The pyridylthiazoles M.29.12.a) to M.29.12.c) are known from WO2010/006713, M.29.12.d) and M.29.12.e) are known from WO2012/000896, and M.29.12.f) to M.29.12.m) from WO2010/129497. The compounds M.29.14a) and M.29.14b) are known from WO2007/101369. The pyrazoles M.29.16.a) to M.29.16h) are described in WO2010/034737, WO2012/084670, and WO2012/143317, respectively, and the pyrazoles M.29.16i) and M.29.16j) are described in U.S. 61/891,437. The pyridinylindazoles M.29.17a) to M.29.17.j) are described in WO2015/038503. The pyridylpyrazoles M.29.18a) to M.29.18d) are described in US2014/0213448. The isoxazoline M.29.19 is described in WO2014/036056. The isoxazoline M.29.20 is known from WO2014/090918.

The following list of fungicides, in conjunction with which the pesticidal mixtures can be used, is intended to illustrate the possible combinations but does not limit them:

A) Respiration Inhibitors

Inhibitors of complex III at $Q_o$ site (e.g. strobilurins): azoxystrobin (A.1.1), coumethoxystrobin (A.1.2), coumoxystrobin (A.1.3), dimoxystrobin (A.1.4), enestroburin (A.1.5), fenaminstrobin (A.1.6), fenoxystrobin/flufenoxystrobin (A.1.7), fluoxastrobin (A.1.8), kresoxim-methyl (A.1.9), mandestrobin (A.1.10), metominostrobin (A.1.11), orysastrobin (A.1.12), picoxystrobin (A.1.13), pyraclostrobin (A.1.14), pyrametostrobin (A.1.15), pyraoxystrobin (A.1.16), trifloxystrobin (A.1.17), 2-(2-(3-(2,6-dichlorophenyl)-1-methyl-allylideneaminooxymethyl)-phenyl)-2-methoxyimino-N-methyl-acetamide (A.1.18), pyribencarb (A.1.19), triclopyricarb/chlorodincarb (A.1.20), famoxadone (A.1.21), fenamidone (A.1.21), methyl-N-[2-[(1,4-dimethyl-5-phenyl-pyrazol-3-yl)oxylmethyl]phenyl]-N-methoxy-carbamate (A.1.22), 1-[3-chloro-2-[[1-(4-chlorophenyl)-1H-pyrazol-3-yl]oxymethyl]phenyl]-4-methyl-tetrazol-5-one (A.1.23), 1-[3-bromo-2-[[1-(4-chlorophenyl)pyrazol-3-yl]oxymethyl]phenyl]-4-methyl-tetrazol-5-one (A.1.24), 1-[2-[[1-(4-chlorophenyl)pyrazol-3-yl]oxymethyl]-3-methyl-phenyl]-4-methyl-tetrazol-5-one (A.1.25), 1-[2-[[1-(4-chlorophenyl)pyrazol-3-yl]oxymethyl]-3-fluoro-phenyl]-4-methyl-tetrazol-5-one (A.1.26), 1-[2-[[1-(2,4-dichlorophenyl)pyrazol-3-yl]oxymethyl]-3-fluoro-phenyl]-4-methyl-tetrazol-5-one (A.1.27), 1-[2-[[4-(4-chlorophenyl)thiazol-2-yl]oxymethyl]-3-methyl-phenyl]-4-methyl-tetrazol-5-one (A.1.28), 1-[3-chloro-2-[[4-(p-tolyl)thiazol-2-yl]oxymethyl]phenyl]-4-methyl-tetrazol-5-one (A.1.29), 1-[3-cyclopropyl-2-[[2-methyl-4-(1-methylpyrazol-3-yl)phenoxy]methyl]phenyl]-4-methyl-tetrazol-5-one (A.1.30), 1-[3-(difluoromethoxy)-2-[[2-methyl-4-(1-methylpyrazol-3-yl)phenoxy]methyl]phenyl]-4-methyl-tetrazol-5-one (A.1.31), 1-methyl-4-[3-methyl-2-[[2-methyl-4-(1-methylpyrazol-3-yl)phenoxy]methyl]phenyl]tetrazol-5-one (A.1.32), 1-methyl-4-[3-methyl-2-[[1-[3-(trifluoromethyl)phenyl]-ethylideneamino]oxymethyl]phenyl]tetrazol-5-one (A.1.33), (Z,2E)-5-[1-(2,4-dichlorophenyl)pyrazol-3-yl]-oxy-2-methoxyimino-N,3-dimethyl-pent-3-enamide (A.1.34), (Z,2E)-5-[1-(4-chlorophenyl)pyrazol-3-yl]oxy-2-methoxyimino-N,3-dimethyl-pent-3-enamide (A.1.35), (Z,2E)-5-[1-(4-chloro-2-fluoro-phenyl)pyrazol-3-yl]oxy-2-methoxyimino-N,3-dimethyl-pent-3-enamide (A.1.36), inhibitors of complex III at $Q_i$ site: cyazofamid (A.2.1), amisulbrom (A.2.2), [(3S,6S,7R,8R)-8-benzyl-3-[(3-acetoxy-4-methoxy-pyridine-2-carbonyl)amino]-6-methyl-4,9-dioxo-1,5-dioxonan-7-yl] 2-methylpropanoate (A.2.3), [(3S,6S,7R,8R)-8-benzyl-3-[[3-(acetoxymethoxy)-4-methoxy-pyridine-2-carbonyl]amino]-6-methyl-4,9-dioxo-1,5-dioxonan-7-yl] 2-methylpropanoate (A.2.4), [(3S,6S,7R,8R)-8-benzyl-3-[(3-isobutoxycarbonyloxy-4-methoxy-pyridine-2-carbonyl)amino]-6-methyl-4,9-dioxo-1,5-dioxonan-7-yl] 2-methylpropanoate (A.2.5), [(3S,6S,7R,8R)-8-benzyl-3-[[3-(1,3-benzodioxol-5-ylmethoxy)-4-methoxy-pyridine-2-carbonyl]amino]-6-methyl-4,9-dioxo-1,5-dioxonan-7-yl] 2-methylpropanoate (A.2.6); (3S,6S,7R,8R)-3-[[(3-hydroxy-4-methoxy-2-pyridinyl)carbonyl]amino]-6-methyl-4,9-dioxo-8-(phenylmethyl)-1,5-dioxonan-7-yl 2-methylpropanoate (A.2.7), (3S,6S,7R,8R)-8-benzyl-3-[3-[(isobutyryloxy)methoxy]-4-methoxypicolinamido]-6-methyl-4,9-dioxo-1,5-dioxonan-7-yl isobutyrate (A.2.8);

inhibitors of complex II (e.g. carboxamides): benodanil (A.3.1), benzovindiflupyr (A.3.2), bixafen (A.3.3), boscalid (A.3.4), carboxin (A.3.5), fenfuram (A.3.6), fluopyram (A.3.7), flutolanil (A.3.8), fluxapyroxad (A.3.9), furametpyr (A.3.10), isofetamid (A.3.11), isopyrazam (A.3.12), mepronil (A.3.13), oxycarboxin (A.3.14), penflufen (A.3.14), penthiopyrad (A.3.15), sedaxane (A.3.16), tecloftalam (A.3.17), thifluzamide (A.3.18), N-(4'-trifluoromethylthiobiphenyl-2-yl)-3-difluoromethyl-1-methyl-1H-pyrazole-4-carboxamide (A.3.19), N-(2-(1,3,3-trimethyl-butyl)-phenyl)-1,3-dimethyl-5-fluoro-1H-pyrazole-4-carboxamide (A.3.20), 3-(difluoromethyl)-1-methyl-N-(1,1,3-trimethylindan-4-yl)pyrazole-4-carboxamide (A.3.21), 3-(trifluoromethyl)-1-methyl-N-(1,1,3-trimethylindan-4-yl)pyrazole-4-carboxamide (A.3.22), 1,3-dimethyl-N-(1,1,3-trimethylindan-4-yl)pyrazole-4-carboxamide (A.3.23), 3-(trifluoromethyl)-1,5-dimethyl-N-(1,1,3-trimethylindan-4-yl)pyrazole-4-carboxamide (A.3.24), 1,3,5-trimethyl-N-(1,1,3-trimethylindan-4-yl)pyrazole-4-carboxamide (A.3.25), N-(7-fluoro-1,1,3-trimethyl-indan-4-yl)-1,3-dimethyl-pyrazole-4-carboxamide (A.3.26), N-[2-(2,4-dichlorophenyl)-2-methoxy-1-methylethyl]-3-(difluoromethyl)-1-methyl-pyrazole-4-carboxamide (A.3.27);

other respiration inhibitors (e.g. complex I, uncouplers): diflumetorim (A.4.1), (5,8-difluoro-quinazolin-4-yl)-{2-[2-fluoro-4-(4-trifluoromethylpyridin-2-yloxy)-phenyl]-ethyl}-amine (A.4.2); nitrophenyl derivates: binapacryl (A.4.3), dinobuton (A.4.4), dinocap (A.4.5), fluazinam (A.4.6); ferimzone (A.4.7); organometal compounds: fentin salts, such as fentin-acetate (A.4.8), fentin chloride (A.4.9) or fentin hydroxide (A.4.10); ametoctradin (A.4.11); and silthiofam (A.4.12);

B) Sterol Biosynthesis Inhibitors (SBI Fungicides)

C14 demethylase inhibitors (DMI fungicides): triazoles: azaconazole (B.1.1), bitertanol (B.1.2), bromuconazole (B.1.3), cyproconazole (B.1.4), difenoconazole (B.1.5), diniconazole (B.1.6), diniconazole-M (B.1.7), epoxiconazole (B.1.8), fenbuconazole (B.1.9), fluquinconazole (B.1.10), flusilazole (B.1.11), flutriafol (B.1.12), hexaconazole (B.1.13), imibenconazole (B.1.14), ipconazole (B.1.15), metconazole (B.1.17), myclobutanil (B.1.18), oxpoconazole (B.1.19), paclobutrazole (B.1.20), penconazole (B.1.21), propiconazole (B.1.22), prothioconazole (B.1.23), simeconazole (B.1.24), tebuconazole (B.1.25), tetraconazole (B.1.26), triadimefon (B.1.27), triadimenol (B.1.28), triticonazole (B.1.29), uniconazole (B.1.30), 1-[rel-(2S;3R)-3-(2-chlorophenyl)-2-(2,4-difluorophenyl)-oxiranylmethyl]-5-thiocyanato-1H-[1,2,4]triazolo (B.1.31), 2-[rek(2S;3R)-3-(2-chlorophenyl)-2-(2,4-difluorophenyl)-oxiranylmethyl]-2H-[1,2,4]triazole-3-thiol (B.1.32), 2-[2-chloro-4-(4-chlorophenoxy)phenyl]-1-(1,2,4-triazol-1-yl)pentan-2-ol (B.1.33), 1-[4-(4-chlorophenoxy)-2-(trifluoromethyl)phenyl]-1-cyclopropyl-2-(1,2,4-triazol-1-yl)ethanol (B.1.34), 2-[4-(4-chlorophenoxy)-2-(trifluoromethyl)phenyl]-1-(1,2,4-triazol-1-yl)butan-2-ol (B.1.35), 2-[2-chloro-4-(4-chlorophenoxy)phenyl]-1-(1,2,4-triazol-1-yl)butan-2-ol (B.1.36), 2-[4-(4-chloro-phenoxy)-2-(trifluoromethyl)phenyl]-3-methyl-1-(1,2,4-triazol-1-yl)butan-2-ol (B.1.37), 2-[4-(4-chlorophenoxy)-2-(trifluoromethyl)phenyl]-1-(1,2,4-triazol-1-yl)propan-2-ol (B.1.38), 2-[2-chloro-4-(4-chlorophenoxy) phenyl]-3-methyl-1-(1,2,4-triazol-1-yl)butan-2-ol (B.1.39), 2-[4-(4-chlorophenoxy)-2-(trifluoromethyl) phenyl]-1-(1,2,4-triazol-1-yl)pentan-2-ol (B.1.40), 2-[4-(4-fluorophenoxy)-2-(trifluoromethyl)phenyl]-1-(1,2,4-triazol-1-yl)propan-2-ol (B.1.41), 2-[2-chloro-4-(4-chlorophenoxy)phenyl]-1-(1,2,4-triazol-1-yl)pent-3-yn-2-ol (B.1.51); imidazoles: imazalil (B.1.42), pefurazoate (B.1.43), prochloraz (B.1.44), triflumizol (B.1.45); pyrimidines, pyridines and piperazines: fenarimol (B.1.46), nuarimol (B.1.47), pyrifenox (B.1.48), triforine (B.1.49), [3-(4-chloro-2-fluoro-phenyl)-5-(2,4-difluorophenyl)isoxazol-4-yl]-(3-pyridyl)methanol (B.1.50);

Delta14-reductase inhibitors: aldimorph (B.2.1), dodemorph (B.2.2), dodemorph-acetate (B.2.3), fenpropimorph (B.2.4), tridemorph (B.2.5), fenpropidin (B.2.6), piperalin (B.2.7), spiroxamine (B.2.8);

Inhibitors of 3-keto reductase: fenhexamid (B.3.1);

C) Nucleic Acid Synthesis Inhibitors
phenylamides or acyl amino acid fungicides: benalaxyl (C.1.1), benalaxyl-M (C.1.2), kiralaxyl (C.1.3), metalaxyl (C.1.4), metalaxyl-M (mefenoxam, C.1.5), ofurace (C.1.6), oxadixyl (C.1.7);
others: hymexazole (C.2.1), octhilinone (C.2.2), oxolinic acid (C.2.3), bupirimate (C.2.4), 5-fluorocytosine (C.2.5), 5-fluoro-2-(p-tolylmethoxy)pyrimidin-4-amine (C.2.6), 5-fluoro-2-(4-fluorophenylmethoxy)pyrimidin-4-amine (C.2.7);

D) Inhibitors of Cell Division and Cytoskeleton
tubulin inhibitors, such as benzimidazoles, thiophanates: benomyl (D1.1), carbendazim (D1.2), fuberidazole (D1.3), thiabendazole (D1.4), thiophanate-methyl (D1.5); triazolopyrimidines: 5-chloro-7-(4-methylpiperidin-1-yl)-6-(2,4,6-trifluorophenyl)-[1,2,4]triazolo[1,5-a]pyrimidine (D1.6);
other cell division inhibitors: diethofencarb (D2.1), ethaboxam (D2.2), pencycuron (D2.3), fluopicolide (D2.4), zoxamide (D2.5), metrafenone (D2.6), pyriofenone (D2.7);

E) Inhibitors of Amino Acid and Protein Synthesis
methionine synthesis inhibitors (anilino-pyrimidines): cyprodinil (E.1.1), mepanipyrim (E.1.2), pyrimethanil (E.1.3);

protein synthesis inhibitors: blasticidin-S (E.2.1), kasugamycin (E.2.2), kasugamycin hydrochloride-hydrate (E.2.3), mildiomycin (E.2.4), streptomycin (E.2.5), oxytetracyclin (E.2.6), polyoxine (E.2.7), validamycin A (E.2.8);

F) Signal Transduction Inhibitors
MAP/histidine kinase inhibitors: fluoroimid (F.1.1), iprodione (F.1.2), procymidone (F.1.3), vinclozolin (F.1.4), fenpiclonil (F.1.5), fludioxonil (F.1.6);
G protein inhibitors: quinoxyfen (F.2.1);

G) Lipid and Membrane Synthesis Inhibitors
Phospholipid biosynthesis inhibitors: edifenphos (G.1.1), iprobenfos (G.1.2), pyrazophos (G.1.3), isoprothiolane (G.1.4);
lipid peroxidation: dicloran (G.2.1), quintozene (G.2.2), tecnazene (G.2.3), tolclofos-methyl (G.2.4), biphenyl (G.2.5), chloroneb (G.2.6), etridiazole (G.2.7);
phospholipid biosynthesis and cell wall deposition: dimethomorph (G.3.1), flumorph (G.3.2), mandipropamid (G.3.3), pyrimorph (G.3.4), benthiavalicarb (G.3.5), iprovalicarb (G.3.6), valifenalate (G.3.7) and N-(1-(1-(4-cyano-phenypethanesulfonyl)-but-2-yl) carbamic acid-(4-fluorophenyl) ester (G.3.8);
compounds affecting cell membrane permeability and fatty acides: propamocarb (G.4.1);
fatty acid amide hydrolase inhibitors: oxathiapiprolin (G.5.1), 2-{3-[2-(1-{[3,5-bis(difluoromethyl-1H-pyrazol-1-yl]acetyl}piperidin-4-yl)-1,3-thiazol-4-yl]-4,5-dihydro-1,2-oxazol-5-yl}phenyl methanesulfonate (G.5.2), 2-{3-[2-(1-{[3,5-bis(difluoromethyl)-1H-pyrazol-1-yl]acetyl}piperidin-4-yl) 1,3-thiazol-4-yl]-4,5-dihydro-1,2-oxazol-5-yl}-3-chlorophenyl methanesulfonate (G.5.3);

H) Inhibitors with Multi Site Action
inorganic active substances: Bordeaux mixture (H.1.1), copper acetate (H.1.2), copper hydroxide (H.1.3), copper oxychloride (H.1.4), basic copper sulfate (H.1.5), sulfur (H.1.6);
thio- and dithiocarbamates: ferbam (H.2.1), mancozeb (H.2.2), maneb (H.2.3), metam (H.2.4), metiram (H.2.5), propineb (H.2.6), thiram (H.2.7), zineb (H.2.8), ziram (H.2.9);
organochlorine compounds (e.g. phthalimides, sulfamides, chloronitriles): anilazine (H.3.1), chlorothalonil (H.3.2), captafol (H.3.3), captan (H.3.4), folpet (H.3.5), dichlofluanid (H.3.6), dichlorophen (H.3.7), hexachlorobenzene (H.3.8), pentachlorphenole (H.3.9) and its salts, phthalide (H.3.10), tolylfluanid (H.3.11), N-(4-chloro-2-nitro-phenyl)-N-ethyl-4-methyl-benzenesulfonamide (H.3.12);
guanidines and others: guanidine (H.4.1), dodine (H.4.2), dodine free base (H.4.3), guazatine (H.4.4), guazatine-acetate (H.4.5), iminoctadine (H.4.6), iminoctadine-triacetate (H.4.7), iminoctadine-tris(albesilate) (H.4.8), dithianon (H.4.9), 2,6-dimethyl-1H,5H-[1,4]dithiino[2,3-c:5,6-c']dipyrrole-1,3,5,7(2H,6H)-tetraone (H.4.10);

I) Cell Wall Synthesis Inhibitors
inhibitors of glucan synthesis: validamycin (I.1.1), polyoxin B (I.1.2);
melanin synthesis inhibitors: pyroquilon (I.2.1), tricyclazole (I.2.2), carpropamid (I.2.3), dicyclomet (I.2.4), fenoxanil (I.2.5);

J) Plant Defence Inducers
acibenzolar-S-methyl (J.1.1), probenazole (J.1.2), isotianil (J.1.3), tiadinil (J.1.4), prohexadione-calcium (J.1.5); phosphonates: fosetyl (J.1.6), fosetyl-aluminum (J.1.7), phosphorous acid and its salts (J.1.8), potassium or sodium bicarbonate (J.1.9);

K) Unknown Mode of Action bronopol (K.1.1), chinomethionat (K.1.2), cyflufenamid (K.1.3), cymoxanil (K.1.4), dazomet (K.1.5), debacarb (K.1.6), diclomezine (K.1.7), difenzoquat (K.1.8), difenzoquat-methylsulfate (K.1.9), diphenylamin (K.1.10), fenpyrazamine (K.1.11), flunnetover (K.1.12), flusulfamide (K.1.13), flutianil (K.1.14), methasulfocarb (K.1.15), nitrapyrin (K.1.16), nitrothal-isopropyl (K.1.18), oxathiapiprolin (K.1.19), tolprocarb (K.1.20), oxin-copper (K.1.21), proquinazid (K.1.22), tebufloquin (K.1.23), tecloftalam (K.1.24), triazoxide (K.1.25), 2-butoxy-6-iodo-3-propyl-chromen-4-one (K.1.26), 2-[3,5-bis(difluoromethyl)-1H-pyrazol-1-yl]-1-[4-(4-{5-[2-(prop-2-yn-1-yloxy)phenyl]-4,5-dihydro-1,2-oxazol-3-yl}-1,3-thiazol-2-yl)piperidin-1-yl]ethanone (K.1.27), 2-[3,5-bis(difluoromethyl)-1H-pyrazol-1-yl]-1-[4-(4-{5-[2-fluoro-6-(prop-2-yn-1-yl-oxy)phenyl]-4,5-dihydro-1,2-oxazol-3-yl}-1,3-thiazol-2-yl)piperidin-1-yl]ethanone (K.1.28), 2-[3,5-bis(difluoromethyl)-1H-pyrazol-1-yl]-1-[4-(4-{5-[2-chloro-6-(prop-2-yn-1-yloxy)phenyl]-4,5-dihydro-1,2-oxazol-3-yl}-1,3-thiazol-2-yl)piperidin-1-yl]ethanone (K.1.29), N-(cyclo-propylmethoxyimino-(6-difluoro-methoxy-2,3-difluoro-phenyl)-methyl)-2-phenyl acetamide (K.1.30), N'-(4-(4-chloro-3-trifluoromethyl-phenoxy)-2,5-dimethyl-phenyl)-N-ethyl-N-methyl formamidine (K.1.31), N'-(4-(4-fluoro-3-trifluoromethyl-phenoxy)-2,5-dimethyl-phenyl)-N-ethyl-N-methyl formamidine (K.1.32), N'-(2-methyl-5-trifluoromethyl-4-(3-trimethylsilanyl-propoxy)-phenyl)-N-ethyl-N-methyl formamidine (K.1.33), N'-(5-difluoromethyl-2-methyl-4-(3-trimethylsilanyl-propoxy)-phenyl)-N-ethyl-N-methyl formamidine (K.1.34), methoxy-acetic acid 6-tert-butyl-8-fluoro-2,3-dimethyl-quinolin-4-yl ester (K.1.35), 3-[5-(4-methylphenyl)-2,3-dimethyl-isoxazolidin-3-yl]-pyridine (K.1.36), 3-[5-(4-chloro-phenyl)-2,3-dimethyl-isoxazolidin-3-yl]-pyridine (pyrisoxazole) (K.1.37), N-(6-methoxy-pyridin-3-yl) cyclopropanecarboxylic acid amide (K.1.38), 5-chloro-1-(4,6-dimethoxy-pyrimidin-2-yl)-2-methyl-1H-benzoimidazole (K.1.39), 2-(4-chloro-phenyl)-N-[4-(3,4-dimethoxy-phenyl)-isoxazol-5-yl]-2-prop-2-ynyloxy-acetamide, ethyl (Z)-3-amino-2-cyano-3-phenyl-prop-2-enoate (K.1.40), picarbutrazox (K.1.41), pentyl N-[6-[[(Z)-[(1-methyltetrazol-5-yl)-phenyl-methylene]amino]oxymethyl]-2-pyridyl]carbamate (K.1.42), 2-[2-[(7,8-difluoro-2-methyl-3-quinolyl)oxy]-6-fluoro-phenyl]propan-2-ol (K.1.43), 2-[2-fluoro-6-[(8-fluoro-2-methyl-3-quinolyl)oxy]phen-yl]propan-2-ol (K.1.44), 3-(5-fluoro-3,3,4,4-tetramethyl-3,4-dihydroisoquinolin-1-yl)quinoline (K.1.45), 3-(4,4-difluoro-3,3-dimethyl-3,4-dihydroisoquinolin-1-yl)quinoline (K.1.46), 3-(4,4,5-trifluoro-3,3-dimethyl-3,4-dihydroisoquinolin-1-yl)quinoline (K.1.47), 9-fluoro-2,2-dimethyl-5-(3-quinolyl)-3H-1,4-benzoxazepine (K.1.48). The fungicides described by common names, their preparation and their activity e.g. against harmful fungi is known (cf.: http://www.alanwood.net/pesticides/); these substances are commercially available. The fungicides described by IUPAC nomenclature, their preparation and their pesticidal activity is also known (cf. Can. J. Plant Sci. 48(6), 587-94, 1968; EP-A 141 317; EP-A 152 031; EP-A 226 917; EP-A 243 970; EP-A 256 503; EP-A 428 941; EP-A 532 022; EP-A 1 028 125; EP-A 1 035 122; EP-A 1 201 648; EP-A 1 122 244, JP 2002316902; DE 19650197; DE 10021412; DE 102005009458; U.S. Pat. No. 3,296,272; U.S. Pat. No. 3,325,503; WO 98/46608; WO 99/14187; WO 99/24413; WO 99/27783; WO 00/29404; WO 00/46148; WO 00/65913; WO 01/54501; WO 01/56358; WO 02/22583; WO 02/40431; WO 03/10149; WO 03/11853; WO 03/14103; WO 03/16286; WO 03/53145; WO 03/61388; WO 03/66609; WO 03/74491; WO 04/49804; WO 04/83193; WO 05/120234; WO 05/123689; WO 05/123690; WO 05/63721; WO 05/87772; WO 05/87773; WO 06/15866; WO 06/87325; WO 06/87343; WO 07/82098; WO 07/90624; WO 11/028657, WO2012/168188, WO 2007/006670, WO 2011/77514; WO13/047749, WO 10/069882, WO 13/047441, WO 03/16303, WO 09/90181, WO 13/007767, WO 13/010862, WO 13/127704, WO 13/024009, WO 13/024010 and WO 13/047441, WO 13/162072, WO 13/092224, WO 11/135833).

Suitable further compounds C also include biopesticides. Biopesticides have been defined as a form of pesticides based on microorganisms (bacteria, fungi, viruses, nematodes, etc.) or natural products (compounds, such as metabolites, proteins, or extracts from biological or other natural sources) (U.S. Environmental Protection Agency: http://www.epa.gov/pesticides/biopesticides/). Biopesticides fall into two major classes, microbial and biochemical pesticides:

(1) Microbial pesticides consist of bacteria, fungi or viruses (and often include the metabolites that bacteria and fungi produce). Entomopathogenic nematodes are also classified as microbial pesticides, even though they are multicellular.

(2) Biochemical pesticides are naturally occurring substances or structurally-similar and functionally identical to a naturally-occurring substance and extracts from biological sources that control pests or provide other crop protection uses as defined below, but have non-toxic mode of actions (such as growth or developmental regulation, attractants, repellents or defence activators (e.g. induced resistance) and are relatively non-toxic to mammals.

Biopesticides for use against crop diseases have already established themselves on a variety of crops. For example, biopesticides already play an important role in controlling downy mildew diseases. Their benefits include: a 0-Day Pre-Harvest Interval, the ability to use under moderate to severe disease pressure, and the ability to use in mixture or in a rotational program with other registered pesticides. A major growth area for biopesticides is in the area of seed treatments and soil amendments. Biopesticidal seed treatments are e.g. used to control soil borne fungal pathogens that cause seed rots, damping-off, root rot and seedling blights. They can also be used to control internal seed borne fungal pathogens as well as fungal pathogens that are on the surface of the seed. Many biopesticidal products also show capacities to stimulate plant host defenses and other physiological processes that can make treated crops more resistant to a variety of biotic and abiotic stresses or can regulate plant growth. Many biopesticidal products also show capacities to stimulate plant health, plant growth and/or yield enhancing activity.

The following list of biopesticides, in conjunction with which the pesticidal mixtures of the present invention can be used, is intended to illustrate the possible combinations but does not limit them:

L) Biopesticides

L1) Microbial pesticides with fungicidal, bactericidal, viricidal and/or plant defense activator activity: *Ampelomyces quiSqualis, Aspergillus flavus, Aureobasidium pullulans, Bacillus altitudinis, B. megaterium, B. mojavensis, B. mycoides, B. pumilus, B. simplex, B. solisalsi, B. subtilis, Candida oleophlla, C. saitoana, Clavibacter michiganensiS* (bacteriophages), *Coniothyrium minitans, Cryphonectria parasitica, Cryptococcus albidus, Dilophosphora alopecuri, Fusarium oxysporum, Clonostachys rosea* f. *catenulate* (also named *Gliocladium catenulatum*), *Gliocladium roseum, Lysobacter antibioticus, L. enzymogenes, Metschnikowia fructicola, Microdochium dimerum, Microsphaeropsis ochracea, Muscodor albus, Paembacillus alvei, Paenibacillus polymyxa, Pantoea vagans, Penicillium bilaiae, Phlebiopsis gigantea, Pseudomonas* sp., *Pseudomonas chloraphis, Pseudozyma flocculosa, Pichia anomala, Pythium oligandrum, Sphaerodes mycoparasitica, Streptomyces griseoviridis, S. lydicus, S. violaceusniger, Talaromyces flavus, Trichoderma asperelloides, T. asperellum, T. atroviride, T. fertile, T. gamsii, T. harmatum, T. harzianum, T. polysporum, T. stromaticum, T. virens, T. viride, Typhula phacorrhiza, Ulocladium oudemansii, Verticillium dahlia,* zucchini yellow mosaic virus (avirulent strain);

L2) Biochemical pesticides with fungicidal, bactericidal, viricidal and/or plant defense activator activity: harpin protein, *Reynoutria sachalinensis* extract;

L3) Microbial pesticides with insecticidal, acaricidal, molluscidal and/or nematicidal activity: *Agrobacterium radiobacter, Bacillus cereus, B. firmus, B. thuringiensis, B. thuringiensis* ssp. *aizawai, B. t.* ssp. *israelensis, B. t.* ssp. *galleriae, B. t.* ssp. *kurstaki, B. t.* ssp. *tenebrionis, Beauveria bassiana, B. brongniartii, Burkholderia* spp., *Chromobacterium subtsugae, Cydia pomonella* granulovirus (CpGV), *Cryptphlebia leucotreta* granulovirus (CrleGV), *Flavobacterium* spp., *Helicoverpa armigera* nucleopolyhedrovirus (HearNPV), *Helicoverpa zea* nucleopolyhedrovirus (HzNPV), *Helicoverpa zea* single capsid nucleopolyhedrovirus (HzSNPV), *Heterorhabditis bacteriophora, Isaria fumosorosea, Lecanicillium longisporum, L. muscarium, Metarhizium anisopliae, Metarhizium anisopliae* var. *anisopliae, M. anisopliae* var. *acridum, Nomuraea rileyi, Paecilomyces fumosoroseus, P. lilacinus, Paembacillus popilliae, Pasteuria* spp., *P. nishizawae, P. penetrans, P. ramosa, P. thornea, P. usgae, Pseudomonas fluorescens, Spodoptera littoralis* nucleopolyhedrovirus (SpliNPV), *Steinernema carpocapsae, S. feltiae, S. kraussei, Streptomyces galbus, S. microflavus;*

L4) Biochemical pesticides with insecticidal, acaricidal, molluscidal, pheromone and/or nematicidal activity: L-carvone, citral, (E,Z)-7,9-dodecadien-1-yl acetate, ethyl formate, (E,Z)-2,4-ethyl decadienoate (pear ester), (Z,Z,E)-7,11,13-hexadecatrienal, heptyl butyrate, isopropyl myristate, lavanulyl senecioate, 2-methyl 1-butanol, methyl eugenol, methyl jasmonate, (E,Z)-2,13-octadecadien-1-ol, (E,Z)-2,13-octadecadien-1-ol acetate, (E,Z)-3,13-octadecadien-1-ol, R-1-octen-3-ol, pentatermanone, (E,Z,Z)-3,8,11-tetradecatrienyl acetate, (Z,E)-9,12-tetradecadien-1-yl acetate, Z-7-tetradecen-2-one, Z-9-tetradecen-1-yl acetate, Z-11-tetradecenal, Z-11-tetradecen-1-ol, extract of *Chenopodium ambrosiodes*, Neem oil, Quillay extract;

L5) Microbial pesticides with plant stress reducing, plant growth regulator, plant growth promoting and/or yield enhancing activity: *Azospialum amazonense, A. brasilense, A. lipoferum, A. irakense, A. halopraeferens, Bradyrhizobium* spp., *B. elkanii, B. japonicum, B. liaoningense, B. lupini, Delftia acidovorans, Glomus intraradices, Mesorhizobium* spp., *Rhizobium leguminosarum* bv. *phaseoli, R. l.* bv. *trifolii, R. l.* bv. *viciae, R. tropici, Sinorhizobium meliloti.*

The biopesticides from group L1) and/or L2) may also have insecticidal, acaricidal, molluscidal, pheromone, nematicidal, plant stress reducing, plant growth regulator, plant growth promoting and/or yield enhancing activity. The biopesticides from group L3) and/or L4) may also have fungicidal, bactericidal, viricidal, plant defense activator, plant stress reducing, plant growth regulator, plant growth promoting and/or yield enhancing activity. The biopesticides from group L5) may also have fungicidal, bactericidal, viricidal, plant defense activator, insecticidal, acaricidal, molluscidal, pheromone and/or nematicidal activity.

Many of these biopesticides have been deposited under deposition numbers mentioned herein (the prefices such as ATCC or DSM refer to the acronym of the respective culture collection, for details see e.g. here: www.wfcc.info/ccinfo/collection/by_acronym/), are referred to in literature, registered and/or are commercially available: mixtures of *Aureobasidium pullulans* DSM14940 and DSM14941 isolated in 1989 in Konstanz, Germany (e.g. blastospores in BlossomProtect® from bio-ferm GmbH, Austria), *Azospirillum brasilense* Sp245 originally isolated in wheat reagion of South Brazil (Passo Fundo) at least prior to 1980 (BR 11005; e.g. GELFIX® Gramineas from BASF Agricultural Specialties Ltd., Brazil), *A. brasilense* strains Ab-V5 and Ab-V6 (e.g. in AzoMax from Novozymes BioAg Produtos papra Agricultura Ltda., Quattro Barras, Brazil or Simbiose-Maíz® from Simbiose-Agro, Brazil; Plant Soil 331, 413-425, 2010), *B. firmus* CNCM 1-1582, a variant of parental strain EIP-N1 (CNCM 1-1556) isolated from soil of central plain area of Israel (WO2009/126473, U.S. Pat. No. 6,406,690; e.g. Votivo® from Bayer CropScience LP, USA), *B. pumilus* GHA 180 isolated from apple tree rhizosphere in Mexico (IDAC 260707-01; e.g. PRO-MIX® BX from Premier Horticulture, Quebec, Canada), *B. pumilus* INR-7 otherwise referred to as BU-F22 and BU-F33 isolated at least before 1993 from cucumber infested by *Erwinia tracheiphila* (NRRL O-50185, NRRL O-50153; U.S. Pat. No. 8,445,255), *B. pumilus* KFP9F isolated from the rhizosphere of grasses in South Africa at least before 2008 (NRRL O-50754; WO2014/029697; e.g. BAC-UP or FUSION-P from BASF Agricultural Specialities (Pty) Ltd., South Africa), *B. pumilus* QST 2808 was isolated from soil collected in Pohnpei, Federated States of Micronesia, in 1998 (NRRL O-30087; e.g. Sonata® or Ballad® Plus from Bayer Crop Science LP, USA), *B. simplex* ABU 288 (NRRL O-50304; U.S. Pat. No. 8,445,255), *B. subtilis* FB17 also called UD 1022 or UD10-22 isolated from red beet roots in North America (ATCC PTN-11857; System. Appl. Microbiol. 27, 372-379, 2004; US 2010/0260735; WO 2011/109395); *B. thuringiensis* ssp. *aizawai* ABTS-1857 isolated from soil taken from a lawn in Ephraim, Wis., U.S.A., in 1987 (also called ABG-6346; ATCC SD-1372; e.g. XenTari® from BioFa AG, Münsingen, Germany), *B. t.* ssp. *kurstaki* ABTS-351 identical to HD-1 isolated in 1967 from diseased Pink Bollworm black larvae in Brownsville, Tex., U.S.A. (ATCC SD-1275; e.g. Dipel® DF from Valent Biosciences, Ill., USA), *B. t.* ssp. *kurstaki* SB4 isolated from *E. saccharina* larval cadavers (NRRL O-50753; e.g. Beta Pro® from BASF Agricultural Specialities (Pty) Ltd., South Africa), *B. t.* ssp. *tenebrionis* NO-176-1, a mutant of strain NB-125, a wild type strain isolated in 1982 from a dead pupa of the beetle Tenebrio molitor (DSM 5480; EP 585 215 B1; e.g. Novodor® from Valent BioSciences, Switzerland), *Beauveria bassiana* GHA (ATCC 74250; e.g. BotaniGard®

22WGP from Laverlam Int. Corp., USA), *B. bassiana* JW-1 (ATCC 74040; e.g. Naturalis® from CBC (Europe) S.r.l., Italy), *B. bassiana* PPRI 5339 isolated from the larva of the tortoise beetle *Conchyloctenia punctata* (NRRL 50757; e.g. BroadBand® from BASF Agricultural Specialities (Pty) Ltd., South Africa), *Bradyrhizobium elkanii* strains SEMIA 5019 (also called 29W) isolated in Rio de Janeiro, Brazil and SEMIA 587 isolated in 1967 in the State of Rio Grande do Sul, from an area previously inoculated with a North American isolate, and used in commercial inoculants since 1968 (Appl. Environ. Microbiol. 73(8), 2635, 2007; e.g. GELFIX 5 from BASF Agricultural Specialties Ltd., Brazil), *B. japonicum* 532c isolated from Wisconsin field in U.S.A. (Nitragin 61A152; Can. J. Plant. Sci. 70, 661-666, 1990; e.g. in Rhizoflo®, Histick®, Hicoat® Super from BASF Agricultural Specialties Ltd., Canada), *B. japonicum* E-109 variant of strain USDA 138 (INTA E109, SEMIA 5085; Eur. J. Soil Biol. 45, 28-35, 2009; Biol. Fertil. Soils 47, 81-89, 2011); *B. japonicum* strains deposited at SEMIA known from Appl. Environ. Microbiol. 73(8), 2635, 2007: SEMIA 5079 isolated from soil in Cerrados region, Brazil by Embrapa-Cerrados used in commercial inoculants since 1992 (CPAC 15; e.g. GELFIX 5 or ADHERE 60 from BASF Agricultural Specialties Ltd., Brazil), *B. japonicum* SEMIA 5080 obtained under lab condtions by Embrapa-Cerrados in Brazil and used in commercial inoculants since 1992, being a natural variant of SEMIA 586 (CB1809) originally isolated in U.S.A. (CPAC 7; e.g. GELFIX 5 or ADHERE 60 from BASF Agricultural Specialties Ltd., Brazil); *Burkholderia sp.* A396 isolated from soil in Nikko, Japan, in 2008 (NRRL O-50319; WO2013/032693; MAJESTENE®; Marrone Bio Innovations, Inc., USA), *Coniothyrium minitans* CON/M/91-08 isolated from oilseed rape (WO1996/021358; DSM 9660; e.g. Contans® WG, Intercept® WG from Bayer CropScience AG, Germany), harpin (alpha-beta) protein (Science 257, 85-88, 1992; e.g. Messenger™ or HARP-N-Tek from Plant Health Care plc, U.K.), *Flavobacterium sp.* H492 (NRRL Accession No. B-50584); *Helicoverpa armigera* nucleopolyhedrovirus (HearNPV) (J. Invertebrate Pathol. 107, 112-126, 2011; e.g. Helicovex® from Adermatt Biocontrol, Switzerland; Diplomata® from Koppert, Brazil; Vivus® Max from AgBiTech Pty Ltd., Queensland, Australia), *Helicoverpa zea* single capsid nucleopolyhedrovirus (HzSNPV) (e.g. Gemstar® from Certis LLC, USA), *Helicoverpa zea* nucleopolyhedrovirus ABN-NPV-U (e.g. Heligen® from AgBiTech Pty Ltd., Queensland, Australia), *Heterorhabditis bacteriophora* (e.g. Nemasys® G from BASF Agricultural Specialities Limited, UK), lsaria fumosorosea Apopka-97 isolated from mealy bug on gynura in Apopka, Fla., U.S.A. (ATCC 20874; Biocontrol Science Technol. 22(7), 747-761, 2012; e.g. PFR-97™ or PreFeRal® from Certis LLC, USA), *Metarhizium anisopliae* var. *anisopliae* F52 also called 275 or V275 isolated from codling moth in Austria (DSM 3884, ATCC 90448; e.g. Met52® Novozymes Biologicals BioAg Group, Canada), *Metschnikowia fructicola* 277 isolated from grapes in the central part of Israel (U.S. Pat. No. 6,994,849; NRRL Y-30752; e.g. formerly Shemer® from Agrogreen, Israel), *Paecilomyces ilacinus* 251 isolated from infected nematode eggs in the Philippines (AGAL 89/030550; WO1991/02051; Crop Protection 27, 352-361, 2008; e.g. BioAct®from Bayer CropScience AG, Germany and MeloCon® from Certis, USA), *Paenibacillus alvei* NAS6G6 isolated from the rhizosphere of grasses in South Africa at least before 2008 (WO 2014/029697; NRRL 0-50755; e.g. BAC-UP from BASF Agricultural Specialities (Pty) Ltd., South Africa), *Pasteuria nishizawae* Pn1 isolated from a soybean field in the mid-2000s in Illinois, U.S.A. (ATCC SD-5833; Federal Register 76(22), 5808, Feb. 2, 2011; e.g. Clariva™ PN from Syngenta Crop Protection, LLC, USA), *Penicillium bilaiae* (also called *P. bilaii*) strains ATCC 18309 (=ATCC 74319), ATCC 20851 and/or ATCC 22348 (=ATCC 74318) originally isolated from soil in Alberta, Canada (Fertilizer Res. 39, 97-103, 1994; Can. J. Plant Sci. 78(1), 91-102, 1998; U.S. Pat. No. 5,026,417, WO 1995/017806; e.g. Jump Start®, Provide® from Novozymes Biologicals BioAg Group, Canada), *Reynoutria sachalinensis* extract (EP 0307510 B1; e.g. Regalia® SC from Marrone Biolnnovations, Davis, Calif., USA or Milsana® from BioFa AG, Germany), *Steinernema carpocapsae* (e.g. Millenium® from BASF Agricultural Specialities Limited, UK), *S. feltiae* (e.g. Nemashield® from BioWorks, Inc., USA; Nemasys® from BASF Agricultural Specialities Limited, UK), *Streptomyces microflavus* NRRL O-50550 (WO 2014/124369; Bayer CropScience, Germany), *Trichoderma asperelloides* JM41 R isolated in South Africa (NRRL 50759; also referred to as *T. fertile*; e.g. Trichoplus® from BASF Agricultural Specialities (Pty) Ltd., South Africa), *T. harzianum* T-22 also called KRL-AG2 (ATCC 20847; BioControl 57, 687-696, 2012; e.g. Plantshield® from BioWorks Inc., USA or SabrEx™ from Advanced Biological Marketing Inc., Van Wert, Ohio, USA).

According to the invention, the solid material (dry matter) of the biopesticides (with the exception of oils such as Neem oil) are considered as active components (e.g. to be obtained after drying or evaporation of the extraction or suspension medium in case of liquid formulations of the microbial pesticides).

In accordance with the present invention, the weight ratios and percentages used herein for a biological extract such as Quillay extract are based on the total weight of the dry content (solid material) of the respective extract(s). The weight ratios of mixtures comprising at least one microbial pesticide in the form of viable microbial cells including dormant forms, can be determined using the amount of CFU of the respective microorganism to calculate the total weight of the respective active component with the following equation that $1 \times 10^{10}$ CFU equals one gram of total weight of the respective active component. Colony forming unit is measure of viable microbial cells, in particular fungal and bacterial cells. In addition, here "CFU" may also be understood as the number of (juvenile) individual nematodes in case of (entomopathogenic) nematode biopesticides, such as *Steinernema feltiae*.

When mixtures comprising microbial pesticides are employed in crop protection, the application rates preferably range from about $1 \times 10^6$ to $5 \times 10^{15}$ (or more) CFU/ha, preferably from about $1 \times 10^8$ to about $1 \times 10^{13}$ CFU/ha, and even more preferably from about $1 \times 10^9$ to about $1 \times 10^{12}$ CFU/ha. In the case of (entomopathogenic) nematodes as microbial pesticides (e.g. *Steinernema feltiae*), the application rates preferably range inform about $1 \times 10^5$ to $1 \times 10^{12}$ (or more), more preferably from $1 \times 10^8$ to $1 \times 10^{11}$, even more preferably from $5 \times 10^8$ to $1 \times 10^{10}$ individuals (e.g. in the form of eggs, juvenile or any other live stages, preferably in an infective juvenile stage) per ha. When mixtures comprising microbial pesticides are employed in seed treatment, the application rates with respect to plant propagation material preferably range from about $1 \times 10^6$ to $1 \times 10^{12}$ (or more) CFU/seed. Preferably, the concentration is about $1 \times 10^6$ to about $1 \times 10^9$ CFU/seed. In the case of the microbial pesticides, the application rates with respect to plant propagation material also preferably range from about $1 \times 10^7$ to $1 \times 10^{14}$ (or more)

CFU per 100 kg of seed, preferably from $1\times10^9$ to about $1\times10^{12}$ CFU per 100 kg of seed.

The pesticidal mixtures may comprise component C in a synergistically effective amount. The weight ratio of *Bacillus amyloliquefaciens* and cis-jasmone to component C is usually from 10,000:1 to 1:10,000, preferably from 5000:1 to 1:5000, more preferably from 1000:1 to 1:1000, most preferably from 100:1 to 1:100, and in particular from 10:1 to 1:10. The weight ratio of cis-jasmone to component C is typically from 10,000:1 to 1:10,000, preferably from 5000:1 to 1:5000, more preferably from 1000:1 to 1:1000, most preferably from 100:1 to 1:100, and in particular from 10:1 to 1:10. The weight ratio of *Bacillus amyloliquefaciens* to component C is typically from 10,000:1 to 1:10,000, preferably from 5000:1 to 1:5000, more preferably from 1000:1 to 1:1000, most preferably from 100:1 to 1:100, and in particular from 10:1 to 1:10. The ratio of *Bacillus amyloliquefaciens* to component C is typically from $10^{16}$ CFU:1 g to $10^5$ CFU:1 g. In another embodiment, the ratio of *Bacillus amyloliquefaciens* to component C is from $10^{15}$ CFU:1 g to $10^8$ CFU:1 g. In yet another embodiment, the ratio of *Bacillus amyloliquefaciens* to component C is from $10^{13}$ CFU:1 g to $10^9$ CFU:1 g. In yet another embodiment, the ratio of *Bacillus amyloliquefaciens* to component C is from $10^{13}$ CFU:1 g to $10^{10}$ CFU:1 g.

In one embodiment, the pesticidal mixtures further comprise a component C selected from the following groups:

| M | Insecticides: |
|---|---|
| M.1 | Acetylcholine esterase inhibitors: |
| M.1A | carbamates: aldicarb, alanycarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, trimethacarb, XMC, xylylcarb and triazamate; and |
| M.1B | organophosphates: acephate, azamethiphos, azinphos-ethyl, azinphosmethyl, cadusafos, chlorethoxyfos, chlorfenvinphos, chlormephos, chlorpyrifos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothio-phosphoryl) salicylate, isoxathion, malathion, mecarbam, methamidophos, methidathion, mevinphos, monocrotophos, naled, omethoate, oxydemeton-methyl, parathion, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon and vamidothion; |
| M.2. | GABA-gated chloride channel antagonists: |
| M.2A | cyclodiene organochlorine compounds: endosulfan or chlordane; and |
| M.2B | fiproles: ethiprole, fipronil, flufiprole, pyrafluprole and pyriprole; |
| M.3 | Sodium channel modulators: |
| M.3A | pyrethroids: acrinathrin, allethrin, d-cis-trans allethrin, d-trans allethrin, bifenthrin, bioallethrin, bioallethrin S-cylclopentenyl, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin, deltamethrin, empenthrin, esfenvalerate, etofenprox, fenpropathrin, fenvalerate, flucythrinate, flumethrin, tau-fluvalinate, halfenprox, heptafluthrin, imiprothrin, meperfluthrin, metofluthrin, momfluorothrin, permethrin, phenothrin, prallethrin, profluthrin, pyrethrin (pyrethrum), resmethrin, silafluofen, tefluthrin, tetramethylfluthrin, tetramethrin, tralomethrin, and transfluthrin; and |
| M.3B | sodium channel modulators: DDT, and methoxychlor; |
| M.4 | Nicotinic acetylcholine receptor agonists: |
| M.4A.1 | neonicotinoids: acetamiprid, clothianidin, cycloxaprid, dinotefuran, imidacloprid, nitenpyram, thiacloprid, and thiamethoxam; |
| M.4A.2 | (2E-)-1-[(6-Chloropyridin-3-yl)methyl]-N'-nitro-2-pentylidenehydrazine-carboximidamide; |
| M4.A.3 | 1-[(6-Chloropyridin-3-yl)methyl]-7-methyl-8-nitro-5-propoxy-1,2,3,5,6,7-hexahydroimidazo[1,2-a]pyridine; and |
| M.4B | nicotine; |
| M.5 | Nicotinic acetylcholine receptor allosteric activators from the class of spinosyns: spinosad, and spinetoram; |
| M.6 | Chloride channel activators from the class of avermectins and milbemycins: abamectin, emamectin benzoate, ivermectin, lepimectin, and milbemectin; |
| M.7 | Juvenile hormone mimics: |
| M.7A | juvenile hormone analogues: hydroprene, kinoprene, and methoprene; and |
| M.7B | fenoxycarb, and pyriproxyfen; |
| M.8 | miscellaneous non-specific inhibitors: |
| M.8A | alkyl halides: methyl bromide, and other alkyl halides; and |
| M.8B | chloropicrin, sulfuryl fluoride, borax, and tartar emetic; |
| M.9 | Selective homopteran feeding blockers: pymetrozine, and flonicamid; |
| M.10 | Mite growth inhibitors: clofentezine, hexythiazox, diflovidazin, and etoxazole; |
| M.11 | Microbial disruptors of insect midgut membranes: *Bacillus thuringiensis*, *Bacillus sphaericus*, and the insecticdal proteins they produce: *Bacillus thuringiensis* subsp. *israelensis*, *Bacillus sphaericus*, *Bacillus thuringiensis* subsp. *aizawai*, *Bacillus thuringiensis* subsp. *kurstaki* and *Bacillus thuringiensis* subsp. *tenebrionis*, or the Bt crop proteins: Cry1Ab, Cry1Ac, Cry1Fa, Cry2Ab, mCry3A, Cry3Ab, Cry3Bb and Cry34/35Ab1; |
| M.12 | Inhibitors of mitochondrial ATP synthase: |
| M.12A | diafenthiuron, and organotin miticides: azocyclotin, cyhexatin, and fenbutatin oxide; and |

| | |
|---|---|
| M.12B | propargite, and tetradifon; |
| M.13 | Uncouplers of oxidative phosphorylation via disruption of the proton gradient: chlorfenapyr, DNOC, and sulfluramid; |
| M.14 | Nicotinic acetylcholine receptor channel blockers: bensultap, cartap hydrochloride, thiocyclam, and thiosultap sodium; |
| M.15 | Inhibitors of the chitin biosynthesis type 0: bistrifluron, chlorfluazuron, diflubenzuron, flucycloxuron, flufenoxuron, hexaflumuron, lufenuron, novaluron, noviflumuron, teflubenzuron, and triflumuron; |
| M.16 | Inhibitors of the chitin biosynthesis type 1: buprofezin; |
| M.17 | Moulting disruptors: cyromazine; |
| M.18 | Ecdyson receptor agonists: methoxyfenozide, tebufenozide, halofenozide, fufenozide or chromafenozide; |
| M.19 | Octopamin receptor agonists: amitraz; |
| M.20 | Mitochondrial complex III electron transport inhibitors: hydramethylnon, acequinocyl, and fluacrypyrim; |
| M.21 | Mitochondrial complex I electron transport inhibitors: |
| M.21A | METI acaricides and insecticides: fenazaquin, fenpyroximate, pyrimidifen, pyridaben, tebufenpyrad, and tolfenpyrad; and |
| M.21B | rotenone; |
| M.22 | Voltage-dependent sodium channel blockers: |
| M.22A | indoxacarb; |
| M.22B | metaflumizone; |
| M.22B.1 | 2-[2-(4-Cyanophenyl)-1-[3-(trifluoromethyl)phenyl]ethylidene]-[4-(difluoromethoxy)phenyl]-hydrazinecarboxamide; |
| M.22B.2 | N-(3-Chloro-2-methylphenyl)-2-[(4-chlorophenyl)[4-[methyl(methylsulfonyl)amino]phenyl]methylene]-hydrazinecarboxamide; |
| M.23 | Inhibitors of the of acetyl CoA carboxylase of the class of tetronic and tetramic acid derivatives: spirodiclofen, spiromesifen, and spirotetramat; |
| M.24 | Mitochondrial complex IV electron transport inhibitors: |
| M.24A | phosphorous compounds: aluminium phosphide, calcium phosphide, phosphine, and zinc phosphide; and |
| M.24B | cyanide; |
| M.25 | Mitochondrial complex II electron transport inhibitors from the class of beta-ketonitrile derivatives: cyenopyrafen, and cyflumetofen; |
| M.28 | Ryanodine receptor-modulators from the class of diamides: flubendiamide, chlorantraniliprole (rynaxypyr®), cyantraniliprole (cyazypyr®), tetraniliprole; and the phthalamide compounds; |
| M.28.1 | (R)-3-Chlor-N1-{2-methyl-4-[1,2,2,2-tetrafluor-1-(trifluormethyl)ethyl]phenyl}-N2-(1-methyl-2-methylsulfonylethyl)phthalamid; |
| M.28.2 | (S)-3-Chlor-N1-{2-methyl-4-[1,2,2,2-tetrafluor-1-(trifluormethyl)ethyl]phenyl}-N2-(1-methyl-2-methylsulfonylethyl)phthalamid; |
| M.28.3 | 3-bromo-N-{2-bromo-4-chloro-6-[(1-cyclopropylethyl)carbamoyl]phenyl}-1-(3-chlorpyridin-2-yl)-1H-pyrazole-5-carboxamide (proposed ISO name: cyclaniliprole); |
| M.28.4 | methyl-2-[3,5-dibromo-2-({[3-bromo-1-(3-chlorpyridin-2-yl)-1H-pyrazol-5-yl]carbonyl}amino)benzoyl]-1,2-dimethylhydrazinecarboxylate; |
| M.28.5a | N-[4,6-dichloro-2-[(diethyl-lambda-4-sulfanylidene)carbamoyl]-phenyl]-2-(3-chloro-2-pyridyl)-5-(trifluoromethyl)pyrazole-3-carboxamide; |
| M.28.5b | N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide; |
| M.28.5c | N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide; |
| M.28.5d | N-[4,6-dichloro-2-[(di-2-propyl-lambda-4-sulfanylidene)carbamoyl]-phenyl]-2-(3-chloro-2-pyridyl)-5-(trifluoromethyl)pyrazole-3-carboxamide; |
| M.28.5h | N-[4,6-dibromo-2-[(diethyl-lambda-4-sulfanylidene)carbamoyl]-phenyl]-2-(3-chloro-2-pyridyl)-5-(trifluoromethyl)pyrazole-3-carboxamide; |
| M.28.5i | N-[2-(5-Amino-1,3,4-thiadiazol-2-yl)-4-chloro-6-methylphenyl]-3-bromo-1-(3-chloro-2-pyridinyl)-1H-pyrazole-5-carboxamide; |
| M.28.5j | 3-Chloro-1-(3-chloro-2-pyridinyl)-N-[2,4-dichloro-6-[[(1-cyano-1-methylethyl)amino]carbonyl]phenyl]-1H-pyrazole-5-carboxamide; |
| M.28.5k | 3-Bromo-N-[2,4-dichloro-6-(methylcarbamoyl)phenyl]-1-(3,5-dichloro-2-pyridyl)-1H-pyrazole-5-carboxamide; |
| M.28.5l | N-[4-Chloro-2-[[(1,1-dimethylethyl)amino]carbonyl]-6-methylphenyl]-1-(3-chloro-2-pyridinyl)-3-(fluoromethoxy)-1H-pyrazole-5-carboxamide; and |
| M.28.6: | cyhalodiamide; |
| M.29. | insecticidal active compounds of unknown or uncertain mode of action: afidopyropen, afoxolaner, azadirachtin, amidoflumet, benzoximate, bifenazate, broflanilide, bromopropylate, chinomethionat, cryolite, dicloromezotiaz, dicofol, flufenerim, flometoquin, fluensulfone, fluhexafon, flupyradifurone, fluralaner, metoxadiazone, piperonyl butoxide, pyflubumide, pyridalyl, pyrifluquinazon, sulfoxaflor, tioxazafen, and triflumezopyrim; |
| M.29.3 | 11-(4-chloro-2,6-dimethylphenyl)-12-hydroxy-1,4-dioxa-9-azadispiro[4.2.4.2]-tetradec-11-en-10-one; |
| M.29.4 | 3-(4'-fluoro-2,4-dimethylbiphenyl-3-yl)-4-hydroxy-8-oxa-1-azaspiro[4.5]dec-3-en-2-one; |
| M.29.5 | 1-[2-fluoro-4-methyl-5-[(2,2,2-trifluoroethyl)sulfinyl]phenyl]-3-(trifluoromethyl)-1H-1,2,4-triazole-5-amine, and actives on basis of *Bacillus firmus* (Votivo, I-1582); and |
| M.29.6a | (E/Z)—N-[1-[(6-chloro-3-pyridyl)methyl]-2-pyridylidene]-2,2,2-trifluoro-acetamide; |
| M.29.6b | (E/Z)—N-[1-[(6-chloro-5-fluoro-3-pyridyl)methyl]-2-pyridylidene]-2,2,2-trifluoro-acetamide; |

| | |
|---|---|
| M.29.6c | (E/Z)-2,2,2-trifluoro-N-[1-[(6-fluoro-3-pyridyl)methyl]-2-pyridylidene]acetamide; |
| M.29.6d | (E/Z)—N-[1-[(6-bromo-3-pyridyl)methyl]-2-pyridylidene]-2,2,2-trifluoro-acetamide; |
| M.29.6e | (E/Z)—N-[1-[1-(6-chloro-3-pyridyl)ethyl]-2-pyridylidene]-2,2,2-trifluoro-acetamide; |
| M.29.6f | (E/Z)—N-[1-[(6-chloro-3-pyridyl)methyl]-2-pyridylidene]-2,2-difluoro-acetamide; |
| M.29.6g | (E/Z)-2-chloro-N-[1-[(6-chloro-3-pyridyl)methyl]-2-pyridylidene]-2,2-difluoro-acetamide; |
| M.29.6h | (E/Z)—N-[1-[(2-chloropyrimidin-5-yl)methyl]-2-pyridylidene]-2,2,2-trifluoro-acetamide; |
| M.29.6i | (E/Z)—N-[1-[(6-chloro-3-pyridyl)methyl]-2-pyridylidene]-2,2,3,3,3-pentafluoro-propanamide.); |
| M.29.6j | N-[1-[(6-chloro-3-pyridyl)methyl]-2-pyridylidene]-2,2,2-trifluoro-thioacetamide; and |
| M.29.6k | N-[1-[(6-chloro-3-pyridyl)methyl]-2-pyridylidene]-2,2,2-trifluoro-N'-isopropyl-acetamidine; |
| M.29.8 | fluazaindolizine; |
| M.29.9a | 4-[5-(3,5-dichlorophenyl)-5-(trifluoromethyl)-4H-isoxazol-3-yl]-2-methyl-N-(1-oxothietan-3-yl)benzamide; and |
| M.29.9b | fluxametamide; |
| M.29.10 | 5-[3-[2,6-dichloro-4-(3,3-dichloroallyloxy)phenoxy]propoxy]-1H-pyrazole; |
| M.29.11b | 3-(benzoylmethylamino)-N-[2-bromo-4-[1,2,2,3,3-hexafluoro-1-(trifluoromethyl)propyl]-6-(trifluoromethyl)phenyl]-2-fluoro-benzamide; |
| M.29.11c | 3-(benzoylmethylamino)-2-fluoro-N-[2-iodo-4-[1,2,2,2-tetrafluoro-1-(trifluoromethyl)ethyl]-6-(trifluoromethyl)phenyl]-benzamide; |
| M.29.11d | N-[3-[[[2-iodo-4-[1,2,2,2-tetrafluoro-1-(trifluoromethyl)ethyl]-6-(trifluoromethyl)phenyl]amino]carbonyl]phenyl]-N-methyl-benzamide; |
| M.29.11e | N-[3-[[[2-bromo-4-[1,2,2,2-tetrafluoro-1-(trifluoromethyl)ethyl]-6-(trifluoromethyl)phenyl]amino]carbonyl]-2-fluorophenyl]-4-fluoro-N-methyl-benzamide; |
| M.29.11f | 4-fluoro-N-[2-fluoro-3-[[[2-iodo-4-[1,2,2,2-tetrafluoro-1-(trifluoromethyl)ethyl]-6-(trifluoromethyl)phenyl]amino]carbonyl]phenyl]-N-methyl-benzamide; |
| M.29.11g | 3-fluoro-N-[2-fluoro-3-[[[2-iodo-4-[1,2,2,2-tetrafluoro-1-(trifluoromethyl)ethyl]-6-(trifluoromethyl)phenyl]amino]carbonyl]phenyl]-N-methyl-benzamide; |
| M.29.11h | 2-chloro-N-[3-[[[2-iodo-4-[1,2,2,2-tetrafluoro-1-(trifluoromethyl)ethyl]-6-(trifluoromethyl)phenyl]amino]carbonyl]phenyl]-3-pyridinecarboxamide; |
| M.29.11i | 4-cyano-N-[2-cyano-5-[[2,6-dibromo-4-[1,2,2,3,3,3-hexafluoro-1-(trifluoromethyl)-propyl]phenyl]carbamoyl]phenyl]-2-methyl-benzamide; |
| M.29.11j | 4-cyano-3-[(4-cyano-2-methyl-benzoyl)amino]-N-[2,6-dichloro-4-[1,2,2,3,3,3-hexafluoro-1-(trifluoromethyl)propyl]phenyl]-2-fluoro-benzamide; |
| M.29.11k | N-[5-[[2-chloro-6-cyano-4-[1,2,2,3,3,3-hexafluoro-1-(trifluoromethyl)propyl]-phenyl]carbamoyl]-2-cyano-phenyl]-4-cyano-2-methyl-benzamide; |
| M.29.11l | N-[5-[[2-bromo-6-chloro-4-[2,2,2-trifluoro-1-hydroxy-1-(trifluoromethyl)ethyl]-phenyl]carbamoyl]-2-cyano-phenyl]-4-cyano-2-methyl-benzamide; |
| M.29.11m | N-[5-[[2-bromo-6-chloro-4-[1,2,2,3,3,3-hexafluoro-1-(trifluoromethyl)-propyl]phenyl]carbamoyl]-2-cyano-phenyl]-4-cyano-2-methyl-benzamide; |
| M.29.11n | 4-cyano-N-[2-cyano-5-[[2,6-dichloro-4-[1,2,2,3,3,3-hexafluoro-1-(trifluoromethyl)-propyl]phenyl]carbamoyl]phenyl]-2-methyl-benzamide; |
| M.29.11o | 4-cyano-N-[2-cyano-5-[[2,6-dichloro-4-[1,2,2,2-tetrafluoro-1-(trifluoromethyl)ethyl]phenyl]carbamoyl]phenyl]-2-methyl-benzamide; |
| M.29.11p | N-[5-[[2-bromo-6-chloro-4-[1,2,2,2-tetrafluoro-1-(trifluoromethyl)ethyl]phenyl]-carbamoyl]-2-cyano-phenyl]-4-cyano-2-methyl-benzamide; |
| M.29.12a | 2-(1,3-Dioxan-2-yl)-6-[2-(3-pyridinyl)-5-thiazolyl]-pyridine; |
| M.29.12b | 2-[6-[2-(5-Fluoro-3-pyridinyl)-5-thiazolyl]-2-pyridinyl]-pyrimidine; |
| M.29.12c | 2-[6-[2-(3-Pyridinyl)-5-thiazolyl]-2-pyridinyl]-pyrimidine; |
| M.29.12d | N-Methylsulfonyl-6-[2-(3-pyridyl)thiazol-5-yl]pyridine-2-carboxamide; |
| M.29.12e | N-Methylsulfonyl-6-[2-(3-pyridyl)thiazol-5-yl]pyridine-2-carboxamide; |
| M.29.12f | N-Ethyl-N-[4-methyl-2-(3-pyridyl)thiazol-5-yl]-3-methylthio-propanamide; |
| M.29.12g | N-Methyl-N-[4-methyl-2-(3-pyridyl)thiazol-5-yl]-3-methylthio-propanamide; |
| M.29.12h | N,2-Dimethyl-N-[4-methyl-2-(3-pyridyl)thiazol-5-yl]-3-methylthio-propanamide; |
| M.29.12i | N-Ethyl-2-methyl-N-[4-methyl-2-(3-pyridyl)thiazol-5-yl]-3-methylthio-propanamide; |
| M.29.12j | N-[4-Chloro-2-(3-pyridyl)thiazol-5-yl]-N-ethyl-2-methyl-3-methylthio-propanamide; |
| M.29.12k | N-[4-Chloro-2-(3-pyridyl)thiazol-5-yl]-N,2-dimethyl-3-methylthio-propanamide; |
| M.29.12l | N-[4-Chloro-2-(3-pyridyl)thiazol-5-yl]-N-methyl-3-methylthio-propanamide; |
| M.29.12m | N-[4-Chloro-2-(3-pyridyl)thiazol-5-yl]-N-ethyl-3-methylthio-propanamide; or the compounds |
| M.29.14a | 1-[(6-Chloro-3-pyridinyl)methyl]-1,2,3,5,6,7-hexahydro-5-methoxy-7-methyl-8-nitro-imidazo[1,2-a]pyridine; |
| M.29.14b | 1-[(6-Chloropyridin-3-yl)methyl]-7-methyl-8-nitro-1,2,3,5,6,7-hexahydroimidazo[1,2-a]pyridin-5-ol; |
| M.29.16.a | 1-isopropyl-N,5-dimethyl-N-pyridazin-4-yl-pyrazole-4-carboxamide; or |
| M.29.16b | 1-(1,2-dimethylpropyl)-N-ethyl-5-methyl-N-pyridazin-4-yl-pyrazole-4-carboxamide; |
| M.29.16c | N,5-dimethyl-N-pyridazin-4-yl-1-(2,2,2-trifluoro-1-methyl-ethyl)pyrazole-4-carboxamide; |
| M.29.16d | 1-[1-(1-cyanocyclopropyl)ethyl]-N-ethyl-5-methyl-N-pyridazin-4-yl-pyrazole-4-carboxamide; |
| M.29.16e | N-ethyl-1-(2-fluoro-1-methyl-propyl)-5-methyl-N-pyridazin-4-yl-pyrazole-4-carboxamide; |
| M.29.16f | 1-(1,2-dimethylpropyl)-N,5-dimethyl-N-pyridazin-4-yl-pyrazole-4-carboxamide; |
| M.29.16g | 1-[1-(1-cyanocyclopropyl)ethyl]-N,5-dimethyl-N-pyridazin-4-yl-pyrazole-4-carboxamide; |

-continued

| | |
|---|---|
| M.29.16h | N-methyl-1-(2-fluoro-1-methyl-propyl]-5-methyl-N-pyridazin-4-yl-pyrazole-4-carboxamide; |
| M.29.16i | 1-(4,4-difluorocyclohexyl)-N-ethyl-5-methyl-N-pyridazin-4-yl-pyrazole-4-carboxamide; and |
| M.29.16j | 1-(4,4-difluorocyclohexyl)-N,5-dimethyl-N-pyridazin-4-yl-pyrazole-4-carboxamide; |
| M.29.17a | N-(1-methylethyl)-2-(3-pyridinyl)-2H-indazole-4-carboxamide; |
| M.29.17b | N-cyclopropyl-2-(3-pyridinyl)-2H-indazole-4-carboxamide; |
| M.29.17c | N-cyclohexyl-2-(3-pyridinyl)-2H-indazole-4-carboxamide; |
| M.29.17d | 2-(3-pyridinyl)-N-(2,2,2-trifluoroethyl)-2H-indazole-4-carboxamide; |
| M.29.17e | 2-(3-pyridinyl)-N-[(tetrahydro-2-furanyl)methyl]-2H-indazole-5-carboxamide; |
| M.29.17f | methyl 2-[[2-(3-pyridinyl)-2H-indazol-5-yl]carbonyl]hydrazinecarboxylate; |
| M.29.17g | N-[(2,2-difluorocyclopropyl)methyl]-2-(3-pyridinyl)-2H-indazole-5-carboxamide; |
| M.29.17h | N-(2,2-difluoropropyl)-2-(3-pyridinyl)-2H-indazole-5-carboxamide; |
| M.29.17i | 2-(3-pyridinyl)-N-(2-pyrimidinylmethyl)-2H-indazole-5-carboxamide; and |
| M.29.17j | N-[(5-methyl-2-pyrazinyl)methyl]-2-(3-pyridinyl)-2H-indazole-5-carboxamide; |
| M.29.18a | N-[3-chloro-1-(3-pyridyl)pyrazol-4-yl]-N-ethyl-3-(3,3,3-trifluoropropylsulfanyl)-propanamide; |
| M.29.18b | N-[3-chloro-1-(3-pyridyl)pyrazol-4-yl]-N-ethyl-3-(3,3,3-trifluoropropylsulfinyl)-propanamide; |
| M.29.18c | N-[3-chloro-1-(3-pyridyl)pyrazol-4-yl]-3-[(2,2-difluorocyclopropyl)-methylsulfanyl]-N-ethyl-propanamide; and |
| M.29.18d | N-[3-chloro-1-(3-pyridyl)pyrazol-4-yl]-3-[(2,2-difluorocyclopropyl)-methylsulfinyl]-N-ethyl-propanamide; |
| M.29.19 | sarolaner; |
| M.29.20 | lotilaner; |

| | |
|---|---|
| L | Biopesticides: |
| L.1 | Microbial pesticides with fungicidal, bactericidal, viricidal and/or plant defense activator activity: *Ampelomyces quisqualis, Aspergillus flavus, Aureobasidium pullulans, Bacillus altitudinis, B. megaterium, B. mojavensis, B. mycoides, B. simplex, B. solisalsi, B. subtilis, Candida oleophila, C. saitoana, Clavibacter michiganensis* (bacteriophages), *Coniothyrium minitans, Cryphonectria parasitica, Cryptococcus albidus, Dilophosphora alopecuri, Fusarium oxysporum, Clonostachys rosea* f. catenulate (also named *Gliocladium catenulatum*), *Gliocladium roseum, Lysobacter antibioticus, L. enzymogenes, Metschnikowia fructicola, Microdochium dimerum, Microsphaeropsis ochracea, Muscodor albus, Paenibacillus polymyxa, Pantoea vagans, Penicillium bilaiae, Phlebiopsis gigantea, Pseudomonas* sp., *Pseudomonas chloraphis, Pseudozyma flocculosa, Pichia anomala, Pythium oligandrum, Sphaerodes mycoparasitica, Streptomyces griseoviridis, S. lydicus, S. violaceusniger, Talaromyces flavus, T. asperellum, T. atroviride, T. fertile, T. gamsii, T. harmatum, T. harzianum, T. polysporum, T. stromaticum, T. virens, T. viride, Typhula phacorrhiza, Ulocladium oudemansii, Verticillium dahlia*, and zucchini yellow mosaic virus (avirulent strain); |
| L.2 | Biochemical pesticides with fungicidal, bactericidal, viricidal and/or plant defense activator activity: harpin protein, and *Reynoutria sachalinensis* extract; |
| L.3 | Microbial pesticides with insecticidal, acaricidal, molluscidal and/or nematicidal activity: *Agrobacterium radiobacter, Bacillus cereus, B. firmus, B. thuringiensis, B. thuringiensis* ssp. *aizawai, B. t.* ssp. *israelensis, B. t.* ssp. *galleriae, B. t.* ssp. *tenebrionis, Beauveria bassiana, B. brongniartii, Burkholderia* spp., *Chromobacterium subtsugae, Cydia pomonella* granulovirus (CpGV), *Cryptophlebia leucotreta* granulovirus (CrleGV), *Flavobacterium* spp., *Helicoverpa armigera* nucleopolyhedrovirus (HearNPV), *Helicoverpa zea* nucleopolyhedrovirus (HzNPV), *Helicoverpa zea* single capsid nucleopolyhedrovirus (HzSNPV), *Heterorhabditis bacteriophora, Isaria fumosorosea, Lecanicillium longisporum, L. muscarium, Metarhizium anisopliae, Metarhizium anisopliae* var. *anisopliae, M. anisopliae* var. *acridum, Nomuraea rileyi, Paecilomyces fumosoroseus, P. lilacinus, Paenibacillus popilliae, Pasteuria* spp., *P. nishizawae, P. penetrans, P. ramosa, P. thornea, P. usgae, Pseudomonas fluorescens, Spodoptera littoralis* nucleopolyhedrovirus (SpliNPV), *Steinernema carpocapsae, S. feltiae, S. kraussei, Streptomyces galbus*, and *S. microflavus*; |
| L.4 | Biochemical pesticides with insecticidal, acaricidal, molluscidal, pheromone and/or nematicidal activity: L-carvone, citral, (E,Z)-7,9-dodecadien-1-yl acetate, ethyl formate, (E,Z)-2,4-ethyl decadienoate (pear ester), (Z,Z,E)-7,11,13-hexadecatrienal, heptyl butyrate, isopropyl myristate, lavanulyl senecioate, 2-methyl 1-butanol, methyl eugenol, (E,Z)-2,13-octadecadien-1-ol, (E,Z)-2,13-octadecadien-1-ol acetate, (E,Z)-3,13-octadecadien-1-ol, R-1-octen-3-ol, pentatermanone, (E,Z,Z)-3,8,11-tetradecatrienyl acetate, (Z,E)-9,12-tetradecadien-1-yl acetate, Z-7-tetradecen-2-one, Z-9-tetradecen-1-yl acetate, Z-11-tetradecenal, Z-11-tetradecen-1-ol, extract of Chenopodium ambrosiodes, Neem oil, and Quillay extract; |
| L.5 | Microbial pesticides with plant stress reducing, plant growth regulator, plant growth promoting and/or yield enhancing activity: *A. lipoferum, A. irakense, A. halopraeferens, B. elkanii, B. liaoningense, B. lupini, Delftia acidovorans, Glomus intraradices, Mesorhizobium* spp., *Rhizobium leguminosarum* bv. *phaseoli, R. l.* bv. *trifolii, R. l.* bv. *viciae, R. tropici*, and *Sinorhizobium meliloti*; |

| | |
|---|---|
| F | Fungicides: |
| F.I | Respiration inhibitors |
| F.I1 | Inhibitors of complex III at $Q_o$ site: azoxystrobin, coumethoxystrobin, coumoxystrobin, dimoxystrobin, enestroburin, fenaminstrobin, fenoxystrobin/flufenoxystrobin, fluoxastrobin, kresoxim-methyl, mandestrobin, metominostrobin, orysastrobin, picoxystrobin, pyraclostrobin, pyrametostrobin, pyraoxystrobin, trifloxystrobin, 2-(2-(3-(2,6-dichlorophenyl)-1-methyl-allylidene-aminooxymethyl)-phenyl)-2-methoxyimino-N-methyl-acetamide, pyribencarb, triclopyricarb/chlorodincarb, famoxadone, and fenamidone, methyl-N-[2-[(1,4-dimethyl-5-phenyl-pyrazol-3-yl)oxylmethyl]phenyl]-N-methoxy-carbamate, 1-[3-chloro-2-[[1-(4-chlorophenyl)-1H-pyrazol-3-yl]oxymethyl]phenyl]-4-methyl-tetrazol-5-one, 1-[3-bromo-2-[[1-(4-chlorophenyl)pyrazol-3-yl]oxymethyl]phenyl]-4-methyl-tetrazol-5-one, 1-[2-[[1-(4-chlorophenyl)pyrazol-3-yl]oxymethyl]-3-methyl-phenyl]-4-methyl-tetrazol-5-one, 1-[2-[[1-(4-chlorophenyl)pyrazol-3-yl]oxymethyl]-3-fluoro-phenyl]-4-methyl-tetrazol-5-one, 1-[2-[[1-(2,4-dichlorophenyl)pyrazol-3-yl]oxymethyl]-3-fluoro-phenyl]-4-methyl-tetrazol-5-one, 1-[2-[[4-(4-chlorophenyl)thiazol-2-yl]oxymethyl]-3-methyl-phenyl]-4-methyl-tetrazol-5-one, 1-[3-chloro-2-[[4-(p-tolyl)thiazol-2-yl]oxymethyl]phenyl]-4-methyl-tetrazol-5-one, 1-[3-cyclopropyl-2-[[2-methyl-4-(1-methylpyrazol-3-yl)phenoxy]methyl]phenyl]-4-methyl-tetrazol-5-one, 1-[3-(difluoromethoxy)-2-[[2-methyl-4-(1-methylpyrazol-3-yl)phenoxy]methyl]phenyl]-4-methyl-tetrazol-5-one, 1-methyl-4-[3-methyl-2-[[2-methyl-4-(1-methylpyrazol-3-yl)phenoxy]methyl]phenyl]tetrazol-5-one, 1-methyl-4-[3-methyl-2-[[1-[3-(trifluoromethyl)phenyl]-ethylideneamino]oxy-methyl]phenyl]tetrazol-5-one, (Z,2E)-5-[1-(2,4-dichlorophenyl)pyrazol-3-yl]oxy-2-methoxyimino-N,3-dimethyl-pent-3-enamide, (Z,2E)-5-[1-(4-chlorophenyl)pyrazol-3-yl]oxy-2-methoxyimino-N,3-dimethyl-pent-3-enamide, and (Z,2E)-5-[1-(4-chloro-2-fluoro-phenyl)pyrazol-3-yl]oxy-2-methoxyimino-N,3-dimethyl-pent-3-enamide; |
| F.I2 | Inhibitors of complex III at Qi site: fenpicoxamid, cyazofamid, amisulbrom, [(3S,6S,7R,8R)-8-benzyl-3-[(3-acetoxy-4-methoxy-pyridine-2-carbonyl)amino]-6-methyl-4,9-dioxo-1,5-dioxonan-7-yl] 2-methylpropanoate, [(3S,6S,7R,8R)-8-benzyl-3-[[3-(acetoxymethoxy)-4-methoxy-pyridine-2-carbonyl]amino]-6-methyl-4,9-dioxo-1,5-dioxonan-7-yl] 2-methylpropanoate, [(3S,6S,7R,8R)-8-benzyl-3-[(3-isobutoxycarbonyloxy-4-methoxy-pyridine-2-carbonyl)amino]-6-methyl-4,9-dioxo-1,5-dioxonan-7-yl] 2-methylpropanoate, [(3S,6S,7R,8R)-8-benzyl-3-[[3-(1,3-benzodioxol-5-ylmethoxy)-4-methoxy-pyridine-2-carbonyl]amino]-6-methyl-4,9-dioxo-1,5-dioxonan-7-yl] 2-methylpropanoate; (3S,6S,7R,8R)-3-[[(3-hydroxy-4-methoxy-2-pyridinyl)carbonyl]amino]-6-methyl-4,9-dioxo-8-(phenylmethyl)-1,5-dioxonan-7-yl 2-methylpropanoate, and (3S,6S,7R,8R)-8-benzyl-3-[3-[(isobutyryloxy)methoxy]-4-methoxypicolinamido]-6-methyl-4,9-dioxo-1,5-dioxonan-7-yl isobutyrate; |
| F.I3 | Inhibitors of complex II: pydiflumetofen, benodanil, benzovindiflupyr, bixafen, boscalid, carboxin, fenfuram, fluopyram, flutolanil, fluxapyroxad, furametpyr, isofetamid, isopyrazam, mepronil, oxycarboxin, penflufen, penthiopyrad, sedaxane, tecloftalam, thifluzamide, N-(4'-trifluoromethylthiobiphenyl-2-yl)-3-difluoromethyl-1-methyl-1H-pyrazole-4-carboxamide, N-(2-(1,3,3-trimethyl-butyl)-phenyl)-1,3-dimethyl-5-fluoro-1H-pyrazole-4-carboxamide, 3-(difluoromethyl)-1-methyl-N-(1,1,3-trimethylindan-4-yl)pyrazole-4-carboxamide, 3-(trifluoromethyl)-1-methyl-N-(1,1,3-trimethylindan-4-yl)pyrazole-4-carboxamide, 1,3-dimethyl-N-(1,1,3-trimethylindan-4-yl)pyrazole-4-carboxamide, 3-(trifluoromethyl)-1,5-dimethyl-N-(1,1,3-trimethylindan-4-yl)pyrazole-4-carboxamide, 1,3,5-trimethyl-N-(1,1,3-trimethylindan-4-yl)pyrazole-4-carboxamide, N-(7-fluoro-1,1,3-trimethyl-indan-4-yl)-1,3-dimethyl-pyrazole-4-carboxamide, and N-[2-(2,4-dichlorophenyl)-2-methoxy-1-methyl-ethyl]-3-(difluoromethyl)-1-methyl-pyrazole-4-carboxamide; |
| F.I4 | Other respiration inhibitors: diflumetorim, (5,8-difluoroquinazolin-4-yl)-{2-[2-fluoro-4-(4-trifluoromethylpyridin-2-yloxy)-phenyl]-ethyl}-amine; nitrophenyl derivates: binapacryl, dinobuton, dinocap, fluazinam, ferimzone; organometal compounds: fentin-acetate, fentin chloride, and fentin hydroxide; ametoctradin; and silthiofam; |
| F.II | Sterol biosynthesis inhibitors: |
| F.II1 | C14 demethylase inhibitors: triazoles: azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, mefentrifluconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole, 1-[rel-(2S;3R)-3-(2-chlorophenyl)-2-(2,4-difluorophenyl)-oxiranylmethyl]-5-thiocyanato-1H-[1,2,4]triazolo, 2-[rel-(2S;3R)-3-(2-chlorophenyl)-2-(2,4-difluorophenyl)-oxiranyl-methyl]-2H-[1,2,4]triazole-3-thiol, 2-[2-chloro-4-(4-chlorophenoxy)phenyl]-1-(1,2,4-triazol-1-yl)pentan-2-ol, 1-[4-(4-chlorophenoxy)-2-(trifluoromethyl)phenyl]-1-cyclopropyl-2-(1,2,4-triazol-1-yl)ethanol, 2-[4-(4-chlorophenoxy)-2-(trifluoromethyl)phenyl]-1-(1,2,4-triazol-1-yl)butan-2-ol, 2-[2-chloro-4-(4-chlorophenoxy)phenyl]-1-(1,2,4-triazol-1-yl)butan-2-ol, 2-[4-(4-chlorophenoxy)-2-(trifluoromethyl)phenyl]-3-methyl-1-(1,2,4-triazol-1-yl)butan-2-ol, 2-[4-(4-chlorophenoxy)-2-(trifluoromethyl)phenyl]-1-(1,2,4-triazol-1-yl)propan-2-ol, 2-[2-chloro-4-(4-chlorophenoxy)phenyl]-3-methyl-1-(1,2,4-triazol-1-yl)butan-2-ol, 2-[4-(4-chlorophenoxy)-2-(trifluoromethyl)-phenyl]-1-(1,2,4-triazol-1-yl)pentan-2-ol, 2-[4-(4-fluorophenoxy)-2-(trifluoromethyl)-phenyl]-1-(1,2,4-triazol-1-yl)propan-2-ol, 2-[2-chloro-4-(4-chlorophenoxy)phenyl]-1-(1,2,4-triazol-1-yl)pent-3-yn-2-ol; imidazoles: imazalil, pefurazoate, prochloraz, |

| | |
|---|---|
| | triflumizol; pyrimidines, pyridines and piperazines: fenarimol, nuarimol, pyrifenox, triforine, and [3-(4-chloro-2-fluoro-phenyl)-5-(2,4-difluorophenyl)isoxazol-4-yl]-(3-pyridyl)methanol; |
| F.II2 | Delta14-reductase inhibitors: aldimorph, dodemorph, dodemorph-acetate, fenpropimorph, tridemorph, fenpropidin, piperalin, and spiroxamine; |
| F.II3 | Inhibitors of 3-keto reductase: fenhexamid; |
| F.III | Nucleic acid synthesis inhibitors |
| F.III1 | phenylamides or acyl amino acid fungicides: benalaxyl, benalaxyl-M, kiralaxyl, metalaxyl, metalaxyl-M (mefenoxam), ofurace, and oxadixyl; |
| F.III2 | others: hymexazole, octhilinone, oxolinic acid, bupirimate, 5-fluorocytosine, 5-fluoro-2-(p-tolylmethoxy)pyrimidin-4-amine, and 5-fluoro-2-(4-fluorophenyl-methoxy)pyrimidin-4-amine; |
| F.IV | Inhibitors of cell division and cytoskeleton |
| F.IV1 | tubulin inhibitors from the class of benzimidazoles, and thiophanates: benomyl, carbendazim, fuberidazole, thiabendazole, and thiophanate-methyl; triazolopyrimidines: 5-chloro-7-(4-methylpiperidin-1-yl)-6-(2,4,6-trifluorophenyl)-[1,2,4]triazolo[1,5-a]pyrimidine; and |
| F.IV2 | other cell division inhibitors: diethofencarb, ethaboxam, pencycuron, fluopicolide, zoxamide, metrafenone, pyriofenone; |
| F.V | Inhibitors of amino acid and protein synthesis: |
| F.V1 | methionine synthesis inhibitors from the class of anilino-pyrimidines: cyprodinil, mepanipyrim, and pyrimethanil; and |
| F.V2 | protein synthesis inhibitors: blasticidin-S, kasugamycin, kasugamycin hydrochloride-hydrate, mildiomycin, streptomycin, oxytetracyclin, polyoxine, and validamycin A; |
| F.VI | Signal transduction inhibitors: |
| F.VI1 | MAP/histidine kinase inhibitors: fluoroimid, iprodione, procymidone, vinclozolin, fenpiclonil, and fludioxonil; and |
| F.VI2 | G protein inhibitors: quinoxyfen; |
| F.VII | Lipid and membrane synthesis inhibitors: |
| F.VII1 | Phospholipid biosynthesis inhibitors: edifenphos, iprobenfos, pyrazophos, isoprothiolane; |
| F.VII2 | lipid peroxidation: dicloran, quintozene, tecnazene, tolclofos-methyl, biphenyl, chloroneb, and etridiazole; |
| F.VII3 | phospholipid biosynthesis and cell wall deposition: dimethomorph, flumorph, mandipropamid, pyrimorph, benthiavalicarb, iprovalicarb, valifenalate, and N-(1-(1-(4-cyano-phenyl)ethanesulfonyl)-but-2-yl) carbamic acid-(4-fluorophenyl) ester; |
| F.VII4 | compounds affecting cell membrane permeability and fatty acids: propamocarb; and |
| F.VII5 | fatty acid amide hydrolase inhibitors: oxathiapiprolin, 2-{3-[2-(1-{[3,5-bis(di-fluoromethyl-1H-pyrazol-1-yl]acetyl}piperidin-4-yl)-1,3-thiazol-4-yl]-4,5-dihydro-1,2-oxazol-5-yl}phenyl methanesulfonate, 2-{3-[2-(1-{[3,5-bis(difluoromethyl)-1H-pyrazol-1-yl]acetyl}piperidin-4-yl), and 1,3-thiazol-4-yl]-4,5-dihydro-1,2-oxazol-5-yl}-3-chlorophenyl methanesulfonate; |
| F.VIII | Inhibitors with Multi Site Action: |
| F.VIII1 | inorganic active substances: Bordeaux mixture, copper acetate, copper hydroxide, copper oxychloride, basic copper sulfate, and sulfur; |
| F.VIII2 | thio- and dithiocarbamates: ferbam, mancozeb, maneb, metam, metiram, propineb, thiram, zineb, and ziram; |
| F.VIII3 | organochlorine compounds from the class of phthalimides, sulfamides, and chloronitriles: anilazine, chlorothalonil, captafol, captan, folpet, dichlofluanid, dichlorophen, hexachlorobenzene, pentachlorphenole and its salts, phthalide, tolylfluanid, and N-(4-chloro-2-nitro-phenyl)-N-ethyl-4-methyl-benzenesulfonamide; and |
| F.VIII4 | guanidines and others: guanidine, dodine, dodine free base, guazatine, guazatine-acetate, iminoctadine, iminoctadine-triacetate, iminoctadine-tris(albesilate), dithianon, and 2,6-dimethyl-1H,5H-[1,4]dithiino[2,3-c:5,6-c']dipyrrole-1,3,5,7(2H,6H)-tetraone; |
| F.IX | Cell wall synthesis inhibitors: |
| F.IX1 | inhibitors of glucan synthesis: validamycin, and polyoxin B; |
| F.IX2 | melanin synthesis inhibitors: pyroquilon, tricyclazole, carpropamid, dicyclomet, and fenoxanil; |
| F.X | Plant defence inducers: |
| F.X1 | acibenzolar-S-methyl, probenazole, isotianil, tiadinil, prohexadione-calcium; |
| F.X2 | phosphonates: fosetyl, fosetyl-aluminum, phosphorous acid and its salts; potassium or sodium bicarbonate; and |
| F.XI | Unknown mode of action: bronopol, chinomethionat, cyflufenamid, cymoxanil, dazomet, debacarb, diclomezine, difenzoquat, difenzoquat-methylsulfate, diphenylamin, fenpyrazamine, flumetover, flusulfamide, flutianil, methasulfocarb, nitrapyrin, nitrothal-isopropyl, oxathiapiprolin, tolprocarb, oxin-copper, proquinazid, tebufloquin, tecloftalam, triazoxide, 2-butoxy-6-iodo-3-propylchromen-4-one, 2-[3,5-bis(difluoromethyl)-1H-pyrazol-1-yl]-1-[4-(4-{5-[2-(prop-2-yn-1-yloxy)phenyl]-4,5-dihydro-1,2-oxazol-3-yl}-1,3-thiazol-2-yl)piperidin-1-yl]ethanone, 2-[3,5-bis(difluoromethyl)-1H-pyrazol-1-yl]-1-[4-(4-{5-[2-fluoro-6-(prop-2-yn-1-yloxy)phenyl]-4,5-dihydro-1,2-oxazol-3-yl}-1,3-thiazol-2-yl)piperidin-1-yl]ethanone, 2-[3,5-bis(difluoromethyl)-1H-pyrazol-1-yl]-1-[4-(4-{5-[2-chloro-6-(prop-2-yn-1-yloxy)phenyl]-4,5-dihydro-1,2-oxazol-3-yl}-1,3-thiazol-2-yl)piperidin-1-yl]ethanone, N-(cyclopropylmethoxyimino-(6-difluoro- | methoxy-2,3-difluoro-phenyl)-methyl)-2-phenyl acetamide, N'-(4-(4-chloro-3-trifluoromethyl-phenoxy)-2,5-dimethyl-phenyl)-N-ethyl-N-methyl formamidine, N'-(4-(4-fluoro-3-trifluoromethyl-phenoxy)-2,5-dimethyl-phenyl)-N-ethyl-N-methyl formamidine, N'-(2-methyl-5-trifluoromethyl-4-(3-trimethylsilanyl-propoxy)-phenyl)-N-ethyl-N-methyl formamidine, N'-(5-difluoromethyl-2-methyl-4-(3-trimethylsilanyl-propoxy)-phenyl)-N-ethyl-N-methyl formamidine, methoxy-acetic acid 6-tert-butyl-8-fluoro-2,3-dimethyl-quinolin-4-yl ester, 3-[5-(4-methylphenyl)-2,3-dimethyl-isoxazolidin-3-yl]-pyridine, 3-[5-(4-chloro-phenyl)-2,3-dimethyl-isoxazolidin-3-yl]-pyridine (pyrisoxazole), N-(6-methoxy-pyridin-3-yl) cyclopropanecarboxylic acid amide, 5-chloro-1-(4,6-dimethoxy-pyrimidin-2-yl)-2-methyl-1H-benzoimidazole, 2-(4-chloro-phenyl)-N-[4-(3,4-dimethoxy-phenyl)-isoxazol-5-yl]-2-prop-2-ynyloxy-acetamide, ethyl (Z)-3-amino-2-cyano-3-phenyl-prop-2-enoate, picarbutrazox, pentyl N-[6-[[(Z)-[(1-methyltetrazol-5-yl)-phenyl-methylene]amino]oxymethyl]-2-pyridyl]carbamate, 2-[2-[(7,8-difluoro-2-methyl-3-quinolyl)oxy]-6-fluoro-phenyl]propan-2-ol, 2-[2-fluoro-6-[(8-fluoro-2-methyl-3-quinolyl)oxy]phen-yl]propan-2-ol, 3-(5-fluoro-3,3,4,4-tetramethyl-3,4-dihydroisoquinolin-1-yl)quinoline, 3-(4,4-difluoro-3,3-dimethyl-3,4-dihydroisoquinolin-1-yl)quinoline, 3-(4,4,5-trifluoro-3,3-dimethyl-3,4-dihydroisoquinolin-1-yl)quinoline, and 9-fluoro-2,2-dimethyl-5-(3-quinolyl)-3H-1,4-benzoxazepine.

Every letter (M, B, F) of the above listed components C as well as every combination of a letter and a number (e.g. M.1 or M.1A) is regarded as one group. Every pesticidal mixture comprising *Bacillus amyloliquefaciens* ssp. *plantarum* strain MBI600 (component A) and cis-jasmone (component B) and one group of components C as defined above, is regarded as one embodiment of the invention.

In one embodiment, the pesticidal mixture comprises *Bacillus amyloliquefaciens* ssp. *plantarum* strain MBI600 (component A) and cis-jasmone (component B) and at least one component C selected from the components selected from the groups M, L and F.

In one embodiment, component C is selected from the groups M.1 to M.29. In another embodiment, the pesticidal mixtures comprise a component C selected from the groups M.1 to M.29, and a component C selected from the groups F.I to F.XI. In yet another embodiment, component C is selected from the groups F.1 to F.XI. In yet another embodiment, component C is selected from acetamiprid, clothianidin, cycloxaprid, dinotefuran, imidacloprid, nitenpyram, thiacloprid, and thiamethoxam. In yet another embodiment, component C is selected from ethiprole, fipronil, flufiprole, pyrafluprole and pyriprole. In yet another embodiment, component C is selected from acrinathrin, allethrin, d-cis-trans allethrin, d-trans allethrin, bifenthrin, bioallethrin, bioallethrin S-cylclopentenyl, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin, deltamethrin, empenthrin, esfenvalerate, etofenprox, fenpropathrin, fenvalerate, flucythrinate, flumethrin, tau-fluvalinate, halfenprox, heptafluthrin, imiprothrin, meperfluthrin, metofluthrin, momfluorothrin, permethrin, phenothrin, prallethrin, profluthrin, pyrethrin (pyrethrum), resmethrin, silafluofen, tefluthrin, tetramethylfluthrin, tetramethrin, tralomethrin, and transfluthrin. In yet another embodiment, component C comprises at least one compound selected from azoxystrobin, coumethoxystrobin, coumoxystrobin, dimoxystrobin, enestroburin, fenaminstrobin, fenoxystrobin/flufenoxystrobin, fluoxastrobin, kresoxim-methyl, mandestrobin, metominostrobin, orysastrobin, picoxystrobin, pyraclostrobin, pyrametostrobin, pyraoxystrobin, trifloxystrobin, pyribencarb, triclopyricarb/chlorodincarb, famoxadone, and fenamidone.

In yet another embodiment, component C is selected from benodanil, benzovindiflupyr, bixafen, boscalid, carboxin, fenfuram, fluopyram, flutolanil, fluxapyroxad, furametpyr, isofetamid, isopyrazam, mepronil, oxycarboxin, penflufen, penthiopyrad, sedaxane, tecloftalam, and thifluzamide. In yet another embodiment, component C is selected from diflumetorim, binapacryl, dinobuton, dinocap, fluazinam, ferimzone, fentin-acetate, fentin chloride, fentin hydroxide, ametoctradin, and silthiofam. In yet another embodiment, component C is selected from azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole, imazalil, pefurazoate, prochloraz, triflumizol, fenarimol, nuarimol, pyrifenox, and triforine. In yet another embodiment, component C is selected from aldimorph, dodemorph, dodemorph-acetate, fenpropimorph, tridemorph, fenpropidin, piperalin, and spiroxamine. In yet another embodiment, component C is fenhexamid. In yet another embodiment, component C is selected from benalaxyl, benalaxyl-M, kiralaxyl, metalaxyl, metalaxyl-M (mefenoxam), ofurace, and oxadixyl. In yet another embodiment, component C is selected from benomyl, carbendazim, fuberidazole, thiabendazole, and thiophanatemethyl. In yet another embodiment, component C is selected from cyprodinil, mepanipyrim, and pyrimethanil. In yet another embodiment, component C is selected from fluoroimid, iprodione, procymidone, vinclozolin, fenpiclonil, and fludioxonil.

In yet another embodiment, component C is selected from ferbam, mancozeb, maneb, metam, metiram, propineb, thiram, zineb, and ziram. In yet another embodiment, component C is selected from anilazine, chlorothalonil, captafol, captan, folpet, dichlofluanid, dichlorophen, hexachlorobenzene, pentachlorphenole and its salts, and phthalide. In yet another embodiment, component C comprises is selected from pyroquilon, tricyclazole, carpropamid, dicyclomet, and fenoxanil. In yet another embodiment, component C is selected from thiamethoxam, imidacloprid, clothianidin, metalaxyl, pyraclostrobin, fluxapyroxad, prothioconazole, penflufen, trifloxystrobin, sedaxane, azoxystrobin, abamectin, and azoxystrobin. In yet another embodiment, component C is selected from clothianidin, thiamethoxam, acetamiprid, imidacloprid, tefluthrin, bifenthrin, fipronil, thiodicarb, cyazypyr, rynaxapyr; and/or sedaxane, penflufen, fluopyram, fluxypyroxad, azoxystrobin, trifloxystrobin, pyraclostrobin, oxathiapiprolin, metalaxyl, metalaxyl-M, ethaboxam, dimethomorph, prothioconazole, thiabendazole, ipconazole, triticonazole, fludioxinil, and thiophanate methyl.

In one embodiment, component C is selected from the group consisting of carbofuran, oxamyl, thiodicarb, fipronil, bifenthrin, cyfluthrin, beta-cyfluthrin, alpha-cypermethrin, tefluthrin, acetamiprid, clothianidin, imidacloprid, thiacloprid, thiamethoxam, abamectin, Bt crop proteins: Cry1Ab, Cry1Ac, Cry1Fa, Cry2Ab, mCry3A, Cry3Ab, Cry3Bb, Cry34/35Ab1, chlorantraniliprole, cyantraniliprole, tetraniliprole, broflanilide, fluopyram, sulfoxaflor, tioxazafen, triflumezopyrim, *Bacillus firmus, Pasteuria* spp., *P. nishizawae, P. penetrans, Rhizobium leguminosarum* bv. *phaseoli, R. l.* bv. *trifolii, R. l.* bv. *viciae, R. tropici*, azoxystrobin, pyraclostrobin, trifloxystrobin, fluopyram, fluxapyroxad, penflufen, sedaxane, fluazinam, difenoconazole, ipconazole, prothioconazole, tebuconazole, triticonazole, metalaxyl, metalaxyl-M (mefenoxam), thiabendazole, fludioxonil and oxathiapiprolin.

In one embodiment, component C is selected from the group consisting of cyclaniliprole, carbofuran, oxamyl, thiodicarb, fipronil, bifenthrin, cyfluthrin, beta-cyfluthrin, alpha-cypermethrin, tefluthrin, acetamiprid, clothianidin, imidacloprid, thiacloprid, thiamethoxam, abamectin, chlorantraniliprole, cyantraniliprole, tetraniliprole, broflanilide, sulfoxaflor, tioxazafen, triflumezopyrim and the *Bacillus thuringiensis* proteins Cry1Ab, Cry1Ac, Cry1Fa, Cry2Ab, mCry3A, Cry3Ab, Cry3Bb and Cry34/35Ab1.

In one embodiment, component C is selected from the group consisting of *Bacillus firmus, Pasteuria nishizawae, Pasteuria penetrans, Rhizobium leguminosarum* bv. *phaseoli, Rhizobium leguminosarum* bv. *trifolii, Rhizobium leguminosarum* bv. *viciae, Burkholderia* spp. and *Rhizobium tropici*.

In one embodiment, component C is selected from the group consisting of azoxystrobin, pyraclostrobin, trifloxystrobin, fluopyram, fluxapyroxad, penflufen, sedaxane, fluazinam, difenoconazole, ipconazole, prothioconazole, tebuconazole, triticonazole, metalaxyl, metalaxyl-M (mefenoxam), mefentrifluconazole, thiabendazole, fludioxonil, benzovindiflupyr, picarbutrazox, ethaboxam, pydiflumetofen, fenpicoxamid, thiophanate-methyl, myclobutanil and oxathiapiprolin.

In one embodiment, component C is selected from the group M.1A. In one embodiment, component C is selected from the group M.2B. In one embodiment, component C is selected from the group M.3A. In one embodiment, component C is selected from the group M.4A. In one embodiment, component C is selected from the group M.6. In one embodiment, component C is selected from the group M.11. In one embodiment, component C is selected from the group M.28. In one embodiment, component C is selected from the group M.29.

In one embodiment, component C is selected from the group L.3. In one embodiment, component C is selected from the group L.5.

In one embodiment, component C is selected from the group F.I1. In one embodiment, component C is selected from the group F.I3. In one embodiment, component C is selected from the group F.I4. In one embodiment, component C is selected from the group F.II1. In one embodiment, component C is selected from the group F.III1. In one embodiment, component C is selected from the group F.IV1. In one embodiment, component C is selected from the group F.VI1. In one embodiment, component C is selected from the group F.VII5.

The term "component" and "compound" are interchangeable.

In one embodiment, the pesticidal mixtures comprise a pesticidal mixture I-1 to I-8 and a component C selected from Table B.

The components C in Table B are referred to as components N-1 to N-42, and O-1 to O-42. In one embodiment, the components C in Table B are referred to as components N-1 to N-29, and O-1 to O-36 according to the corresponding row in Table B. In another embodiment, the components C in Table B are referred to as components N-30 to N-42, and O-37 to O-42 according to the corresponding row in Table B.

In another embodiment, the pesticidal mixtures comprise the pesticidal mixture I-1 and a component C selected from Table B. In yet another embodiment, the pesticidal mixtures comprise the pesticidal mixture I-2 and a component C selected from Table B. In yet another embodiment, the pesticidal mixtures comprise the pesticidal mixture I-3 and a component C selected from Table B. In yet another embodiment, the pesticidal mixtures comprise the pesticidal mixture I-4 and a component C selected from Table B. In yet another embodiment, the pesticidal mixtures comprise the pesticidal mixture I-5 and a component C selected from Table B. In yet another embodiment, the pesticidal mixtures comprise the pesticidal mixture I-6 and a component C selected from Table B. In yet another embodiment, the pesticidal mixtures comprise the pesticidal mixture I-7 and a component C selected from Table B. In yet another embodiment, the pesticidal mixtures comprise the pesticidal mixture I-8 and a component C selected from Table B.

In one embodiment, the pesticidal mixtures comprise, as active components, *Bacillus amyloliquefaciens* ssp. *plantarum* strain MB1600 (component A) and cis-jasmone (component B) in synergistically effective amounts and one component C selected from Table B.

TABLE B

| No. | Component C |
|---|---|
| N-1 | Fipronil |
| N-2 | Clothianidin |
| N-3 | Thiamethoxam |
| N-4 | Acetamiprid |
| N-5 | Dinotefuran |
| N-6 | Imidacloprid |
| N-7 | Thiacloprid |
| N-8 | Flupyradifurone |
| N-9 | Sulfoxaflor |
| N-10 | Methiocarb |
| N-11 | Tefluthrin |
| N-12 | Bifenthrin |
| N-13 | Cypermethrin |
| N-14 | Alphacypermethrin |
| N-15 | Spinosad |
| N-16 | Cyantraniliprole (=Cyazypyr ®) |
| N-17 | Chlorantraniliprole (=Rynaxypyr ®) |
| N-18 | Thiodicarb |
| N-19 | Triflumezopyrim |
| N-20 | Acephate |
| N-21 | Chlorpyriphos |
| N-22 | Abamectin |
| N-23 | Triflumezopyrim |
| N-24 | Tetraniliprole |
| N-25 | Cyclaniliprole |
| N-26 | *Bacillus firmus* |
| N-27 | Tioxazafen |
| N-28 | *Pasteuria nishizawae* |
| N-29 | *Flavobacterium* sp. H492 |
| N-30 | Carbofuran |
| N-31 | Oxamyl |
| N-32 | Cyfluthrin |

TABLE B-continued

| No. | Component C |
|---|---|
| N-33 | Beta-cyfluthrin |
| N-34 | Alpha-cypermethrin |
| N-35 | Acetamiprid |
| N-36 | Broflanilide |
| N-37 | *Pasteuria penetrans* |
| N-38 | *Rhizobium leguminosarum* bv. *phaseoli* |
| N-39 | *Rhizobium leguminosarum* bv. *trifolii* |
| N-40 | *Rhizobium leguminosarum* bv. *viciae* |
| N-41 | *Burkholderia* spp. |
| N-42 | *Rhizobium tropici* |
| O-1 | Azoxystrobin |
| O-2 | Trifloxystrobin |
| O-3 | Picoxystrobin |
| O-4 | Pyraclostrobin |
| O-5 | Sedaxane |
| O-6 | Penthiocarb |
| O-7 | Penflufen |
| O-8 | Fluopyram |
| O-9 | Fluxapyroxad |
| O-10 | Boscalid |
| O-11 | Oxathiapiprolin |
| O-12 | Metalaxyl |
| O-13 | Metalaxyl-M (mefenoxam) |
| O-14 | Ethaboxam |
| O-15 | Valifenalate |
| O-16 | Dimethomorph |
| O-17 | Cyproconazole |
| O-18 | Difenoconazole |
| O-19 | Prothioconazole |
| O-20 | Flutriafol |
| O-21 | Thiabendazole |
| O-22 | Ipconazole |
| O-23 | Tebuconazole |
| O-24 | Triadimenol |
| O-25 | Prochloraz |
| O-26 | Fluquinconazole |
| O-27 | Triticonazole |
| O-28 | Fludioxinil |
| O-29 | Carboxin |
| O-30 | Silthiofarm |
| O-31 | Ziram |
| O-32 | Thiram |
| O-33 | Carbendazim |
| O-34 | Thiophanate-methyl |
| O-35 | Fluazinam |
| O-36 | Fenamidon |
| O-37 | Mefentrifluconazole |
| O-38 | Benzovindiflupyr |
| O-39 | Picarbutrazox |
| O-40 | Pydiflumetofen |
| O-41 | Fenpicoxamid |
| O-42 | Myclobutanil |

In one embodiment, mixtures are applied as laid down in Table T comprising the pesticidal mixture I-5 as defined in Table A comprising as active components, *Bacillus amyloliquefaciens* ssp. *plantarum* strain MBI600 (component A) and cis-jasmone (component B) in synergistically effective amounts and in addition one component C selected from Table B.

In one embodiment, mixtures are applied as laid down in Table T consisting of *Bacillus amyloliquefaciens* ssp. *plantarum* strain MBI600 (component A) and cis-jasmone (component B) in synergistically effective amounts and in addition one component C selected from Table B.

TABLE T (Mix. = Mixture; Comp. = Component)

| Mix. No. | Mix. A + B | Comp. C |
|---|---|---|
| T-1 | I-5 | N-1 |
| T-2 | I-5 | N-2 |
| T-3 | I-5 | N-3 |
| T-4 | I-5 | N-4 |
| T-5 | I-5 | N-5 |
| T-6 | I-5 | N-6 |
| T-7 | I-5 | N-7 |
| T-8 | I-5 | N-8 |
| T-9 | I-5 | N-9 |
| T-10 | I-5 | N-10 |
| T-11 | I-5 | N-11 |
| T-12 | I-5 | N-12 |
| T-13 | I-5 | N-13 |
| T-14 | I-5 | N-14 |
| T-15 | I-5 | N-15 |
| T-16 | I-5 | N-16 |
| T-17 | I-5 | N-17 |
| T-18 | I-5 | N-18 |
| T-19 | I-5 | N-19 |
| T-20 | I-5 | N-20 |
| T-21 | I-5 | N-21 |
| T-22 | I-5 | N-22 |
| T-23 | I-5 | N-23 |
| T-24 | I-5 | N-24 |
| T-25 | I-5 | N-25 |
| T-26 | I-5 | N-26 |
| T-27 | I-5 | N-27 |
| T-28 | I-5 | N-28 |
| T-29 | I-5 | N-29 |
| T-30 | I-5 | N-30 |
| T-31 | I-5 | N-31 |
| T-32 | I-5 | N-32 |
| T-33 | I-5 | N-33 |
| T-34 | I-5 | N-34 |
| T-35 | I-5 | N-35 |
| T-36 | I-5 | N-36 |
| T-37 | I-5 | N-37 |
| T-38 | I-5 | N-38 |
| T-39 | I-5 | N-39 |
| T-40 | I-5 | N-40 |
| T-41 | I-5 | N-41 |
| T-42 | I-5 | N-42 |
| T-43 | I-5 | O-1 |
| T-44 | I-5 | O-2 |
| T-45 | I-5 | O-3 |
| T-46 | I-5 | O-4 |
| T-47 | I-5 | O-5 |
| T-48 | I-5 | O-6 |
| T-49 | I-5 | O-7 |
| T-50 | I-5 | O-8 |
| T-51 | I-5 | O-9 |
| T-52 | I-5 | O-10 |
| T-53 | I-5 | O-11 |
| T-54 | I-5 | O-12 |
| T-55 | I-5 | O-13 |
| T-56 | I-5 | O-14 |
| T-57 | I-5 | O-15 |
| T-58 | I-5 | O-16 |
| T-59 | I-5 | O-17 |
| T-60 | I-5 | O-18 |
| T-61 | I-5 | O-19 |
| T-62 | I-5 | O-20 |
| T-63 | I-5 | O-21 |
| T-64 | I-5 | O-22 |
| T-65 | I-5 | O-23 |
| T-66 | I-5 | O-24 |
| T-67 | I-5 | O-25 |
| T-68 | I-5 | O-26 |
| T-69 | I-5 | O-27 |
| T-70 | I-5 | O-28 |
| T-71 | I-5 | O-29 |
| T-72 | I-5 | O-30 |
| T-73 | I-5 | O-31 |
| T-74 | I-5 | O-32 |
| T-75 | I-5 | O-33 |
| T-76 | I-5 | O-34 |
| T-77 | I-5 | O-35 |
| T-78 | I-5 | O-36 |

TABLE T-continued (Mix. = Mixture; Comp. = Component)

| Mix. No. | Mix. A + B | Comp. C |
|---|---|---|
| T-79 | I-5 | O-37 |
| T-80 | I-5 | O-38 |
| T-81 | I-5 | O-39 |
| T-82 | I-5 | O-40 |
| T-83 | I-5 | O-41 |
| T-84 | I-5 | O-42 |

In one embodiment, the mixtures of Table T comprise one further component C as laid down in Table B. In one embodiment, the mixtures of Table T comprise two further components C as laid down in Table B. In one embodiment, the mixtures of Table T comprise at least three further components C as laid down in Table B.

In one embodiment, the invention relates to mixtures as laid down in Tables Q comprising the pesticidal mixture I-5 as defined in Table A comprising as active components, *Bacillus amyloliquefaciens* ssp. *plantarum* strain MBI600 (component A) and cis-jasmone (component B) in synergistically effective amounts and in addition two components C selected from Table B.

In one embodiment, the invention relates to mixtures as laid down in Tables Q consisting of *Bacillus amyloliquefaciens* ssp. *plantarum* strain MBI600 (component A) and cis-jasmone (component B) in synergistically effective amounts and in addition two components C selected from Table B.

In one embodiment, these mixtures as defined in Tables Q-1 to Q-168 comprise a specific mixture as defined in Table T and a further component C selected from the components defined in Table B.

In one embodiment, these mixtures as defined in Tables Q-1 to Q-168 consist of a specific mixture as defined in Table T and a further component C selected from the components defined in Table B.

Tables Q:

Table Q-1: Pesticidal mixtures comprising T-1 and a further component C selected from N-1 to N-42 as described in Table B.

Table Q-2: Pesticidal mixtures comprising T-2 and a further component C selected from N-1 to N-42 as described in Table B.

Table Q-3: Pesticidal mixtures comprising T-3 and a further component C selected from N-1 to N-42 as described in Table B.

Table Q-4: Pesticidal mixtures comprising T-4 and a further component C selected from N-1 to N-42 as described in Table B.

Table Q-5: Pesticidal mixtures comprising T-5 and a further component C selected from N-1 to N-42 as described in Table B.

Table Q-6: Pesticidal mixtures comprising T-6 and a further component C selected from N-1 to N-42 as described in Table B.

Table Q-7: Pesticidal mixtures comprising T-7 and a further component C selected from N-1 to N-42 as described in Table B.

Table Q-8: Pesticidal mixtures comprising T-8 and a further component C selected from N-1 to N-42 as described in Table B.

Table Q-9: Pesticidal mixtures comprising T-9 and a further component C selected from N-1 to N-42 as described in Table B.

Table Q-10: Pesticidal mixtures comprising T-10 and a further component C selected from N-1 to N-42 as described in Table B.

Table Q-11: Pesticidal mixtures comprising T-11 and a further component C selected from N-1 to N-42 as described in Table B.

Table Q-12: Pesticidal mixtures comprising T-12 and a further component C selected from N-1 to N-42 as described in Table B.

Table Q-13: Pesticidal mixtures comprising T-13 and a further component C selected from N-1 to N-42 as described in Table B.

Table Q-14: Pesticidal mixtures comprising T-14 and a further component C selected from N-1 to N-42 as described in Table B.

Table Q-15: Pesticidal mixtures comprising T-15 and a further component C selected from N-1 to N-42 as described in Table B.

Table Q-16: Pesticidal mixtures comprising T-16 and a further component C selected from N-1 to N-42 as described in Table B.

Table Q-17: Pesticidal mixtures comprising T-17 and a further component C selected from N-1 to N-42 as described in Table B.

Table Q-18: Pesticidal mixtures comprising T-18 and a further component C selected from N-1 to N-42 as described in Table B.

Table Q-19: Pesticidal mixtures comprising T-19 and a further component C selected from N-1 to N-42 as described in Table B.

Table Q-20: Pesticidal mixtures comprising T-20 and a further component C selected from N-1 to N-42 as described in Table B.

Table Q-21: Pesticidal mixtures comprising T-21 and a further component C selected from N-1 to N-42 as described in Table B.

Table Q-22: Pesticidal mixtures comprising T-22 and a further component C selected from N-1 to N-42 as described in Table B.

Table Q-23: Pesticidal mixtures comprising T-23 and a further component C selected from N-1 to N-42 as described in Table B.

Table Q-24: Pesticidal mixtures comprising T-24 and a further component C selected from N-1 to N-42 as described in Table B.

Table Q-25: Pesticidal mixtures comprising T-25 and a further component C selected from N-1 to N-42 as described in Table B.

Table Q-26: Pesticidal mixtures comprising T-26 and a further component C selected from N-1 to N-42 as described in Table B.

Table Q-27: Pesticidal mixtures comprising T-27 and a further component C selected from N-1 to N-42 as described in Table B.

Table Q-28: Pesticidal mixtures comprising T-28 and a further component C selected from N-1 to N-42 as described in Table B.

Table Q-29: Pesticidal mixtures comprising T-29 and a further component C selected from N-1 to N-42 as described in Table B.

Table Q-30: Pesticidal mixtures comprising T-30 and a further component C selected from N-1 to N-42 as described in Table B.

Table Q-31: Pesticidal mixtures comprising T-31 and a further component C selected from N-1 to N-42 as described in Table B.

Table Q-32: Pesticidal mixtures comprising T-32 and a further component C selected from N-1 to N-42 as described in Table B.
Table Q-33: Pesticidal mixtures comprising T-33 and a further component C selected from N-1 to N-42 as described in Table B.
Table Q-34: Pesticidal mixtures comprising T-34 and a further component C selected from N-1 to N-42 as described in Table B.
Table Q-35: Pesticidal mixtures comprising T-35 and a further component C selected from N-1 to N-42 as described in Table B.
Table Q-36: Pesticidal mixtures comprising T-36 and a further component C selected from N-1 to N-42 as described in Table B.
Table Q-37: Pesticidal mixtures comprising T-37 and a further component C selected from N-1 to N-42 as described in Table B.
Table Q-38: Pesticidal mixtures comprising T-38 and a further component C selected from N-1 to N-42 as described in Table B.
Table Q-39: Pesticidal mixtures comprising T-39 and a further component C selected from N-1 to N-42 as described in Table B.
Table Q-40: Pesticidal mixtures comprising T-40 and a further component C selected from N-1 to N-42 as described in Table B.
Table Q-41: Pesticidal mixtures comprising T-41 and a further component C selected from N-1 to N-42 as described in Table B.
Table Q-42: Pesticidal mixtures comprising T-42 and a further component C selected from N-1 to N-42 as described in Table B.
Table Q-43: Pesticidal mixtures comprising T-43 and a further component C selected from N-1 to N-42 as described in Table B.
Table Q-44: Pesticidal mixtures comprising T-44 and a further component C selected from N-1 to N-42 as described in Table B.
Table Q-45: Pesticidal mixtures comprising T-45 and a further component C selected from N-1 to N-42 as described in Table B.
Table Q-46: Pesticidal mixtures comprising T-46 and a further component C selected from N-1 to N-42 as described in Table B.
Table Q-47: Pesticidal mixtures comprising T-47 and a further component C selected from N-1 to N-42 as described in Table B.
Table Q-48: Pesticidal mixtures comprising T-48 and a further component C selected from N-1 to N-42 as described in Table B.
Table Q-49: Pesticidal mixtures comprising T-49 and a further component C selected from N-1 to N-42 as described in Table B.
Table Q-50: Pesticidal mixtures comprising T-50 and a further component C selected from N-1 to N-42 as described in Table B.
Table Q-51: Pesticidal mixtures comprising T-51 and a further component C selected from N-1 to N-42 as described in Table B.
Table Q-52: Pesticidal mixtures comprising T-52 and a further component C selected from N-1 to N-42 as described in Table B.
Table Q-53: Pesticidal mixtures comprising T-53 and a further component C selected from N-1 to N-42 as described in Table B.
Table Q-54: Pesticidal mixtures comprising T-54 and a further component C selected from N-1 to N-42 as described in Table B.
Table Q-55: Pesticidal mixtures comprising T-55 and a further component C selected from N-1 to N-42 as described in Table B.
Table Q-56: Pesticidal mixtures comprising T-56 and a further component C selected from N-1 to N-42 as described in Table B.
Table Q-57: Pesticidal mixtures comprising T-57 and a further component C selected from N-1 to N-42 as described in Table B.
Table Q-58: Pesticidal mixtures comprising T-58 and a further component C selected from N-1 to N-42 as described in Table B.
Table Q-59: Pesticidal mixtures comprising T-59 and a further component C selected from N-1 to N-42 as described in Table B.
Table Q-60: Pesticidal mixtures comprising T-60 and a further component C selected from N-1 to N-42 as described in Table B.
Table Q-61: Pesticidal mixtures comprising T-61 and a further component C selected from N-1 to N-42 as described in Table B.
Table Q-62: Pesticidal mixtures comprising T-62 and a further component C selected from N-1 to N-42 as described in Table B.
Table Q-63: Pesticidal mixtures comprising T-63 and a further component C selected from N-1 to N-42 as described in Table B.
Table Q-64: Pesticidal mixtures comprising T-64 and a further component C selected from N-1 to N-42 as described in Table B.
Table Q-65: Pesticidal mixtures comprising T-65 and a further component C selected from N-1 to N-42 as described in Table B.
Table Q-66: Pesticidal mixtures comprising T-66 and a further component C selected from N-1 to N-42 as described in Table B.
Table Q-67: Pesticidal mixtures comprising T-67 and a further component C selected from N-1 to N-42 as described in Table B.
Table Q-68: Pesticidal mixtures comprising T-68 and a further component C selected from N-1 to N-42 as described in Table B.
Table Q-69: Pesticidal mixtures comprising T-69 and a further component C selected from N-1 to N-42 as described in Table B.
Table Q-70: Pesticidal mixtures comprising T-70 and a further component C selected from N-1 to N-42 as described in Table B.
Table Q-71: Pesticidal mixtures comprising T-71 and a further component C selected from N-1 to N-42 as described in Table B.
Table Q-72: Pesticidal mixtures comprising T-72 and a further component C selected from N-1 to N-42 as described in Table B.
Table Q-73: Pesticidal mixtures comprising T-73 and a further component C selected from N-1 to N-42 as described in Table B.
Table Q-74: Pesticidal mixtures comprising T-74 and a further component C selected from N-1 to N-42 as described in Table B.
Table Q-75: Pesticidal mixtures comprising T-75 and a further component C selected from N-1 to N-42 as described in Table B.

Table Q-76: Pesticidal mixtures comprising T-76 and a further component C selected from N-1 to N-42 as described in Table B.
Table Q-77: Pesticidal mixtures comprising T-77 and a further component C selected from N-1 to N-42 as described in Table B.
Table Q-78: Pesticidal mixtures comprising T-78 and a further component C selected from N-1 to N-42 as described in Table B.
Table Q-79: Pesticidal mixtures comprising T-79 and a further component C selected from N-1 to N-42 as described in Table B.
Table Q-80: Pesticidal mixtures comprising T-80 and a further component C selected from N-1 to N-42 as described in Table B.
Table Q-81: Pesticidal mixtures comprising T-81 and a further component C selected from N-1 to N-42 as described in Table B.
Table Q-82: Pesticidal mixtures comprising T-82 and a further component C selected from N-1 to N-42 as described in Table B.
Table Q-83: Pesticidal mixtures comprising T-83 and a further component C selected from N-1 to N-42 as described in Table B.
Table Q-84: Pesticidal mixtures comprising T-84 and a further component C selected from N-1 to N-42 as described in Table B.
Table Q-85: Pesticidal mixtures comprising T-1 and a further component C selected from O-1 to O-42 as described in Table B.
Table Q-86: Pesticidal mixtures comprising T-2 and a further component C selected from O-1 to O-42 as described in Table B.
Table Q-87: Pesticidal mixtures comprising T-3 and a further component C selected from O-1 to O-42 as described in Table B.
Table Q-88: Pesticidal mixtures comprising T-4 and a further component C selected from O-1 to O-42 as described in Table B.
Table Q-89: Pesticidal mixtures comprising T-5 and a further component C selected from O-1 to O-42 as described in Table B.
Table Q-90: Pesticidal mixtures comprising T-6 and a further component C selected from O-1 to O-42 as described in Table B.
Table Q-91: Pesticidal mixtures comprising T-7 and a further component C selected from O-1 to O-42 as described in Table B.
Table Q-92: Pesticidal mixtures comprising T-8 and a further component C selected from O-1 to O-42 as described in Table B.
Table Q-93: Pesticidal mixtures comprising T-9 and a further component C selected from O-1 to O-42 as described in Table B.
Table Q-94: Pesticidal mixtures comprising T-10 and a further component C selected from O-1 to O-42 as described in Table B.
Table Q-95: Pesticidal mixtures comprising T-11 and a further component C selected from O-1 to O-42 as described in Table B.
Table Q-96: Pesticidal mixtures comprising T-12 and a further component C selected from O-1 to O-42 as described in Table B.
Table Q-97: Pesticidal mixtures comprising T-13 and a further component C selected from O-1 to O-42 as described in Table B.
Table Q-98: Pesticidal mixtures comprising T-14 and a further component C selected from O-1 to O-42 as described in Table B.
Table Q-99: Pesticidal mixtures comprising T-15 and a further component C selected from O-1 to O-42 as described in Table B.
Table Q-100: Pesticidal mixtures comprising T-16 and a further component C selected from O-1 to O-42 as described in Table B.
Table Q-101: Pesticidal mixtures comprising T-17 and a further component C selected from O-1 to O-42 as described in Table B.
Table Q-102: Pesticidal mixtures comprising T-18 and a further component C selected from O-1 to O-42 as described in Table B.
Table Q-103: Pesticidal mixtures comprising T-19 and a further component C selected from O-1 to O-42 as described in Table B.
Table Q-104: Pesticidal mixtures comprising T-20 and a further component C selected from O-1 to O-42 as described in Table B.
Table Q-105: Pesticidal mixtures comprising T-21 and a further component C selected from O-1 to O-42 as described in Table B.
Table Q-106: Pesticidal mixtures comprising T-22 and a further component C selected from O-1 to O-42 as described in Table B.
Table Q-107: Pesticidal mixtures comprising T-23 and a further component C selected from O-1 to O-42 as described in Table B.
Table Q-108: Pesticidal mixtures comprising T-24 and a further component C selected from O-1 to O-42 as described in Table B.
Table Q-109: Pesticidal mixtures comprising T-25 and a further component C selected from O-1 to O-42 as described in Table B.
Table Q-110: Pesticidal mixtures comprising T-26 and a further component C selected from O-1 to O-42 as described in Table B.
Table Q-111: Pesticidal mixtures comprising T-27 and a further component C selected from O-1 to O-42 as described in Table B.
Table Q-112: Pesticidal mixtures comprising T-28 and a further component C selected from O-1 to O-42 as described in Table B.
Table Q-113: Pesticidal mixtures comprising T-29 and a further component C selected from O-1 to O-42 as described in Table B.
Table Q-114: Pesticidal mixtures comprising T-30 and a further component C selected from O-1 to O-42 as described in Table B.
Table Q-115: Pesticidal mixtures comprising T-31 and a further component C selected from O-1 to O-42 as described in Table B.
Table Q-116: Pesticidal mixtures comprising T-32 and a further component C selected from O-1 to O-42 as described in Table B.
Table Q-117: Pesticidal mixtures comprising T-33 and a further component C selected from O-1 to O-42 as described in Table B.
Table Q-118: Pesticidal mixtures comprising T-34 and a further component C selected from O-1 to O-42 as described in Table B.
Table Q-119: Pesticidal mixtures comprising T-35 and a further component C selected from O-1 to O-42 as described in Table B.

Table Q-120: Pesticidal mixtures comprising T-36 and a further component C selected from O-1 to O-42 as described in Table B.
Table Q-121: Pesticidal mixtures comprising T-37 and a further component C selected from O-1 to O-42 as described in Table B.
Table Q-122: Pesticidal mixtures comprising T-38 and a further component C selected from O-1 to O-42 as described in Table B.
Table Q-123: Pesticidal mixtures comprising T-39 and a further component C selected from O-1 to O-42 as described in Table B.
Table Q-124: Pesticidal mixtures comprising T-40 and a further component C selected from O-1 to O-42 as described in Table B.
Table Q-125: Pesticidal mixtures comprising T-41 and a further component C selected from O-1 to O-42 as described in Table B.
Table Q-126: Pesticidal mixtures comprising T-42 and a further component C selected from O-1 to O-42 as described in Table B.
Table Q-127: Pesticidal mixtures comprising T-43 and a further component C selected from O-1 to O-42 as described in Table B.
Table Q-128: Pesticidal mixtures comprising T-44 and a further component C selected from O-1 to O-42 as described in Table B.
Table Q-129: Pesticidal mixtures comprising T-45 and a further component C selected from O-1 to O-42 as described in Table B.
Table Q-130: Pesticidal mixtures comprising T-46 and a further component C selected from O-1 to O-42 as described in Table B.
Table Q-131: Pesticidal mixtures comprising T-47 and a further component C selected from O-1 to O-42 as described in Table B.
Table Q-132: Pesticidal mixtures comprising T-48 and a further component C selected from O-1 to O-42 as described in Table B.
Table Q-133: Pesticidal mixtures comprising T-49 and a further component C selected from O-1 to O-42 as described in Table B.
Table Q-134: Pesticidal mixtures comprising T-50 and a further component C selected from O-1 to O-42 as described in Table B.
Table Q-135: Pesticidal mixtures comprising T-51 and a further component C selected from O-1 to O-42 as described in Table B.
Table Q-136: Pesticidal mixtures comprising T-52 and a further component C selected from O-1 to O-42 as described in Table B.
Table Q-137: Pesticidal mixtures comprising T-53 and a further component C selected from O-1 to O-42 as described in Table B.
Table Q-138: Pesticidal mixtures comprising T-54 and a further component C selected from O-1 to O-42 as described in Table B.
Table Q-139: Pesticidal mixtures comprising T-55 and a further component C selected from O-1 to O-42 as described in Table B.
Table Q-140: Pesticidal mixtures comprising T-56 and a further component C selected from O-1 to O-42 as described in Table B.
Table Q-141: Pesticidal mixtures comprising T-57 and a further component C selected from O-1 to O-42 as described in Table B.
Table Q-142: Pesticidal mixtures comprising T-58 and a further component C selected from O-1 to O-42 as described in Table B.
Table Q-143: Pesticidal mixtures comprising T-59 and a further component C selected from O-1 to O-42 as described in Table B.
Table Q-144: Pesticidal mixtures comprising T-60 and a further component C selected from O-1 to O-42 as described in Table B.
Table Q-145: Pesticidal mixtures comprising T-61 and a further component C selected from O-1 to O-42 as described in Table B.
Table Q-146: Pesticidal mixtures comprising T-62 and a further component C selected from O-1 to O-42 as described in Table B.
Table Q-147: Pesticidal mixtures comprising T-63 and a further component C selected from O-1 to O-42 as described in Table B.
Table Q-148: Pesticidal mixtures comprising T-64 and a further component C selected from O-1 to O-42 as described in Table B.
Table Q-149: Pesticidal mixtures comprising T-65 and a further component C selected from O-1 to O-42 as described in Table B.
Table Q-150: Pesticidal mixtures comprising T-66 and a further component C selected from O-1 to O-42 as described in Table B.
Table Q-151: Pesticidal mixtures comprising T-67 and a further component C selected from O-1 to O-42 as described in Table B.
Table Q-152: Pesticidal mixtures comprising T-68 and a further component C selected from O-1 to O-42 as described in Table B.
Table Q-153: Pesticidal mixtures comprising T-69 and a further component C selected from O-1 to O-42 as described in Table B.
Table Q-154: Pesticidal mixtures comprising T-70 and a further component C selected from O-1 to O-42 as described in Table B.
Table Q-155: Pesticidal mixtures comprising T-71 and a further component C selected from O-1 to O-42 as described in Table B.
Table Q-156: Pesticidal mixtures comprising T-72 and a further component C selected from O-1 to O-42 as described in Table B.
Table Q-157: Pesticidal mixtures comprising T-73 and a further component C selected from O-1 to O-42 as described in Table B.
Table Q-158: Pesticidal mixtures comprising T-74 and a further component C selected from O-1 to O-42 as described in Table B.
Table Q-159: Pesticidal mixtures comprising T-75 and a further component C selected from O-1 to O-42 as described in Table B.
Table Q-160: Pesticidal mixtures comprising T-76 and a further component C selected from O-1 to O-42 as described in Table B.
Table Q-161: Pesticidal mixtures comprising T-77 and a further component C selected from O-1 to O-42 as described in Table B.
Table Q-162: Pesticidal mixtures comprising T-78 and a further component C selected from O-1 to O-42 as described in Table B.
Table Q-163: Pesticidal mixtures comprising T-79 and a further component C selected from O-1 to O-42 as described in Table B.

Table Q-164: Pesticidal mixtures comprising T-80 and a further component C selected from O-1 to O-42 as described in Table B.
Table Q-165: Pesticidal mixtures comprising T-81 and a further component C selected from O-1 to O-42 as described in Table B.
Table Q-166: Pesticidal mixtures comprising T-82 and a further component C selected from O-1 to O-42 as described in Table B.
Table Q-167: Pesticidal mixtures comprising T-83 and a further component C selected from O-1 to O-42 as described in Table B.
Table Q-168: Pesticidal mixtures comprising T-84 and a further component C selected from O-1 to O-42 as described in Table B.

In one embodiment, the pesticidal mixtures comprise at least two components C.

In one embodiment, the pesticidal mixtures comprise at least two components C selected from the group consisting of thiamethoxam, cyazypyr, rynaxypyr, fludioxonil, metalaxyl-M (mefenoxam), mefentrifluconazole, azoxystrobin, pyraclostrobin, fluxapyroxad, thiabendazole, clothianidine, prothioconazole, penflufen, metalaxyl and imidacloprid.

In one embodiment, the pesticidal mixture comprises *Bacillus amyloliquefaciens* ssp. *plantarum* strain MBI600 and cis-jasmone in synergistically effective amounts as well as fludioxonil, mefenoxam, azoxystrobin, thiabendazole and clothianidin.

In one embodiment, the pesticidal mixture comprises *Bacillus amyloliquefaciens* ssp. *plantarum* strain MBI600 and cis-jasmone in synergistically effective amounts as well as prothioconazole, penflufen, metalaxyl and imidacloprid.

In one embodiment, the pesticidal mixture comprises *Bacillus amyloliquefaciens* ssp. *plantarum* strain MBI600 and cis-jasmone in synergistically effective amounts as well as pyraclostrobin, fluxapyroxad, metalaxyl and imidacloprid.

In one embodiment, the pesticidal mixtures comprise at least one component C selected from the groups M.1 to M.29, and at least one component C selected from the groups F.I to F.XI. In one embodiment, the pesticidal mixtures comprise at least one component C selected from the groups M.1 to M.29, and at least one component C selected from the groups L.1 to L.5. In one embodiment, the pesticidal mixtures comprise at least one component C selected from the groups F.I to F.XI, and at least one component C selected from the groups L.1 to L.5.

The invention also relates to agrochemical compositions comprising an auxiliary and the pesticidal mixtures. In one embodiment, the agrochemical composition comprises more than one auxiliary and the pesticidal mixture. In one embodiment, the invention relates to a seed treatment composition comprising the pesticidal mixtures and at least one auxiliary, wherein the auxiliary is preferably selected from surfactants, antifreezing agents, binders, and pigments, and in particular a surfactant or a binder. Formulation types of the seed treatment composition are given below.

The pesticidal mixtures comprise a pesticidally effective amount of *Bacillus amyloliquefaciens*, cis-jasmone, and optionally component C. The term "pesticidally effective amount" is defined below.

The pesticidal mixtures can be converted into customary types of agrochemical compositions, e.g. solutions, emulsions, suspensions, dusts, powders, pastes, granules, pressings, capsules, and mixtures thereof. Examples for agrochemical composition types are suspensions (e.g. SC, OD, FS), emulsifiable concentrates (e.g. EC), emulsions (e.g. EW, EO, ES, ME), capsules (e.g. CS, ZC), pastes, pastilles, wettable powders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations for the treatment of plant propagation materials such as seeds (e.g. GF). These and further agrochemical compositions types are defined in the "Catalogue of pesticide formulation types and international coding system", Technical Mono-graph No. 2, 6th Ed. May 2008, CropLife International.

The agrochemical compositions are prepared in a known manner, such as described by Mollet and Grube-mann, Formulation technology, Wiley VCH, Weinheim, 2001; or Knowles, New developments in crop protection product formulation, Agrow Reports DS243, T&F Informa, London, 2005.

Examples for suitable auxiliaries are solvents, liquid carriers, solid carriers or fillers, surfac-tants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e.g. toluene, paraffin, tetrahydronaphthalene, alkylated naphthalenes; alcohols, e.g. ethanol, propanol, butanol, benzylalcohol, cyclo-hexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharide powders, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emusifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sul-fates, phosphates, carboxylates, and mixtures thereof. Examples of sulfonates are alkylaryl-sulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkyl naphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides.

Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are homo- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the N-B or N-O-A type comprising blocks of polyethylene oxide and polypropylene oxide, or of the N-O-C type comprising alkanol, polyethylene oxide and polypropylene oxide.

Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglectable or even no pesticidal activity themselves, and which improve the biological performance of the compounds of the present invention on the target. Examples are surfactants, mineral or vegetable oils, and other auxilaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazoli-nones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

Examples for agrochemical composition types and their preparation are:

i) Water-Soluble Concentrates (SL, LS)
10-60 wt % of the pesticidal mixtures according to the invention and 5-15 wt % wetting agent (e.g. alcohol alkoxylates) are dissolved in water and/or in a water-soluble solvent (e.g. alcohols) up to 100 wt %. The active substance dissolves upon dilution with water.

ii) Dispersible Concentrates (DC)
5-25 wt % of the pesticidal mixtures according to the invention and 1-10 wt % dispersant (e.g. polyvi-nylpyrrolidone) are dissolved in up to 100 wt % organic solvent (e.g. cyclohexanone). Dilution with water gives a dispersion.

iii) Emulsifiable Concentrates (EC)
15-70 wt % of the pesticidal mixtures according to the invention and 5-10 wt % emulsifiers (e.g. calcium dodecylbenzenesulfonate and castor oil ethoxylate) are dissolved in up to 100 wt % water-insoluble organic solvent (e.g. aromatic hydrocarbon). Dilution with water gives an emulsion.

iv) Emulsions (EW, EO, ES)
5-40 wt % of the pesticidal mixtures according to the invention and 1-10 wt % emulsifiers (e.g. calcium dodecylbenzenesulfonate and castor oil ethoxylate) are dissolved in 20-40 wt % water-insoluble organic solvent (e.g. aromatic hydrocarbon). This mixture is introduced into up to 100 wt % water by means of an emulsifying machine and made into a homogeneous emulsion. Dilution with water gives an emulsion.

v) Suspensions (SC, OD, FS)
In an agitated ball mill, 20-60 wt % of the pesticidal mixtures according to the invention are comminuted with addition of 2-10 wt % dispersants and wetting agents (e.g. sodium lignosulfonate and alcohol ethoxylate), 0.1-2 wt % thickener (e.g. xanthan gum) and up to 100 wt % water to give a fine active substance suspension. Dilution with water gives a stable suspension of the active sub-stance. For FS type composition up to 40 wt % binder (e.g. polyvinylalcohol) is added.

vi) Water-Dispersible Granules and Water-Soluble Granules (WG, SG)
50-80 wt % of the pesticidal mixtures according to the invention are ground finely with addition of up to 100 wt % dispersants and wetting agents (e.g. sodium lignosulfonate and alcohol ethoxylate) and prepared as water-dispersible or water-soluble granules by means of technical appliances (e.g. extrusion, spray tower, fluidized bed). Dilution with water gives a stable dispersion or solution of the active substance.

vii) Water-Dispersible Powders and Water-Soluble Powders (WP, SP, WS)
50-80 wt % of the pesticidal mixtures according to the invention are ground in a rotor-stator mill with ad-dition of 1-5 wt % dispersants (e.g. sodium lignosulfonate), 1-3 wt % wetting agents (e.g. alcohol ethoxylate) and up to 100 wt % solid carrier, e.g. silica gel. Dilution with water gives a stable dis-persion or solution of the active substance.

viii) Gel (GW, GF)
In an agitated ball mill, 5-25 wt % of the pesticidal mixtures according to the invention are comminuted with addition of 3-10 wt % dispersants (e.g. sodium lignosulfonate), 1-5 wt % thickener (e.g. car-boxymethylcellulose) and up to 100 wt % water to give a fine suspension of the active sub-stance. Dilution with water gives a stable suspension of the active substance.

ix) Microemulsion (ME)
5-20 wt % of the pesticidal mixtures according to the invention are added to 5-30 wt % organic solvent blend (e.g. fatty acid dimethylamide and cyclohexanone), 10-25 wt % surfactant blend (e.g. alkohol ethoxylate and arylphenol ethoxylate), and water up to 100%. This mixture is stirred for 1 h to produce spontaneously a thermodynamically stable microemulsion.

x) Microcapsules (CS)
An oil phase comprising 5-50 wt % of the pesticidal mixtures according to the invention, 0-40 wt % water insoluble organic solvent (e.g. aromatic hydrocarbon), 2-15 wt % acrylic monomers (e.g. methylmethacrylate, methacrylic acid and a di- or triacrylate) are dispersed into an aqueous solution of a protective colloid (e.g. polyvinyl alcohol). Radical polymerization initiated by a radi-cal initiator results in the formation of poly(meth)acrylate microcapsules. Alternatively, an oil phase comprising 5-50 wt % of a compound I according to the invention, 0-40 wt % water insoluble organic solvent (e.g. aromatic hydrocarbon), and an isocyanate monomer (e.g. diphenylme-thene-4,4'-diisocyanatae) are dispersed into an aqueous solution of a protective colloid (e.g. polyvinyl alcohol). The addition of a polyamine (e.g. hexamethylenediamine) results in the formation of a polyurea microcapsule. The monomers amount to 1-10 wt %. The wt % relate to the total CS composition.

xi) Dustable Powders (DP, DS)

1-10 wt % of the pesticidal mixtures according to the invention are ground finely and mixed intimately with up to 100 wt % solid carrier, e.g. finely divided kaolin.

xii) Granules (GR, FG)

0.5-30 wt % of the pesticidal mixtures according to the invention is ground finely and associated with up to 100 wt % solid carrier (e.g. silicate). Granulation is achieved by extrusion, spray-drying or the fluidized bed.

xiii) Ultra-Low Volume Liquids (UL)

1-50 wt % of the pesticidal mixtures according to the invention are dissolved in up to 100 wt % organic solvent, e.g. aromatic hydrocarbon.

The agrochemical compositions types i) to xi) may optionally comprise further auxiliaries, such as 0.1-1 wt % bactericides, 5-15 wt % anti-freezing agents, 0.1-1 wt % anti-foaming agents, and 0.1-1 wt % col-orants.

The agrochemical compositions generally comprise between 0.01 and 95%, preferably between 0.1 and 90%, and most preferably between 0.5 and 75%, by weight of pesticidally active substances. The pesticidally active substances are employed in a purity of from 90% to 100%, preferably from 95% to 100% (according to NMR spectrum).

Various types of oils, wetters, adjuvants, fertilizer, or micronutrients, and other pesticides (e.g. herbicides, insecticides, fungicides, growth regulators, safeners) may be added to the active substances or the compositions comprising them as premix or, if appropriate not until immediately prior to use (tank mix). These agents can be admixed with the compositions according to the invention in a weight ratio of 1:100 to 100:1, preferably 1:10 to 10:1.

The user applies the mixture according to the invention usually from a predosage de-vice, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

According to one embodiment, individual components of the pesticidal mixture according to the invention such as parts of a binary or ternary mixture may be mixed by the user himself in a spray tank and further auxiliaries may be added, if appropriate.

In a further embodiment, either individual components of the pesticidal mixtures according to the invention or partially premixed components, e.g. *Bacillus amyloliquefaciens*, cis-jasmone and optionally component C may be mixed by the user in a spray tank and further auxiliaries and additives may be added, if appropriate.

In a further embodiment, either individual components of the mixture according to the invention, or partially premixed components, i.e. *Bacillus amyloliquefaciens*, or cis-jasmone, and optionally component C, can be applied jointly (e.g. after tank mix) or consecutively in the application methods of the invention. In one embodiment, either individual components, or partially premixed components, i.e. *Bacillus amyloliquefaciens*, or cis-jasmone, and optionally component C, are applied to the plant propagation material before sowing, followed by soil treatment, or foliar treatment with the other component(s) of the pesticidal mixtures after sowing. The period between seed treatment of the plant propagation material before sowing, and the treatment after sowing typically varies with the vegetation period, the plant, irrigation techniques, pests, soil, humidity, and climate. Usually, the period ranges from 1 day to 3 months, preferably from 10 days to 1 month.

The pesticidal mixture is suitable for controlling pests, such as arthropods, mites nematodes, and fungi. Hence, the pesticidal mixtures can be applied in a method of controlling undesired insect, nematode, or mite attack, harmful fungy, wherein the pesticidal mixtures are allowed to act on the respective pests, their environment, or the crop plants to be protected from the respective pest, on the soil, and/or on the crop plants, and/or on their environment.

The compounds of the present invention are suitable for use in protecting crops, plants, plant propagation materials, such as seeds, or soil or water, in which the plants are growing, from attack or infestation by animal pests.

Therefore, the invention also relates to a method for controlling pests, which method comprises the application of a pesticidal mixture to plants, plant propagation material, or the locus of growth of the plants; the pests or their food supply, habitat or breeding grounds. It also relates to the use of the pesticidal mixtures for controlling and preventing pests, e.g. on plants, parts of plants in the soil, and on plant propagation material. The term controlling both relates to the treatment of infested plants, parts of them, plant propagation material, and the soil, but also to the prevention of the infestation before the respective pests are present. In one embodiment, the pesticidal mixture is applied to plant propagation material.

In one embodiment, the invention relates to methods for controlling pests whereas mixtures comprising *Bacillus amyloliquefaciens* ssp. *plantarum* strain MB1600 (component A) and cis-jasmone (component B) in synergistically effective amounts are applied.

In another embodiment, the invention relates to methods for controlling pests whereas mixtures comprising *Bacillus amyloliquefaciens* ssp. *plantarum* strain MB1600 (component A) and cis-jasmone (component B) in synergistically effective amounts and at least one further component C are applied.

The pesticidal mixtures are suitable for efficiently controlling animal pests such as arthropods, gastropods and nematodes including but not limited to:

insects from the order of Lepidoptera, for example *Achroia grisella, Acleris* spp. such as *A. fimbriana, A. gloverana, A. variana, Acrolepiopsis assectella, Acronicta major, Adoxophyes* spp. such as *A. cyrtosema, A. orana; Aedia leucomelas, Agrotis* spp. such as *A. exclamationis, A. fucosa, A. ipsilon, A. orthogoma, A. segetum, A. subterranea; Alabama argillacea, Aleurodicus dispersus, Alsophlla pometaria, Ampelophaga rubiginosa, Amyelois transitella, Anacampsis sarcitella, Anagasta kuehniella, Anarsia lineatella, AnLsota senatoria, Antheraea pernyi, Anticarsia* (=*Thermesia*) spp. such as *A. gemmatalis, Apamea* spp., *Aproaerema modicella, Archips* spp. such as *A. argyrospila, A. fuscocupreanus, A. rosana, A. xyloseanus, Argyresthia conjugella, Argyroploce* spp., *Argyrotaenia* spp. such as *A. velutinana, Athetis mindara, Austroasca viridigrisea, Autographa*

*gamma, Autographa nigrisigna, Barathra brassicae, Bedellia* spp., *Bonagota salubricola, Borbo cinnara, Bucculatrix thurberiella, Bupalus piniarius, Busseola* spp., *Cacoecia* spp. such as *C. murinana, C. podana; Cactoblastis cactorum, Cadra cautella, Calingo braziliensis, Caloptilis theivora, Capua reticulana, Carposina* spp. such as *C. niponensis, C. sasakii, Cephus* spp., *Chaetocnema aridula, Cheimatobia brumata, Chilo* spp. such as *C. indicus, C. suppressalis, C. partellus, Choreutis pariana, Choristoneura* spp. such as *C. conflictana, C. fumiferana, C. longicellana, C. murinana, C. occidentalis, C. rosaceam; Chrysodeixis (=Pseudoplusia)* spp. such as *C. eriosoma, C. includens, Cirphis unipuncta, Clysia ambiguella, Cnaphalocerus* spp., *Cnaphalocrocis medinalis, Cnephasia* spp., *Cochylis hospes, Coleophora* spp., *Colias eurytheme, Conopomorpha* spp., *Conotrachelus* spp., *Copitarsia* spp., *Corcyra cephalonica, Crambus caliginosellus, Crambus teterrellus, Crocidosema (=Epinotia) aporema, Cydalima (=Diaphania) perspectalis, Cydia (=Carpocapsa)* spp. such as *C. pomonella, C. latiferreana, Dalaca noctuides, Datana integerrima, Dasychira pinicola, Dendrolimus* spp. such as *D. pini, D. spectabilis, D. sibiricus, Desmia funeralis, Diaphania* spp. such as *D. nitidalis, D. hyalinata, Diatraea grandiosella, Diatraea saccharalis, Diphthera festiva, Earias* spp. such as *E. insulana, E. vittella, Ecdytolopha aurantianu, Egira (=Xylomyges) curialis, Elasmopalpus lignosellus, Eldana saccharin, Endopiza viteana, Ennomos subsignaria, Eoreuma loftini, Ephestia* spp. such as *E. cautella, E. elutella, E. kuehniella, Epinotia aporema, Epiphyas postvittana, Erannis tiliaria, Erionota thrax, Etiella* spp., *Eulia* spp., *Eupoecilia ambiguella, Euproctis chrysorrhoea, Euxoa* spp., *Evetria bouliana, Faronta albilinea, Feltia* spp. such as *F. subterranean; Galleria mellonella, Gracillaria* spp., *Grapholita* spp. such as *G. funebrana, G. molesta, G. inopinata; Halysidota* spp., *Harrisina americana, Hedylepta* spp., *Helicoverpa* spp. such as *H. armigera (=Heliothis armigera), H. zea (=Heliothis zea); Heliothis* spp. such as *H. assulta, H. subflexa, H. virescens; Hellula* spp. such as *H. undalis, H. rogatalis; Helocoverpa gelotopoeon, Hemileuca oliviae, Herpetogramma licarsisalis, Hibernia defoliaria, Hofmannophila pseudospretella, Homoeosoma electellum, Homona magnanima, Hypena scabra, Hyphantria cunea, Hyponomeuta padella, Hyponomeuta malinellus, Kakivoria flavofasciata, Keiferia lycopersicella, Lambdina fiscellaria fiscellaria, Lambdina fiscellaria lugubrosa, Lamprosema indicata, Laspeyresia molesta, Leguminivora glycinivorella, Lerodea eufala, Leucinodes orbonalis, Leucoma salicin Leucoptera* spp. such as *L. coffeella, L. scitella; Leuminivora lycinivorella, Lithocolletiս blancardella, Lithophane antennata, Llattia octo (=Amyna axis), Lobesia botrana, Lophocampa* spp., *Loxagrotis albicosta, Loxostege* spp. such as *L. sticticalis, L. cereralis; Lymantria* spp. such as *L. dispar, L. monacha, Lyonetia clerkella, Lyonetia prunifoliella, Malacosoma* spp. such as *M. americanum, M. californicum, M. constrictum, M. neustria; Mamestra* spp. such as *M. brassicae, M. configurata; Mamstra brassicae, Manduca* spp. such as *M. quinquemaculata, M. sexta; Marasmia* spp, *Marmara* spp., *Maruca testulalis, Megalopyge lanata, Melanchra picta, Melanitis leda, Mocis* spp. such as *M. lapites, M. repanda; Mocis latipes, Monochroa fragariae, Mythimna separata, Nemapogon cloacella, Neoleucinodes elegantalis, Nepytia* spp., *Nymphula* spp., *Oiketicus* spp., *Omiodes indicata, Omphisa anastomosalis, Operophtera brumata, Orgyia pseudotsugata, Oria* spp., *Orthaga thyrisalis, Ostrinia* spp. such as *O. nubilalis, Oulema oryzae, Paleacrita vernata, Panolis flammea, Parnara* spp., *Papaipema nebris, cresphontes, Paramyelois transitella, Paranthrene regalis, Paysandisia archon, Pectinophora* spp. such as *P. gossypiella; Peridroma saucia, Perileucoptera* spp., such as *P. coffeella; Phalera bucephala, Phryganidia californica, Phthorimaea* spp. such as *P. operculella; Phyllocnistis citrella, Phyllonorycter* spp. such as *P. blancardella, P. crataegella, P. issikil, P. ringoniella; Pieris* spp. such as *P. brassicae, P. rapae, P. napi, Pilocrocis tripunctata, Plathypena scabra, Platynota* spp. such as *P. flavedana, P. idaeusalis, P. stultana; Platyptilia carduidactyla, Plebejus argus, Plodia interpunctella, Plusia* spp, *Plutella maculipennis, Plutella xylostella, Pontia protodica, Prays* spp., *Prodenia* spp., *Proxenus lepigone, Pseudaletia* spp. such as *P. sequax, P. unipuncta; Pyrausta nubilalis, Rachiplusia nu, Richia albicosta, Rhizobius ventralis, Rhyacionia frustrana, Sabulodes aegrotata, Schizura concinna, Schoenobius* spp., *Schreckensteinia festaliella, Scirpophaga* spp. such as *S. incertulas, S. innotata; Scotia segetum, Sesamia* spp. such as *S. inferens, Seudyra subflava, Sitotroga cerealella, Sparganothis pilleriana, Spilonota lechriaspis, S. ocellana, Spodoptera (=Lamphygma)* spp. such as *S. cosmoides, S. eridania, S. exigua, S. frugiperda, S. latisfascia, S. littoralis, S. litura, S. ornithogalli; Stigmella* spp., *Stomopteryx subsecivella, Strymon bazochii, Sylepta derogata, Synanthedon* spp. such as *S. exitiosa, Tecia solanivora, Telehin licus, Thaumatopoea pityocampa, Thaumatotibia (=Cryptophlebia) leucotreta, Thaumetopoea pityocampa, Thecla* spp., *Theresimima ampelophaga, Thyrinteina* spp, *Tildenia inconspicuella, Tinea* spp. such as *T. cloacella, Tineola bisselliella, Tortrix* spp. such as *T. viridana; Trichophaga tapetzella, Trichoplusia* spp. such as *T. ni; Tuta (=Scrobipalpula) absoluta, Udea* spp. such as *U. rubigalis, U. rubigalis; Virachola* spp., *Yponomeuta padella*, and *Zeiraphera canadensis;* insects from the order of Coleoptera, for example *Acalymma vittatum, Acanthoscehdes obtectus, Adoretus* spp., *Agelastica alni, Agrilus* spp. such as *A. anxius, A. planipennis, A. sinuatus; Agriotes* spp. such as *A. fuscicollis, A. lineatus, A. obscurus; Alphitobius diaperinus, Amphimallus solstitialis, Anisandrus dispar, Anisoplia austriaca, Anobium punctatum, Anomala corpulenta, Anomala rufocuprea, Anoplophora* spp. such as *A. glabripennis; Anthonomus* spp. such as *A. eugenii, A. grandis, A. pomorum; Anthrenus* spp., *Aphthona euphoridae, Apion* spp., *Apogonia* spp., *Athous haemorrhoidalis, Atomaria* spp. such as *A. linearis; Attagenus* spp., *Aulacophora femoralis, Blastophagus piniperda, Blitophaga undata, Bruchidius obtectus, Bruchus* spp. such as *B. lentis, B. pisorum, B. rufimanus, Byctiscus betulae, Callidiellum rufipenne, Callopistria floridensis, Callosobruchus chinensis, Cameraria ohridella, Cassida nebulosa, Cerotoma trifurcata, Cetonia aurata, Ceuthorhynchus* spp. such as *C. assimilis, C. napi; Chaetocnema tibialis, Cleonus mendicus, Conoderus* spp. such as *C. vespertinus; Conotrachelus nenuphar, Cosmopolites* spp., *Costelytra zealandica, Crioceris asparagi, Cryptolestes ferrugineus, Cryptorhynchus lapathi, Ctenicera* spp. such as *C. destructor; Curculio* spp., *Cylindrocopturus* spp., *Cyclocephala* spp., *Dactylispa balyi, Dectes texanus, Dermestes* spp., *Diabrotica* spp. such as *D. undecimpunctata, D. speciosa, D. longicornis, D. semipunctata, D. virgfera; Diaprepes abbreviates, Dichocrocis* spp., *Dicladispa armigera, Diloboderus abderus, Diocalandra frumenti (Diocalandra stigmaticollis), Enaphalodes rufulus, Epilachna* spp. such as *E. varivestis, E. vigintioctomaculata; Epitrix* spp. such as *E. hirtipennis, E. similaris; Eutheola humilis, Eutinobothrus brasiliensis, Faustinus cubae, Gibbium psylloides, Gnathocerus cornutus, Hellula undalis, Heteronychus arator, Hylamorpha elegans, Hylobius abietis, Hylotrupes bajulus,*

*Hypera* spp. such as *H. brunneipennis, H. postica; Hypomeces squamosus, Hypothenemus* spp., *lps typographus, Lachnosterna consanguinea, Lasioderma serricorne, Latheticus oryzae, Lathridius* spp., *Lema* spp. such as *L. bilineata, L. melanopus; Leptinotarsa* spp. such as *L. decemlineata; Leptispa pygmaea, Limonius californicus, Lissorhoptrus olyzophfius, Lixus* spp., *Luperodes* spp., *Lyctus* spp. such as *L. bruneus; Liogenys fuscus, Macrodactylus* spp. such as *M. subspinosus; Maladera matrida, Megaplatypus mutates, Megascelis* spp., *Melanotus communis, Meligethes* spp. such as *M. aeneus; Melolontha* spp. such as *M. hippocastani, M. melolontha; Metamasius hemipterus, Microtheca* spp., *Migdolus* spp. such as *M. fryanus, Monochamus* spp. such as *M. alternatus; Naupactus xanthographus, Niptus hololeucus, Oberia brevis, Oemona hirta, Oryctes rhinoceros, Oryzaephfius surinamensis, Oryzaphagus oryzae, Otiorrhynchus sulcatus, Otiorrhynchus ovatus, Otiorrhynchus sulcatus, Oulema melanopus, Oulema oryzae, Oxycetonia jucunda, Phaedon* spp. such as *P. brassicae, P. cochleariae; Phoracantha recurva, Phyllobius pyri, Phyllopertha horticola, Phyllophaga* spp. such as *P. helleri; Phyllotreta* spp. such as *P. chlysocephala, P. nemorum, P. striolata, P. vittula; Phyllopertha horticola, Popillia japonica, Premnotrypes* spp., *Psacothea hilaris, Psylliodes chlysocephala, Prostephanus truncates, Psylliodes* spp., *Ptinus* spp., *Pulga saltona, Rhizopertha dominica, Rhynchophorus* spp. such as *R. billineatus, R. ferrugineus, R. palmarum, R. phoenicis, R. vulneratus; Saperda candida, Scolytus schevyrewi, Scyphophorus acupunctatus, Sitona lineatus, Sitophilus* spp. such as *S. granaria, S. oryzae, S. zeamais; Sphenophorus* spp. such as *S. levis; Stegobium paniceum, Sternechus* spp. such as *S. subsignatus; Strophomorphus ctenotus, Symphyletes* spp., *Tanymecus* spp., *Tenebrio molitor, Tenebrioides mauretanicus, Tribolium* spp. such as *T. castaneum; Trogoderma* spp., *Tychius* spp., *Xylotrechus* spp. such as *X. pyrrhoderus*; and, *Zabrus* spp. such as *Z. tenebrioides*;

insects from the order of Diptera for example *Aedes* spp. such as *A. aegypti, A. albopictus, A. vexans; Anastrepha ludens, Anopheles* spp. such as *A. albimanus, A. crucians, A. freeborn, A. gambiae, A. leucosphyrus, A. maculipennis, A. minimus, A. quadrimaculatus, A. sinensis; Bactrocera invadens, Bibio hortulanus, Calliphora erythrocephala, Calliphora vicina, Ceratitis capitata, Chrysomyia* spp. such as *C. bezziana, C. hominivorax, C. macellaria; Chrysops atlanticus, Chrysops discalis, Chrysops silacea, Cochliomyia* spp. such as *C. hominivorax; Contarinia* spp. such as *C. sorghicola; Cordylobia anthropophaga, Culex* spp. such as *C. nignpalpus, C. pipiens, C. quinquefasciatus, C. tarsalis, C. tritaeniorhynchus; Culicoides furens, Culiseta inornata, Culiseta melanura, Cuterebra* spp., *Dacus cucurbitae, Dacus oleae, Dasineura brassicae, Dasineura oxycoccana, Delia* spp. such as *D. antique, D. coarctata, D. platura, D. radicum; Dermatobia hominis, Drosophila* spp. such as *D. suzukil, Fannia* spp. such as *F. canicularis; Gastraphilus* spp. such as G. *intestinalis; Geomyza tipunctata, Glossina* spp. such as *G. fuscipes, G. morsitans, G. palpalis, G. tachinoides, Haematobia irritans, Haplodiplosis equestris, Hippelates* spp., *Hylemyia* spp. such as *H. platura; Hypoderma* spp. such as *H. lineata; Hyppobosca* spp., *Hydrellia philippina, Leptoconops torrens, Liriomyza* spp. such as *L. sativae, L. trifolii; Lucilia* spp. such as *L. caprina, L. cuprina, L. sericata, Lycoria pectoralis, Mansonia titillanus, Mayetiola* spp. such as *M. destructor; Musca* spp. such as *M. autumnalis, M. domestica; Muscina stabulans, Oestrus* spp. such as *O. ovis; Opomyza florum, Oscinella* spp. such as *O. frit; Orseolia oryzae, Pegomya hysocyami, Phlebotomus argentipes, Phorbia* spp. such as *P. antiqua, P. brassicae, P. coarctata; Phytomyza gymnostoma, Prosimulium mixtum, Psila rosae, Psorophora columbiae, Psorophora discolor, Rhagoletis* spp. such as *R. cerasi, R. cingulate, R. indifferens, R. mendax, R. pomonella; Rivellia quadrifasciata, Sarcophaga* spp. such as *S. haemorrhoidalis; Simulium vittatum, Sitodiplosis mosellana, Stomoxys* spp. such as *S. calcitrans; Tabanus* spp. such as *T. atratus, T. bovinus, T. lineola, T. similis; Tannia* spp., *Thecodiplosis japonensis, Tipula oleracea, Tipula paludosa*, and *Wohlfahrtia* spp;

insects from the order of Thysanoptera for example, *Baliothrips biformis, Dichromothrips corbetti, Dichromothrips* ssp., *Echinothrips americanus, Enneothrips flavens, Frankliniella* spp. such as *F. fusca, occidentalis, F. tritici; Heliothrips* spp., *Hercinothrips femoralis, Kakothrips* spp., *Microcephalothrips abdominalis, Neohydatothrips samayunkur, Pezothrips kellyanus, Rhipiphorothrips cruentatus, Scirtothrips* spp. such as *S. citri, S. dorsalis, S. perseae; Stenchaetothrips* spp, *Taeniothrips cardamoni, Taeniothrips inconsequens, Thrips* spp. such as *T. imagines, T. hawailensis, T. oryzae, T. palmi, T. parvispinus, T. tabaci*;

insects from the order of Hemiptera for example, *Acizzia jamatonica, Acrosternum* spp. such as *A. hilare; Acyrthosipon* spp. such as *A. onobrychis, A. pisum; Adelges laricis, Adelges tsugae, Adelphocoris* spp., such as *A. rapidus, A. superbus; Aeneolamia* spp., *Agonoscena* spp., *Aulacorthum solani, Aleurocanthus woglum, Aleurodes* spp., *Aleurodicus disperses, Aleurolobus barodensis, Aleurothrixus* spp., *Amrasca* spp., *Anasa tristis, Antestiopsis* spp., *Anuraphis cardui, Aonidiella* spp., *Aphanostigma piri, Aphidula nasturtil, Aphis* spp. such as *A. craccivora, A. fabae, A. forbesi, A. gossypii, A. grossulariae, A. maidiradicis, A. pomi, A. sambuci, A. schneideri, A. spiraecola; Arboridia apicalis, Arilus critatus, Aspidiella* spp., *Aspidiotus* spp., *Atanus* spp., *Aulacaspis yasumatsui, Aulacorthum solani, Bactericera cockerelli (Paratrioza cockerelli), Bemisia* spp. such as *B. argentifolii, B. tabaci* (Aleurodes *tabaci*); *Blissus* spp. such as *B. leucopterus; Brachycaudus* spp. such as *B. cardui, B. helichrysi, B. persicae, B. prunicola; Brachycolus* spp., *Brachycorynella asparagi, Brevicolyne brassicae, Cacopsylla* spp. such as *C. fulguralis, C. pyricola* (*Psylla piri*); *Calligypona marginata, Caloconis* spp., *Campylomma livida, Capitophorus horni, Carneocephala fulgida, Cavelerius* spp., *Ceraplastes* spp., *Ceratovacuna lanigera, Ceroplastes ceriferus, Cerosipha gossypii, Chaetosiphon fragaefolli, Chionaspis tegalensis, Chlorita onukil, Chromaphis juglandicola, Chrysomphalus ficus, Cicadulina mbila, Cimex* spp. such as *C. hemipterus, C. lectularius; Coccomytilus halli, Coccus* spp. such as *C. hesperidum, C. pseudomagnoliarum; Corythucha arcuata, Creontiades dilulus, Cryptomyzus ribis, Chrysomphalus aonidum, Cryptomyzus ribis, Ctenarytaina spatulata, Cyrtopeltis notatus, Dalbulus* spp., *Dasynus piperis, Dialeurodes* spp. such as *D. citrifolii; Dalbulus maidis, Diaphorina* spp. such as *D. citri, Diaspis* spp. such as *D. bromeliae; Dichelops furcatus, Diconocoris hewetti, Doralis* spp., *Dreyfusia nordmannianae, Dreyfusia piceae, Drosicha* spp., *Dysaphis* spp. such as *D. plantaginea, D. pyri, D. radicola; Dysaulacorthum pseudosolam, Dysdercus* spp. such as *D. cingulatus, D. intermedius; Dysmicoccus* spp., *Edessa* spp., *Geocoris* spp., *Empoasca* spp. such as *E. fabae, E. solana; Epidiaspis Eriosoma* spp. such as *E. lanigerum, E. pyricola; Erythroneura* spp., *Eurygaster* spp. such as *E. integriceps; Euscelis bilobatus, Euschistus* spp. such as *E. heros, E. impictiventris, E. servus; Fiorinia theae, Geococcus coffeae, Glycaspis brimblecombei, Halyomorpha* spp. such as *H. halys; Heliopeltis* spp., *Homalodisca vitripennis* (=*H. coagulata*), *Horcias nobilel-*

*lus, Hyalopterus pruni, Hyperomyzus lactucae, Icelya* spp. such as *I. purchase; Idiocerus* spp., *Idioscopus* spp., *Laodelphax striatellus, Lecanium* spp., *Lecanoideus floccissimus, Lepidosaphes* spp. such as *L. ulmi; Leptoconsa* spp., *Leptoglossus phyllopus, Lipaphis erysiml, Lygus* spp. such as *L. hesperus, L. lineolaris, L. pratensis; Maconellicoccus hirsutus, Marchalina hellenica, Macropes excavatus, Macrosiphum* spp. such as *M. rosae, M. avenae, M. euphorbiae; Macrosteles quadrilineatus, Mahanarva fimbriolata, Megacopta cribraria, Megoura viciae, Melanaphis pyrarius, Melanaphis sacchari, Melanocallis (=Tinocallis) caryaefoliae, Metcafiella* spp., *Metopolophium dirhodum, Monellia costalis, Monelliopsis pecanis, Myzocallis coryli, Murgantia* spp., *Myzus* spp. such as *M. ascalonicus, M. cerasi, M. nicotianae, M. persicae, M. varians; Nasonovia ribis-nigri, Neotoxoptera formosana, Neomegalotomus* spp, *Nephotettix* spp. such as *N. malayanus, N. nigropictus, N. parvus, N. virescens; Nezara* spp. such as *N. vindula; Nilaparvata lugens, Nysius huttoni, Oebalus* spp. such as *O. pugnax; Oncometopia* spp., *Orthezia praelonga, Oxycaraenus hyalinipennis, Parabemisia myricae, Parlatona* spp., *Parthenolecanium* spp. such as *P. corni, P. persicae; Pemphigus* spp. such as *P. bursarius, P. populivenae; Peregrinus maidis, Perkinsiella saccharicida, Phenacoccus* spp. such as *P. aceris, P. gossypii; Phloeomyzus passerinii, Phorodon humuli, Phylloxera* spp. such as *P. devastatrix, Piesma quadrata, Piezodorus* spp. such as *P. guildinii; Pinnaspis aspidistrae, Planococcus* spp. such as *P. citri, P. ficus; Prosapia bicincta, Protopulvinaria pyriformis, Psallus senatus, Pseudacysta persea, Pseudaulacaspis pentagon, Pseudococcus* spp. such as *P. comstocki; Psylla* spp. such as *P. mali, Pteromalus* spp., *Pulvinaria amygdali, Pyrilla* spp., *Quadraspidiotus* spp., such as *Q. perniciosus; Quesada gigas, Rastrococcus* spp., *Reduvius senilis, Rhizoecus americanus, Rhodnius* spp., *Rhopalomyzus ascalonicus, Rhopalosiphum* spp. such as *R. pseudobrassicas, R. insertum, R. maidis, R. padi; Sagatodes* spp., *Sahlbergella singularis, Saissetia* spp., *Sappaphis mala, Sappaphis mali, Scaptocoris* spp., *Scaphoides titanus, Schizaphis graminum, Schizoneura lanuginosa, Scotinophora* spp., *Selenaspidus articulatus, Sitobion avenae, Sogata* spp., *Sogatella furcifera, Solubea insularis, Spissistilus festinus (=Stictocephala festina), Stephanitis nashi, Stephanitis pyrioides, Stephanitis takeyai, Tenalaphara malayensis, Tetraleurodes perseae, Therioaphis maculate, Thyanta* spp. such as *T. accerra, T. perditor; Tibraca* spp., *Tomaspis* spp., *Toxoptera* spp. such as *T. aurantii; Trialeurodes* spp. such as *T. abutilonea, T. ricin, T. vaporariorum; Triatoma* spp., *Trioza* spp., *Typhlocyba* spp., *Unaspis* spp. such as *U. citri, U. yanonensis*; and *Viteus vitifolii*, Insects from the order Hymenoptera for example *Acanthomyops interjectus, Athalia rosae, Atta* spp. such as *A. capiguara, A. cephalotes, A. cephalotes, A. laevigata, A. robusta, A. sexdens, A. texana, Bombus* spp., *Brachymyrmex* spp., *Camponotus* spp. such as *C. floridanus, C. pennsylvanicus, C. modoc; Cardiocondyla nuda, Chabbion* sp, *Crematogaster* spp., *Dasymutilla occidentalis, Dipnon* spp., *Dolichovespula maculata, Dorymyrmex* spp., *Dryocosmus kuriphilus, Formica* spp., *Hoplocampa* spp. such as *H. minuta, H. testudinea, Iridomyrmex humilis, Lasius* spp. such as *L. niger, Linepithema humile, Liometopum* spp., *Leptocybe invasa, Monomorium* spp. such as *M. pharaonic, Monomorium, Nylandria fulva, Pachycondyla chinensis, Paratrechina longicornis, Paravespula* spp., such as *P. germanica, P. pennsylvanica, P. vulgaris; Pheidole* spp. such as *P. megacephala; Pogonomyrmex* spp. such as *P. barbatus, P. californicus, Polistes rubiginosa, Prenolepis impairs,*

*Pseudomyrmex gracilis, Schelipron* spp., *Sirex cyaneus, Solenopsis* spp. such as *S. geminata, Sinvicta, S. molesta, S. richteri, S. xylonl, Sphecius speciosus, Sphex* spp., *Tapinoma* spp. such as *T. melanocephalum, T. sessile; Tetramorium* spp. such as *T. caespitum, T. bicarinatum, Vespa* spp. such as *V. crabro; Vespula* spp. such as *V. squamosal; Wasmannia auropunctata, Xylocopa* sp;

Insects from the order Orthoptera for example *Acheta domesticus, Calliptamus italicus, Chortoicetes terminifera, Ceuthophilus* spp., *Diastrammena asynamora, Dociostaurus maroccanus, Gryllotalpa* spp. such as *G. africana, G. gryllotalpa; Gryllus* spp., *Hieroglyphus daganensis, Kraussaria angulifera, Locusta* spp. such as *L. migratoria, L. pardalina; Melanoplus* spp. such as *M. bivittatus, M. femurrubrum, M. mexicanus, M. sanguinipes, M. spretus, NomadacnS septemfasciata, Oedaleus senegalensis, Scapteriscus* spp., *Schistocerca* spp. such as *S. americana, S. gregaria, Stemopelmatus* spp., *Tachycines asynamorus*, and *Zonozerus variegatus;*

Pests from the Class Arachnida for example Acari, e.g. of the families Argasidae, Ixodidae and Sarcoptidae, such as *Amblyomma* spp. (e.g. *A. americanum, A. variegatum, A. maculatum), Argas* spp. such as *A. persicu), Boophilus* spp. such as *B. annulatus, B. decoloratus, B. microplus, Dermacentor* spp. such as *D. silvarum, D. andersoni, D. variabllis, Hyalomma* spp. such as *H. truncatum, Ixodes* spp. such as *I. ricinus, I. rubicundus, I. scapularis, I. holocyclus, I. pacificus, Rhipicephalus sanguineus, Ornithodorus* spp. such as *O. moubata, O. hermsi, O. turicata, Ornithonyssus bacoti, Otobius megnini, Dermanyssus gallinae, Psoroptes* spp. such as *P. ovis, Rhipicephalus* spp. such as *R. sanguineus, R. appendiculatus, Rhipicephalus evertsi, Rhizoglyphus* spp., *Sarcoptes* spp. such as *S. Scabiei;* and Family Eriophyidae including *Aceria* spp. such as *A. sheldoni, A. anthocoptes, Acallitus* spp., *Aculops* spp. such as *A. lycopersici, A. pelekassi; Aculus* spp. such as *A. schlechtendali; Colomerus vitis, Epitrimerus pyri, Phyllocoptruta oleivora; Eriophytes ribis* and *Eriophyes* spp. such as *Eriophyes sheldoni;* Family Tarsonemidae including *Hemitarsonemus* spp., *Phytonemus pallidus* and *Polyphagotarsonemus latus, Stenotarsonemus* spp. *Steneotarsonemus spinki;* Family Tenuipalpidae including *Brevipalpus* spp. such as *B. phoenicis;* Family Tetranychidae including *Eotetranychus* spp., *Eutetranychus* spp., *Oligonychus* spp., *Petrobia latens, Tetranychus* spp. such as *T. cinnabarinus, T. evansi, T. kanzawai, T, pacificus, T. phaseulus, T. telarius* and *T. urticae; Bryobia praetiosa; Panonychus* spp. such as *P. ulmi, P. citri; Metatetranychus* spp. and *Oligonychus* spp. such as *O. pratensis, O. perseae, Vasates lycopersici; Raoiella indica*, Family Carpoglyphidae including *Carpoglyphus* spp.; *Penthaleidae* spp. such as *Halotydeus destructor;* Family Demodicidae with species such as *Demodex* spp.; Family Trombicidea including *Trombicula* spp.; Family Macronyssidae including *Ornothonyssus* spp.; Family Pyemotidae including *Pyemotes tritici; Tyrophagus putrescentiae;* Family Acaridae including *Acarus siro;* Family Araneida including *Latrodectus mactans, Tegenaria agrestis, Chiracanthium* sp, *Lycosa* sp *Achaearanea tepidariorum* and *Loxosceles reclusa;*

Pests from the Phylum Nematoda, for example, plant parasitic nematodes such as root-knot nematodes, *Meloidogyne* spp. such as *M. hapla, M. incognita, M. javanica;* cyst-forming nematodes, *Globodera* spp. such as *G. rostochiensis; Heterodera* spp. such as *H. avenae, H. glycines, H. schachtii, H. trifolii;* Seed gall nematodes, *Anguina* spp.; Stem and foliar nematodes, *Aphelenchoides* spp. such as *A. besseyi;* Sting nematodes, *Belonolaimus* spp. such as *B. longicaudatus;* Pine nematodes, *Bursaphelenchus* spp. such as *B. lignicolus, B. xylophilus*; Ring nematodes, *Criconema* spp., *Criconemella* spp. such as *C. xenoplax* and *C. ornata*, and, *Criconemoides* spp. such as *Criconemoides informis; Mesocriconema* spp.; Stem and bulb nematodes, *Ditylenchus* spp. such as *D. destructor, D. dipsaci*; Awl nematodes, *Dolichodorus* spp.; Spiral nematodes, *Heliocotylenchus multicinctus*; Sheath and sheathoid nematodes, *Hemicycliophora* spp. and *Hemicriconemoides* spp.; *Hirshmanniella* spp.; Lance nematodes, *Hoploaimus* spp.; False rootknot nematodes, *Nacobbus* spp.; Needle nematodes, *Longidorus* spp. such as *L. elongatus*; Lesion nematodes, *Pratylenchus* spp. such as *P. brachyurus, P. neglectus, P. penetrans, P. curvitatus, P. goodep*, Burrowing nematodes, *Radopholus* spp. such as *R. similis; Rhadopholus* spp.; *Rhodopholus* spp.; Reniform nematodes, *Rotylenchus* spp. such as *R. robustus, R. reniformis, Scutellonema* spp.; Stubby-root nematode, *Trichodorus* spp. such as *T. obtusus, T. primitivus; Paratrichodorus* spp. such as *P. minor*; Stunt nematodes, *Tylenchorhynchus* spp. such as *T. claytoni, T. dubius*; Citrus nematodes, *Tylenchulus* spp. such as *T. semipenetrans*; Dagger nematodes, *Xiphinema* spp.; and other plant parasitic nematode species;

Insects from the order Isoptera for example *Calotermes flavicollis, Coptotermes* spp. such as *C. formosanus, C. gestroi, C. acinaciformis; Cornitermes cumulans, Cryptotermes* spp. such as *C. brevis, C. cavifrons; Globitermes sulfureus, Heterotermes* spp. such as *H. aureus, H. longiceps, H. tenuis; Leucotermes flavipes, Odontotermes* spp., *Incisitermes* spp. such as *I. minor, I. Snyder, Marginitermes hubbardi, Mastotermes* spp. such as *M. darwiniensis Neocapritermes* spp. such as *N. opacus, N. parvus; Neotermes* spp., *Procornitermes* spp., *Zootermopsis* spp. such as *Z. angusticollis, Z. nevadensis, Reticulitermes* spp. such as *R. hesperus, R. tibialis, R. speratus, R. flavipes, R. grassei, R. lucifugus, R. santonensis, R. virginicus; Termes natalensis*, Insects from the order Blattaria for example *Blatta* spp. such as *B. orientalis, B. lateralis; Blattella* spp. such as *B. asahinae, B. germanica; Leucophaea maderae, Panchlora nivea, Periplaneta* spp. such as *P. americana, P. australasiae, P. brunnea, P. fulligginosa, P. japonica; Supella longipapa, Parcoblatta pennsylvanica, Eurycotis floridana, Pycnoscelus surinamensis*, Insects from the order Siphonoptera for example *Cediopsylla simples, Ceratophyllus* spp., *Ctenocephalides* spp. such as *C. fells, C. canis, Xenopsylla cheopis, Pulex irritans, Trichodectes canis, Tunga penetrans*, and *Nosopsyllus fasciatus*, Insects from the order Thysanura for example *Lepisma saccharin, Ctenolepisma urban*, and *Thermobia domestica*, Pests from the class Chilopoda for example *Geophilus* spp., *Scutigera* spp. such as *Scutigera coleoptrata;*

Pests from the class Diplopoda for example *Blaniulus guttulatus, Julus* spp., *Narceus* spp., Pests from the class Symphyla for example *Scutigerella immaculata*, Insects from the order Dermaptera, for example *Forficula auricularia*, Insects from the order Collembola, for example *Onychiurus* spp., such as *Onychiurus armatus*, Pests from the order Isopoda for example, *Armadillidium vulgare, Oniscus asellus, Porcellio scaber,*

Insects from the order Phthiraptera, for example *Damalinia* spp., *Pediculus* spp. such as *Pediculus humanus capitis, Pediculus humanus corporis, Pediculus humanus humanus, Pthirus pubis, Haematopinus* spp. such as *Haematopinus eurysternus, Haematopinus suis;*

*Linognathus* spp. such as *Linognathus vituli; Bovicola bovis, Menopon gallinae, Menacanthus stramineus* and *Solenopotes capillatus, Trichodectes* spp., Examples of further pest species which may be controlled by compounds of formula (I) include: from the Phylum Mollusca, class Bivalvia, for example, *Dreissena* spp.; class Gastropoda, for example, *Arion* spp., *Biomphalaria* spp., *Bulinus* spp., *Deroceras* spp., *Galba* spp., *Lymnaea* spp., *Oncomelania* spp., *Pomacea canaliclata, Succinea* spp.; from the class of the helminths, for example, *Ancylostoma duodenale, Ancylostoma ceylanicum, Acylostoma braziliensis, Ancylostoma* spp., *Ascaris lumbricoides, Ascaris* spp., *Brugia malap, Brugia timon, Bunostomum* spp., *Chabertia* spp., *Cionorchis* spp., *Cooperia* spp., *Dicrocoelium* spp., *Dictyocaulus filaria, Diphyllobothrium latum, Dracunculus medinensis, Echinococcus granulosus, Echinococcus multilocularis, Enterobius vermicularis, Faciola* spp., *Haemonchus* spp. such as *Haemonchus contortus, Heterakis* spp., *Hymenolepis nana, Hyostrongulus* spp., *Loa Loa, Nematodirus* spp., *Oesophagostomum* spp., *Opisthorchis* spp., *Onchocerca volvulus, Ostertagia* spp., *Paragonimus* spp., *ScNstosomen* spp., *Strongyloides fuelleborni, Strongyloides stercora lis, Stronyloides* spp., *Taenia saginata, Taenia solium, Trichinella spiralis, Trichinella nativa, Trichinella britow, Trichinella nelsoni, Trichinella pseudopsiralis, Trichostrongulus* spp., *Trichuris trichiura, Wuchereria bancrofti.*

In one embodiment, the pests are nematodes.

In one embodiment, the nematodes are *Meloidogyne* sp. such as *M. hapla, M. incognita, M. javanica*; cyst-forming nematodes, *Globodera* sp. such as *G. rostochiensis, Heterodera* sp. such as *H. avenae, H. glycines, H. schachtil, H. trifolii*; or seed gall nematodes, such as *Anguina* spp. In another embodiment, the nematodes are *Meloidogyne* sp., *Heterodera* sp., or *Globodera* sp. In yet another embodiment, the nematodes are *Meloidogyne* sp. In yet another embodiment, the nematodes are *Heterodera* sp. In yet another embodiment, the nematodes are *Globodera* sp. In yet another embodiment, the nematodes are *Meloidogyne incognita, Meloidogyne acrita*, or *Heterodera glycines*.

In one embodiment, the method is applied for controlling pests whereas the pests are nematodes selected from the group consisting of *Meloidogyne* spp., *Heterodera* spp., *Pratylenchus* spp., *Longidorus* spp., *Belonolaimus* spp. and *Globodera* spp.

The pesticidal compostions are effective through both contact and ingestion. Furthermore, the compounds of the present invention can be applied to any and all developmental stages, such as egg, larva, pupa, and adult.

The compounds and mixtures of the present invention can be applied as such or in form of compositions comprising them as defined above. In one embodiment, the agrochemical composition comprises at least one auxiliary and a pesticidal mixture as defined above. Furthermore, the compounds of the present invention can be applied together with a mixing partner as defined above or in form of compositions comprising said mixtures as defined above. The components of said mixture can be applied simultaneously, that is jointly or separately, or in succession, that is immediately one after another and thereby creating the mixture "in situ" on the desired location, e.g. the plant, the sequence, in the case of separate application, generally not having any effect on the result of the control measures. In one embodiment, the pesticidal mixture is applied simultaneously, that is jointly or separately, or in succession.

The application can be carried out both before and after the infestation of the crops, plants, plant propagation materials, such as seeds, soil, or the area, material or environment by the pests.

Suitable application methods include inter alia soil treatment, seed treatment, in furrow application, and foliar application. Soil treatment methods include drenching the soil, drip irrigation (drip application onto the soil), dipping roots, tubers or bulbs, or soil injection. Seed treatment techniques include seed dressing, seed coating, seed dusting, seed soaking, and seed pelleting. In furrow applications typically include the steps of making a furrow in cultivated land, seeding the furrow with seeds, applying the pesticidally active compound to the furrow, and closing the furrow. Foliar application refers to the application of the pesticidally active compound to plant foliage, e.g. through spray equipment. For foliar applications, it can be advantageous to modify the behavior of the pests by use of pheromones in combination with the compounds of the present invention. Suitable pheromones for specific crops and pests are known to a skilled person and publicly available from databases of pheromones and semiochemicals, such as http://www.pherobase.com.

As used herein, the term "contacting" includes both direct contact (applying the pesticidal mixtures/compositions directly on the animal pest or plant—typically to the foliage, stem or roots of the plant) and indirect contact (applying the pesticidal mixtures/compositions to the locus, i.e. habitat, breeding ground, plant, seed, soil, area, material or environment in which a pest is growing or may grow, of the animal pest or plant).

The term "animal pest" includes arthropods, gastropods, and nematodes. Preferred animal pests according to the invention are arthropods and nematodes, preferably insects and nematodes, in particular nematodes.

The term "crop" refers to both, growing and harvested crops.

The term "plant" includes cereals, e.g. durum and other wheat, rye, barley, triticale, oats, rice, or maize (fodder maize and sugar maize/sweet and field corn); beet, e.g. sugar beet or fodder beet; fruits, such as pomes, stone fruits or soft fruits, e.g. apples, pears, plums, peaches, nectarines, almonds, cherries, papayas, strawberries, raspberries, blackberries or gooseberries; leguminous plants, such as beans, lentils, peas, alfalfa or soybeans; oil plants, such as rapeseed (oilseed rape), turnip rape, mustard, olives, sunflowers, coconut, cocoa beans, castor oil plants, oil palms, ground nuts or soybeans; cucurbits, such as squashes, pumpkins, cucumber or melons; fiber plants, such as cotton, flax, hemp or jute; citrus fruit, such as oranges, lemons, grapefruits or mandarins; vegetables, such as eggplant, spinach, lettuce (e.g. iceberg lettuce), chicory, cabbage, asparagus, cabbages, carrots, onions, garlic, leeks, tomatoes, potatoes, cucurbits or sweet peppers; lauraceous plants, such as avocados, cinnamon or camphor; energy and raw material plants, such as corn, soybean, rapeseed, sugar cane or oil palm; tobacco; nuts, e.g. walnuts; pistachios; coffee; tea; bananas; vines (table grapes and grape juice grape vines); hop; sweet leaf (also called *Stevia*); natural rubber plants or ornamental and forestry plants, such as flowers (e.g. carnation, petunias, geranium/pelargoniums, pansies and *impatiens*), shrubs, broad-leaved trees (e.g. poplar) or evergreens, e.g. conifers; *eucalyptus*; turf; lawn; grass such as grass for animal feed or ornamental uses. Preferred plants include potatoes sugar beets, tobacco, wheat, rye, barley, oats, rice, corn, cotton, soybeans, rapeseed, legumes, sunflowers, coffee or sugar cane; fruits; vines; ornamentals; or vegetables, such as cucumbers, tomatoes, beans or squashes.

In one embodiment, plants are wheat, maize, barley, oat, rye, rice, soybean, cotton, sugar beet, rapeseed, and potato. In another embodiment, plants are cotton, soybean, and corn. In another embodiment, plants are cotton, and soybean.

In one embodiment, plants are selected from the group consisting of corn, soybean, cotton, wheat, barley, and canola. In one embodiment, plants are selected from the group consisting of carrot, cucurbit, eggplant, melon, onion, garlic, pepper, potatoa, sweet potatoe and tomato. In one embodiment, plants are selected from the group consisting of coffee, peanut, groundnuts, sugar cane, sunflower, tobacco and sugar beet. In one embodiment, plants are selected from the group consisting of banana, citrus, grape, strawberry, almond, pome fruit, and stone fruit.

In one embodiment, the pesticidal mixture is applied to plants or their propagation material selected from the group consisting of agicultural, silvicultural and horticultural plants, each its natural or genetically modified form.

The term "plant" is to be understood as including wild type plants and plants, which have been modified by either conventional breeding, or mutagenesis or genetic engineering, or by a combination thereof.

Plants, which have been modified by mutagenesis or genetic engineering, and are of particular commercial importance, include alfalfa, rapeseed (e.g. oilseed rape), bean, carnation, chicory, cotton, eggplant, *eucalyptus*, flax, lentil, maize, melon, *papaya, petunia*, plum, poplar, potato, rice, soybean, squash, sugar beet, sugarcane, sunflower, sweet pepper, tobacco, tomato, and cereals (e.g. wheat), in particular maize, soybean, cotton, wheat, and rice. In plants, which have been modified by mutagenesis or genetic engineering, one or more genes have been mutagenized or integrated into the genetic material of the plant. The one or more mutagenized or integrated genes are preferably selected from pat, epsps, cry1Ab, bar, cry1Fa2, cry1Ac, cry34Ab1, cry35AB1, cry3A, cryF, cry1F, mcry3a, cry2Ab2, cry3Bb1, cry1A.105, dfr, barnase, vip3Aa20, barstar, als, bxn, bp40, asn1, and ppo5. The mutagenesis or integration of the one or more genes is performed in order to improve certain properties of the plant. Such properties, also known as traits, include abiotic stress tolerance, altered growth/yield, disease resistance, herbicide tolerance, insect resistance, modified product quality, and pollination control. Of these properties, herbicide tolerance, e.g. imidazolinone tolerance, glyphosate tolerance, or glufosinate tolerance, is of particular importance. Several plants have been rendered tolerant to herbicides by mutagenesis, for example Clearfield® oilseed rape being tolerant to imidazolinones, e.g. imazamox. Alternatively, genetic engineering methods have been used to render plants, such as soybean, cotton, corn, beets and oil seed rape, tolerant to herbicides, such as glyphosate and glufosinate, some of which are commercially available under the trade names RoundupReady® (glyphosate) and LibertyLink® (glufosinate). Furthermore, insect resistance is of importance, in particular lepidopteran insect resistance and coleopteran insect resistance. Insect resistance is typically achieved by modifying plants by integrating cry and/or vip genes, which were isolated from *Bacillus thuringiensis* (Bt), and code for the respective Bt toxins. Genetically modified plants with insect resistance are commercially available under the trade names including WideStrike®, Bollgard®, Agrisure®, Herculex®, YieldGard®, Genuity®, and Intacta®. Plants may be modified by mutagenesis or genetic engineering either in terms of one property (singular traits) or in terms of a combination of properties (stacked traits). Stacked traits, e.g. the combination of herbicide tolerance and insect resistance, are of increasing importance. In general, all relevant modified plants in connection with singular or stacked traits as well as detailed information as to the mutagenized or integrated genes and the respective events are available from websites of the organizations "International Service for the Acquisition of Agri-biotech Applications (ISAAA)" (http://www.isaaa.org/gmapprovaldatabase) and "Center for Environmental Risk Assessment (CERA)" (http://cera-gmc.org/GMCropDatabase).

It has surprisingly been found that the pesticidal activity of the compounds of the present invention may be enhanced by the insecticidal trait of a modified plant. Furthermore, it has been found that the compounds of the present invention are suitable for preventing insects to become resistant to the insecticidal trait or for combating pests, which already have become resistant to the insecticidal trait of a modified plant. Moreover, the compounds of the present invention are suitable for combating pests, against which the insecticidal trait is not effective, so that a complementary insecticidal activity can advantageously be used.

The term "plant propagation material" refers to all the generative parts of the plant such as seeds and vegetative plant material such as cuttings and tubers (e.g. potatoes), which can be used for the multiplication of the plant. This includes seeds, roots, fruits, tubers, bulbs, rhizomes, shoots, sprouts and other parts of plants. Seedlings and young plants, which are to be transplanted after germination or after emergence from soil, may also be included. These plant propagation materials may be treated prophylactically with a plant protection compound either at or before planting or transplanting.

The term "seed" embraces seeds and plant propagules of all kinds including but not limited to true seeds, seed pieces, suckers, corms, bulbs, fruit, tubers, grains, cuttings, cut shoots and the like, and means in a preferred embodiment true seeds.

The term "active ingredient" relates to substances that are pesticidally active per se, or by admixture of an auxiliary. Active ingredient usually relates to *Bacillus amyloluqefaciens*, cis-jasmone, or component C for the context of the instant invention.

In general, "pesticidally effective amount" means the amount of active ingredient needed to achieve an observable effect on growth, including the effects of necrosis, death, retardation, prevention, and removal, destruction, or otherwise diminishing the occurrence and activity of the target organism. The pesticidally effective amount can vary for the various pesticidal mixtures/compositions used in the invention. A pesticidally effective amount of the pesticidal mixtures will also vary according to the prevailing conditions such as desired pesticidal effect and duration, weather, target species, locus, mode of application, and the like.

In the case of soil treatment, in furrow application or of application to the pests dwelling place or nest, the quantity of active ingredient ranges from 0.0001 to 500 g per 100 m$^2$, preferably from 0.001 to 20 g per 100 m$^2$.

For use in treating crop plants, e.g. by foliar application, the rate of application of the active ingredients of this invention may be in the range of 0.0001 g to 4000 g per hectare, e.g. from 1 g to 2 kg per hectare or from 1 g to 750 g per hectare, desirably from 1 g to 100 g per hectare, more desirably from 10 g to 50 g per hectare, e.g., 10 to 20 g per hectare, 20 to 30 g per hectare, 30 to 40 g per hectare, or 40 to 50 g per hectare.

The compounds of the present invention are particularly suitable for use in the treatment of seeds in order to protect the seeds from insect pests, in particular from soil-living insect pests, and the resulting seedling's roots and shoots against soil pests and foliar insects. The present invention therefore also relates to a method for the protection of seeds from insects, in particular from soil insects, and of the seedling's roots and shoots from insects, in particular from soil and foliar insects, said method comprising treating the seeds before sowing and/or after pregermination with a compound of the present invention. The protection of the seedling's roots and shoots is preferred. More preferred is the protection of seedling's shoots from piercing and sucking insects, chewing insects and nematodes.

The term "seed treatment" comprises all suitable seed treatment techniques known in the art, such as seed dressing, seed coating, seed dusting, seed soaking, seed pelleting, and in-furrow application methods. Preferably, the seed treatment application of the active compound is carried out by spraying or by dusting the seeds before sowing of the plants and before emergence of the plants.

The present invention also comprises seeds coated with or containing the active compound. Usually, the seeds are coated with the active compounds. The term "coated with and/or containing" generally signifies that the active ingredient is for the most part on the surface of the propagation product at the time of application, although a greater or lesser part of the ingredient may penetrate into the propagation product, depending on the method of application. When the said propagation product is (re)planted, it may absorb the active ingredient.

Suitable seed is for example seed of cereals, root crops, oil crops, vegetables, spices, ornamentals, for example seed of durum and other wheat, barley, oats, rye, maize (fodder maize and sugar maize/sweet and field corn), soybeans, oil crops, crucifers, cotton, sunflowers, bananas, rice, oilseed rape, turnip rape, sugarbeet, fodder beet, eggplants, potatoes, grass, lawn, turf, fodder grass, tomatoes, leeks, pumpkin/squash, cabbage, iceberg lettuce, pepper, cucumbers, melons, *Brassica* species, melons, beans, peas, garlic, onions, carrots, tuberous plants such as potatoes, sugar cane, tobacco, grapes, petunias, geranium/pelargoniums, pansies and impatiens.

In addition, the active compound may also be used for the treatment of seeds from plants, which have been modified by mutagenisis or genetic engineering, and which e.g. tolerate the action of herbicides or fungicides or insecticides. Such modified plants have been described in detail above.

Conventional seed treatment formulations include for example flowable concentrates FS, solutions LS, suspoemulsions (SE), powders for dry treatment DS, water dispersible powders for slurry treatment WS, water-soluble powders SS and emulsion ES and EC and gel formulation GF. These formulations can be applied to the seed diluted or undiluted. Application to the seeds is carried out before sowing, either directly on the seeds or after having pregerminated the latter. Preferably, the formulations are applied such that germination is not included.

The active substance concentrations in ready-to-use formulations, which may be obtained after two-to-tenfold dilution, are preferably from 0.01 to 60% by weight, more preferably from 0.1 to 40% by weight.

In a preferred embodiment a FS formulation is used for seed treatment. Typically, a FS formulation may comprise 1-800 g/l of active ingredient, 1-200 g/l Surfactant, 0 to 200 g/l antifreezing agent, 0 to 400 g/l of binder, 0 to 200 g/l of a pigment and up to 1 liter of a solvent, preferably water.

Especially preferred FS formulations of the compounds of the present invention for seed treatment usually comprise from 0.1 to 80% by weight (1 to 800 g/l) of the active ingredient, from 0.1 to 20% by weight (1 to 200 g/l) of at least one surfactant, e.g. 0.05 to 5% by weight of a wetter and from 0.5 to 15% by weight of a dispersing agent, up to 20% by weight, e.g. from 5 to 20% of an anti-freeze agent, from 0 to 15% by weight, e.g. 1 to 15% by weight of a pigment and/or a dye, from 0 to 40% by weight, e.g. 1 to 40% by weight of a binder (sticker/adhesion agent), optionally up to 5% by weight, e.g. from 0.1 to 5% by weight of a thickener, optionally from 0.1 to 2% of an anti-foam agent, and optionally a preservative such as a biocide, antioxidant or the like, e.g. in an amount from 0.01 to 1% by weight and a filler/vehicle up to 100% by weight.

In the treatment of seed, the application rates of the active ingredients of the pesticidal compostions of the invention are generally from 0.1 g to 10 kg per 100 kg of seed, preferably from 1 g to 5 kg per 100 kg of seed, more preferably from 1 g to 1000 g per 100 kg of seed, most preferably from 1 g to 200 g per 100 kg of seed, and in particular from 1 g to 100 g per 100 kg of seed, e.g. from 5 g to 50 g per 100 kg of seed.

The invention therefore also relates to plant propagation material, preferably seed, comprising the active ingredients of the pesticidal mixtures of the present invention. The amount of the active ingredients of the present invention will in general vary from 0.1 g to 10 kg per 100 kg of seed, preferably from 1 g to 5 kg per 100 kg of seed, more preferably from 1 g to 1000 g per 100 kg of seed, and in particular from 1 g to 100 g per 100 kg of seed. For specific crops such as lettuce the rate can be higher. In one embodiment, the plant propagation material comprises a pesticidal mixture or an agrochemical composition according to the invention. The compounds of the present invention may also be used for improving the health of a plant. Therefore, the present invention also relates to a method for improving plant health by treating a plant, plant propagation material and/or the locus where the plant is growing or is to grow with an effective and non-phytotoxic amount of a compound of the present invention.

As used herein "an effective and non-phytotoxic amount" means that the compound is used in a quantity which allows to obtain the desired effect but which does not give rise to any phytotoxic symptom on the treated plant or on the plant grown from the treated propagule or treated soil. The terms "plant" and "plant propagation material" are defined above.

"Plant health" is defined as a condition of the plant and/or its products which is determined by several aspects alone or in combination with each other such as yield (for example increased biomass and/or increased content of valuable ingredients), quality (for example improved content or composition of certain ingredients or shelf life), plant vigour (for example improved plant growth and/or greener leaves ("greening effect")), tolerance to abiotic (for example drought) and/or biotic stress (for example disease) and production efficiency (for example, harvesting efficiency, processability).

The above identified indicators for the health condition of a plant may be interdependent and may result from each other. Each indicator is defined in the art and can be determined by methods known to a skilled person.

The compounds of the invention are also suitable for use against non-crop insect pests. For use against said non-crop pests, the pesticidal mixtures of the present invention can be used as bait composition, gel, general insect spray, aerosol, as ultra-low volume application and bed net (impregnated or surface applied). Furthermore, drenching and rodding methods can be used. As used herein, the term "non-crop insect pest" refers to pests, which are particularly relevant for non-crop targets, such as ants, termites, wasps, flies, ticks, mosquitos, crickets, or cockroaches.

The bait can be a liquid, a solid or a semisolid preparation (e.g. a gel). The bait employed in the composition is a product, which is sufficiently attractive to incite insects such as ants, termites, wasps, flies, mosquitos, crickets etc. or cockroaches to eat it. The attractiveness can be manipulated by using feeding stimulants or sex pheromones. Food stimulants are chosen, for example, but not exclusively, from animal and/or plant proteins (meat-, fish- or blood meal, insect parts, egg yolk), from fats and oils of animal and/or plant origin, or mono-, oligo- or polyorganosaccharides, especially from sucrose, lactose, fructose, dextrose, glucose, starch, pectin or even molasses or honey. Fresh or decaying parts of fruits, crops, plants, animals, insects or specific parts thereof can also serve as a feeding stimulant. Sex pheromones are known to be more insect specific. Specific pheromones are described in the literature (e.g. http://www.pherobase.com), and are known to those skilled in the art.

For use in bait compositions, the typical content of active ingredient is from 0.001 weight % to 15 weight %, desirably from 0.001 weight % to 5% weight % of active compound.

Formulations of the compounds of the present invention as aerosols (e.g in spray cans), oil sprays or pump sprays are highly suitable for the non-professional user for controlling pests such as flies, fleas, ticks, mosquitos or cockroaches. Aerosol recipes are preferably composed of the active compound, solvents, furthermore auxiliaries such as emulsifiers, perfume oils, if appropriate stabilizers, and, if required, propellants.

The oil spray formulations differ from the aerosol recipes in that no propellants are used. For use in spray compositions, the content of active ingredient is from 0.001 to 80 weights %, preferably from 0.01 to 50 weight % and most preferably from 0.01 to 15 weight %.

The pesticidal mixtures can also be used in mosquito and fumigating coils, smoke cartridges, vaporizer plates or long-term vaporizers and also in moth papers, moth pads or other heat-independent vaporizer systems.

Methods to control infectious diseases transmitted by insects (e.g. malaria, dengue and yellow fever, lymphatic filariasis, and leishmaniasis) with the pesticidal mixtures also comprise treating surfaces of huts and houses, air spraying and impregnation of curtains, tents, clothing items, bed nets, tsetse-fly trap or the like. Insecticidal compositions for application to fibers, fabric, knitgoods, nonwovens, netting material or foils and tarpaulins preferably comprise a mixture including the insecticide, optionally a repellent and at least one binder.

The pesticidal mixtures can be used for protecting wooden materials such as trees, board fences, sleepers, frames, artistic artifacts, etc. and buildings, but also construction materials, furniture, leathers, fibers, vinyl articles, electric wires and cables etc. from ants and/or termites, and for controlling ants and termites from doing harm to crops or human being (e.g. when the pests invade into houses and public facilities).

Customary application rates in the protection of materials are, for example, from 0.001 g to 2000 g or from 0.01 g to 1000 g of active compound per $m^2$ treated material, desirably from 0.1 g to 50 g per $m^2$.

Insecticidal compositions for use in the impregnation of materials typically contain from 0.001 to 95 weight %, preferably from 0.1 to 45 weight %, and more preferably from 1 to 25 weight % of at least one repellent and/or insecticide.

The pesticidal mixture can also be used in storage application. In one embodiment of the invention, the pesticidal mixture can be applied to seed in a storage facility or air tight storage vessels. In another embodiment of the invention, the pesticidal mixture can be applied by treating the seed with *Bacillus amyloliquefaciens* ssp. *plantarum* strain MBI600 and by volatilizing cis-jasmone into the headspace of a storage facility or air tight storage vessels. The volatilization process of cis-jasmone can be carried out by placing an open container of cis-jasmone into the storages, thermofogging, micro-encapsulation release device, aspirator, or any device that generates cis-jasmone.

The following examples illustrate the invention.

To establish, whether a synergistic effect is present, the expected efficacy has to be calculated and compared to the observed efficacy of the mixture according to the invention.

Synergism can be described as an interaction where the combined effect of two or more compounds is greater than the sum of the individual effects of each of the compounds. The presence of a synergistic effect in terms of percent control, between two mixing partners (X and Y) can be calculated using the Colby equation (Colby, S. R., 1967, Calculating Synergistic and Antagonistic Responses in Herbicide Combinations, *Weeds*, 15, 20-22):

$$E = X + Y - \frac{XY}{100}$$

X=Observed efficacy (in % of Untreated Control) of compound 1

Y=Observed efficacy (in % of Untreated Control) of compound 2

E=Calculated (i.e. expected) efficacy (in % of Untreated Control)

When the observed efficacy (%) is greater than the calculated efficacy (E) according to Colby (%), then the combined effect is synergistic.

The following tests demonstrate the control efficacy of the pesticidal mixtures on specific pests. However, the pest control protection afforded by the pesticidal mixtures is not limited to these species. The analysis of synergism or antagonism between the mixtures or mixtures was determined using Colby's equation.

EXAMPLE 1

For evaluating control of root knot nematodes (*Meloidogyne incognita/acrita*) in cotton, cotton seeds (variety PhytoGen PHY 499 WRF) were treated with cis-jasmone, MBI600 (*Bacillus amyloliquefaciens* ssp. *plantarum* MBI600), or a mixture thereof.

Seeds were placed in a plastic cup and the compounds, or the mixture thereof, was dosed on the seeds with an application rate of 0.2 g of cis-jasmone per 100 kg of seeds, and $1*10^{11}$ CFU of MBI600 per 100 kg of seeds. Seeds were sown in 10×30 ft plots with 4 replicates in root knot nematode infested fields. Harvest yields (pounds/acre) were averaged across the four replicates. Those figures were converted into yields in % of the untreated control.

TABLE 1

Yield improvement against Root Knot Nematode in cotton

| Product/Mix | Application rate per 100 kg of seed | Ratio | Observed efficacy (%) | Calculated efficacy according to Colby (%) |
|---|---|---|---|---|
| Untreated Control | / | / | 0 | / |
| MBI600 | $1*10^{11}$ CFU (equivalent to $1*10^5$ CFU per seed) | / | 10.1 | / |
| Cis-jasmone | 0.2 g ai | / | 47.2 | / |
| MBI600 + Cis-jasmone | $1*10^{11}$ CFU + 0.2 g ai | $5*10^{11}$ CFU: 1 g | 57.7 | 52.5 |

EXAMPLE 2

For evaluating control of soybean cyst nematodes (*Heterodera glycines*) in soybean, soybean seeds (variety Dyna-Gro 39RY43) were treated with cis-jasmone, MBI600 (*Bacillus amyloliquefaciens* ssp. *plantarum* MB1600), or a mixture thereof.

Seeds were placed in a plastic cup and the compounds, or the mixture thereof, was dosed on the seeds with an application rate of 0.2 g of cis-jasmone per 100 kg of seeds, and $1*10^{11}$ CFU of MBI600 per 100 kg of seeds. Seeds were sown in 10×30 ft plots with 4 replicates in root knot nematode infested fields. Harvest yields (bushels/acre) were averaged across the four replicates. Those figures were converted into yields in % of the untreated control.

TABLE 2

Yield improvement against Soybean Cyst Nematode in soybean

| Product/Mix | Application rate per 100 kg of seed | Ratio | Observed efficacy (%) | Calculated efficacy according to Colby (%) |
|---|---|---|---|---|
| Untreated Control | / | / | 0 | / |
| MBI600 | $1*10^{11}$ CFU (equivalent to $1*10^5$ CFU per seed) | / | 4 | / |
| Cis-jasmone | 0.2 g ai | / | 9 | / |
| MBI600 + Cis-jasmone | $1*10^{11}$ CFU + 0.2 g ai | $5*10^{11}$ CFU: 1 g | 25 | 12.6 |

EXAMPLE 3

For evaluating control of root knot nematodes (*Meloidogyne incognita/acrita*) in corn, corn seeds (varieties NG6247MQKZ, NF5334MQKZ and NG4549MQKZ, respectively) were treated with cis-jasmone, MBI600 (*Bacillus amyloliquefaciens* ssp. *plantarum* MBI600), or a mixture thereof. Seeds were placed in a plastic cup and the compounds, or the mixture thereof, was dosed on the seeds with an application rate of 0.2 g of cis-jasmone per 100 kg of seeds, and $1*10^{11}$ CFU of MBI600 per 100 kg of seeds. Seeds were sown in 10×30 ft plots with 4-6 replicates depending on the trial location in root knot nematode infested fields. Harvest yields (bushels/acre) were averaged across the 4-6 replicates. Those figures were converted into yields in % of the untreated control.

TABLE 3

Yield improvement against Root Knot Nematode in corn

| Product/Mix | Application rate per 100 kg of seeds | Ratio | Observed efficacy (%) | Calculated efficacy according to Colby (%) |
|---|---|---|---|---|
| Untreated Control | / | / | 0 | / |
| MBI600 | $1*10^{11}$ CFU (equivalent to $1*10^5$ CFU per seed) | / | 2.0 | / |
| Cis-jasmone | 0.2 g ai | / | 9.2 | / |
| MBI600 + cis-jasmone | $1*10^{11}$ CFU + 0.2 g ai | $5*10^{11}$ CFU: 1 g | 14.1 | 11.0 |

The invention claimed is:

1. A pesticidal mixture comprising, as active components, *Bacillus amyloliquefaciens* ssp. *plantarum* strain MBI600 and cis-jasmone in synergistically effective amounts, wherein the ratio of *Bacillus amyloliquefaciens* ssp. *plantarum* strain MBI600 to cis-jasmone is from $10^{15}$ CFU:1 g to $10^8$ CFU: 1 g.

2. The pesticidal mixture of claim 1, further comprising a component C selected from the following groups:

| M | Insecticides: |
|---|---|
| M.1 | Acetylcholine esterase inhibitors: |
| M.1A | carbamates: aldicarb, alanycarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, trimethacarb, XMC, xylylcarb and triazamate; and |
| M.1B | organophosphates: acephate, azamethiphos, azinphos-ethyl, azinphosmethyl, cadusafos, chlorethoxyfos, chlorfenvinphos, chlormephos, chlorpyrifos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O- (methoxyaminothio-phosphoryl) salicylate, isoxathion, malathion, mecarbam, methamidophos, methidathion, mevinphos, monocrotophos, naled, omethoate, oxydemeton-methyl, parathion, parathion-methyl, phenthoate, phorate, phosalone, phosmet, phosphamidon, phoxim, pirimiphos- methyl, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon and vamidothion; |
| M.2. | GABA-gated chloride channel antagonists: |
| M.2A | cyclodiene organochlorine compounds: endosulfan or chlordane; and |
| M.2B | fiproles: ethiprole, fipronil, flufiprole, pyrafluprole and pyriprole; |
| M.3 | Sodium channel modulators: |
| M.3A | pyrethroids: acrinathrin, allethrin, d-cis-trans allethrin, d-trans allethrin, bifenthrin, bioallethrin, bioallethrin S-cylclopentenyl, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin, deltamethrin, empenthrin, esfenvalerate, etofenprox, fenpropathrin, fenvalerate, flucythrinate, flumethrin, tau-fluvalinate, halfenprox, heptafluthrin, imiprothrin, meperfluthrin, metofluthrin, momfluorothrin, permethrin, phenothrin, prallethrin, profluthrin, pyrethrin (pyrethrum), resmethrin, silafluofen, tefluthrin, tetramethylfluthrin, tetramethrin, tralomethrin, and transfluthrin; and |
| M.3B | sodium channel modulators: DDT, and methoxychlor; |
| M.4 | Nicotinic acetylcholine receptor agonists: |
| M.4A.1 | neonicotinoids: acetamiprid, clothianidin, cycloxaprid, dinotefuran, imidacloprid, nitenpyram, thiacloprid, and thiamethoxam; |
| M.4A.2 | (2E-)-1-[(6-Chloropyridin-3-yl)methyl]-N'-nitro-2-pentylidenehydrazine-carboximidamide; |
| M4.A.3 | 1-[(6-Chloropyridin-3-yl)methyl]-7-methyl-8-nitro-5-propoxy-1,2,3,5,6,7-hexahydroimidazo[1,2-a]pyridine; and |
| M.4B | nicotine; |
| M.5 | Nicotinic acetylcholine receptor allosteric activators from the class of spinosyns: spinosad, and spinetoram; |
| M.6 | Chloride channel activators from the class of avermectins and milbemycins: abamectin, emamectin benzoate, ivermectin, lepimectin, and milbemectin; |
| M.7 | Juvenile hormone mimics: |
| M.7A | juvenile hormone analogues: hydroprene, kinoprene, and methoprene; and |
| M.7B | fenoxycarb, and pyriproxyfen; |
| M.8 | miscellaneous non-specific inhibitors: |
| M.8A | alkyl halides: methyl bromide, and other alkyl halides; and |
| M.8B | chloropicrin, sulfuryl fluoride, borax, and tartar emetic; |
| M.9 | Selective homopteran feeding blockers: pymetrozine, and flonicamid; |
| M.10 | Mite growth inhibitors: clofentezine, hexythiazox, diflovidazin, and etoxazole; |

| M | Insecticides: |
|---|---|
| M.11 | Microbial disruptors of insect midgut membranes: *Bacillus thuringiensis*, *Bacillus sphaericus*, and the insecticdal proteins they produce: *Bacillus thuringiensis* subsp. *israelensis*, *Bacillus sphaericus*, *Bacillus thuringiensis* subsp. *aizawai*, *Bacillus thuringiensis* subsp. *kurstaki* and *Bacillus thuringiensis* subsp. *tenebrionis*, or the Bt crop proteins: Cry1Ab, Cry1Ac, Cry1Fa, Cry2Ab, mCry3A, Cry3Ab, Cry3Bb and Cry34/35Ab1; |
| M.12 | Inhibitors of mitochondrial ATP synthase: |
| M.12A | diafenthiuron, and organotin miticides: azocyclotin, cyhexatin, and fenbutatin oxide; and |
| M.12B | propargite, and tetradifon; |
| M.13 | Uncouplers of oxidative phosphorylation via disruption of the proton gradient: chlorfenapyr, DNOC, and sulfluramid; |
| M.14 | Nicotinic acetylcholine receptor channel blockers: bensultap, cartap hydrochloride, thiocyclam, and thiosultap sodium; |
| M.15 | Inhibitors of the chitin biosynthesis type 0: bistrifluron, chlorfluazuron, diflubenzuron, flucycloxuron, flufenoxuron, hexaflumuron, lufenuron, novaluron, noviflumuron, teflubenzuron, and triflumuron; |
| M.16 | Inhibitors of the chitin biosynthesis type 1: buprofezin; |
| M.17 | Moulting disruptors: cyromazine; |
| M.18 | Ecdyson receptor agonists: methoxyfenozide, tebufenozide, halofenozide, fufenozide or chromafenozide; |
| M.19 | Octopamin receptor agonists: amitraz; |
| M.20 | Mitochondrial complex III electron transport inhibitors: hydramethylnon, acequinocyl, and fluacrypyrim; |
| M.21 | Mitochondrial complex I electron transport inhibitors: |
| M.21A | METI acaricides and insecticides: fenazaquin, fenpyroximate, pyrimidifen, pyridaben, tebufenpyrad, and tolfenpyrad; and |
| M.21B | rotenone; |
| M.22 | Voltage-dependent sodium channel blockers: |
| M.22A | indoxacarb; |
| M.22B | metaflumizone; |
| M.22B.1 | 2-[2-(4-Cyanophenyl)-1-[3-(trifluoromethyl)phenyl]ethybdene]-N-[4-(difluoromethoxy)phenyl]-hydrazinecarboxamide; |
| M.22B.2 | N-(3-Chloro-2-methylphenyl)-2-[(4-chlorophenyl)[4-[methyl(methylsulfonyl)amino]phenyl]methylene]-hydrazinecarboxamide; |
| M.23 | Inhibitors of the of acetyl CoA carboxylase of the class of tetronic and tetramic acid derivatives: spirodiclofen, spiromesifen, and spirotetramat; |
| M.24 | Mitochondrial complex IV electron transport inhibitors: |
| M.24A | phosphorous compounds: aluminium phosphide, calcium phosphide, phosphine, and zinc phosphide; and |
| M.24B | cyanide; |
| M.25 | Mitochondrial complex II electron transport inhibitors from the class of beta-ketonitrile derivatives: cyenopyrafen, and cyflumetofen; |
| M.28 | Ryanodine receptor-modulators from the class of diamides: flubendiamide, chlorantraniliprole (rynaxypyr®), cyantraniliprole (cyazypyr®), tetraniliprole; and the phthalamide compounds; |
| M.28.1 | (R)-3-Chlor-N1-{2-methyl-4-[1,2,2,2-tetrafluor-1-(trifluormethyl)ethyl]phenyl}-N2-(1-methyl-2-methylsulfonylethyl)phthalamid; |
| M.28.2 | (S)-3-Chlor-N1-{2-methyl-4-[1,2,2,2-tetrafluor-1-(trifluormethyl)ethyl]phenyl}-N2-(1-methyl-2-methylsulfonylethyl)phthalamid; |
| M.28.3 | 3-bromo-N-{2-bromo-4-chloro-6-[(1-cyclopropylethyl)carbamoyl]phenyl}-1-(3-chlorpyridin-2-yl)-1H-pyrazole-5-carboxamide (proposed ISO name: cyclaniliprole); |
| M.28.4 | methyl-2-[3,5-dibromo-2-({[3-bromo-1-(3-chlorpyridin-2-yl)-1H-pyrazol-5-yl]carbonyl}amino)benzoyl]-1,2-dimethylhydrazinecarboxylate; |
| M.28.5a | N-[4,6-dichloro-2-[(diethyl-lambda-4-sulfanylidene)carbamoyl]-phenyl]-2-(3-chloro-2-pyridyl)-5-(trifluoromethyl)pyrazole-3-carboxamide; |
| M.28.5b | N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide; |
| M.28.5c | N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide; |
| M.28.5d | N-[4,6-dichloro-2-[(di-2-propyl-lambda-4-sulfanylidene)carbamoyl]-phenyl]-2-(3-chloro-2-pyridyl)-5-(trifluoromethyl)pyrazole-3-carboxamide; |
| M.28.5h | N-[4,6-dibromo-2-[(diethyl-lambda-4-sulfanylidene)carbamoyl]-phenyl]-2-(3-chloro-2-pyridyl)-5-(trifluoromethyl)pyrazole-3-carboxamide; |
| M.28.5i | N-[2-(5-Amino-1,3,4-thiadiazol-2-yl)-4-chloro-6-methylphenyl]-3-bromo-1-(3-chloro-2-pyridinyl)-1H-pyrazole-5-carboxamide; |
| M.28.5j | 3-Chloro-1-(3-chloro-2-pyridinyl)-N-[2,4-dichloro-6-[[(1-cyano-1-methylethyl)amino]carbonyl]phenyl]-1H-pyrazole-5-carboxamide; |
| M.28.5k | 3-Bromo-N-[2,4-dichloro-6-(methylcarbamoyl)phenyl]-1-(3,5-dichloro-2-pyridyl)-1H-pyrazole-5-carboxamide; |
| M.28.5l | N-[4-Chloro-2-[[(1,1-dimethylethyl)amino]carbonyl]-6-methylphenyl]-1-(3-chloro-2-pyridinyl)-3-(fluoromethoxy)-1H-pyrazole-5-carboxamide; and |

-continued

| M | Insecticides: |
|---|---|
| M.28.6: | cyhalodiamide; |
| M.29. | insecticidal active compounds of unknown or uncertain mode of action: afidopyropen, afoxolaner, azadirachtin, amidoflumet, benzoximate, bifenazate, broflanilide, bromopropylate, chinomethionat, cryolite, dicloromezotiaz, dicofol, flufenerim, flometoquin, fluensulfone, fluhexafon, flupyradifurone, fluralaner, metoxadiazone, piperonyl butoxide, pyflubumide, pyridalyl, pyrifluquinazon, sulfoxaflor, tioxazafen, and triflumezopyrim; |
| M.29.3 | 11-(4-chloro-2,6-dimethylphenyl)-12-hydroxy-1,4-dioxa-9-azadispiro[4.2.4.2]-tetradec-11-en-10-one; |
| M.29.4 | 3-(4'-fluoro-2,4-dimethylbiphenyl-3-yl)-4-hydroxy-8-oxa-1-azaspiro[4.5]dec-3-en-2-one; |
| M.29.5 | 1-[2-fluoro-4-methyl-5-[(2,2,2-trifluoroethyl)sulfinyl]phenyl]-3-(trifluoromethyl)-1H[-1,2,4-triazole-5-amine, and actives on basis of *Bacillus firmus* (Votivo, I-1582); and |
| M.29.6a | (E/Z)-N-[1-[(6-chloro-3-pyridyl)methyl]-2-pyridylidene]-2,2,2-trifluoro-acetamide; |
| M.29.6b | (E/Z)-N-[1-[(6-chloro-5-fluoro-3-pyridyl)methyl]-2-pyridylidene]-2,2,2-trifluoro-acetamide; |
| M.29.6c | (E/Z)-2,2,2-trifluoro-N-[1-[(6-fluoro-3-pyridyl)methyl]-2-pyridylidene]acetamide; |
| M.29.6d | (E/Z)-N-[1-[(6-bromo-3-pyridyl)methyl]-2-pyridylidene]-2,2,2-trifluoro-acetamide; |
| M.29.6e | (E/Z)-N-[1-[1-(6-chloro-3-pyridyl)ethyl]-2-pyridylidene]-2,2,2-trifluoro-acetamide; |
| M.29.6f | (E/Z)-N-[1-[(6-chloro-3-pyridyl)methyl]-2-pyridylidene]-2,2-difluoro-acetamide; |
| M.29.6g | (E/Z)-2-chloro-N-[1-[(6-chloro-3-pyridyl)methyl]-2-pyridylidene]-2,2-difluoro-acetamide; |
| M.29.6h | (E/Z)-N-[1-[(2-chloropyrimidin-5-yl)methyl]-2-pyridylidene]-2,2,2-trifluoro-acetamide; |
| M.29.6i | (E/Z)-N-[1-[(6-chloro-3-pyridyl)methyl]-2-pyridylidene]-2,2,3,3,3-pentafluoro-propanamide.); |
| M.29.6j | N-[1-[(6-chloro-3-pyridyl)methyl]-2-pyridylidene]-2,2,2-trifluoro-thioacetamide; and |
| M.29.6k | N-[1-[(6-chloro-3-pyridyl)methyl]-2-pyridylidene]-2,2,2-trifluoro-N'-isopropyl-acetamidine; |
| M.29.8 | fluazaindolizine; |
| M.29.9a | 4-[5-(3,5-dichlorophenyl)-5-(trifluoromethyl)-4H-isoxazol-3-yl]-2-methyl-N-(1-oxothietan-3-yl)benzamide; and |
| M.29.9b | fluxametamide; |
| M.29.10 | 5-[3-[2,6-dichloro-4-(3,3-dichloroallyloxy)phenoxy]propoxy]-1H-pyrazole; |
| M.29.11b | 3-(benzoylmethylamino)-N-[2-bromo-4-[1,2,2,3,3,3-hexafluoro-1-(trifluoromethyl)propyl]-6-(trifluoromethyl)phenyl]-2-fluoro-benzamide; |
| M.29.11c | 3-(benzoylmethylamino)-2-fluoro-N-[2-iodo-4-[1,2,2,2-tetrafluoro-1-(trifluoromethyl)ethyl]-6-(trifluoromethyl)phenyl]-benzamide; |
| M.29.11d | N-[3-[[[2-iodo-4-[1,2,2,2-tetrafluoro-1-(trifluoromethyl)ethyl]-6-(trifluoromethyl)phenyl]amino]carbonyl]phenyl]-N-methyl-benzamide; |
| M.29.11e | N-[3-[[[2-bromo-4-[1,2,2,2-tetrafluoro-1-(trifluoromethyl)ethyl]-6-(trifluoromethyl)phenyl]amino]carbonyl]-2-fluorophenyl]-4-fluoro-N-methyl-benzamide; |
| M.29.11f | 4-fluoro-N-[2-fluoro-3-[[[2-iodo-4-[1,2,2,2-tetrafluoro-1-(trifluoromethyl)-ethyl]-6-(trifluoromethyl)phenyl]amino]carbonyl]phenyl]-N-methyl-benzamide; |
| M.29.11g | 3-fluoro-N-[2-fluoro-3-[[[2-iodo-4-[1,2,2,2-tetrafluoro-1-(trifluoromethyl)-ethyl]-6-(trifluoromethyl)phenyl]amino]carbonyl]phenyl]-N-methyl-benzamide; |
| M.29.11h | 2-chloro-N-[3-[[[2-iodo-4-[1,2,2,2-tetrafluoro-1-(trifluoromethyl)ethyl]-6-(trifluoromethyl)phenyl]amino]carbonyl]phenyl]-3-pyridinecarboxamide; |
| M.29.11i | 4-cyano-N-[2-cyano-5-[[2,6-dibromo-4-[1,2,2,3,3,3-hexafluoro-1-(trifluoromethyl)propyl]phenyl]carbamoyl]phenyl]-2-methyl-benzamide; |
| M.29.11j | 4-cyano-3-[(4-cyano-2-methyl-benzoyl)amino]-N-[2,6-dichloro-4-[1,2,2,3,3,3-hexafluoro-1-(trifluoromethyl)propyl]phenyl]-2-fluoro-benzamide; |
| M.29.11k | N-[5-[[2-chloro-6-cyano-4-[1,2,2,3,3,3-hexafluoro-1-(trifluoromethyl)propyl]-phenyl]carbamoyl]-2-cyano-phenyl]-4-cyano-2-methyl-benzamide; |
| M.29.11l | N-[5-[[2-bromo-6-chloro-4-[2,2,2-trifluoro-1-hydroxy-1-(trifluoromethyl)ethyl]-phenyl]carbamoyl]-2-cyano-phenyl]-4-cyano-2-methyl-benzamide; |
| M.29.11m | N-[5-[[2-bromo-6-chloro-4-[1,2,2,3,3,3-hexafluoro-1-(trifluoromethyl)-propyl]phenyl]carbamoyl]-2-cyano-phenyl]-4-cyano-2-methyl-benzamide; |
| M.29.11n | 4-cyano-N-[2-cyano-5-[[2,6-dichloro-4-[1,2,2,3,3,3-hexafluoro-1-(trifluoromethyl)propyl]phenyl]carbamoyl]phenyl]-2-methyl-benzamide; |
| M.29.11o | 4-cyano-N-[2-cyano-5-[[2,6-dichloro-4-[1,2,2,2-tetrafluoro-1-(trifluoromethyl)ethyl]phenyl]carbamoyl]phenyl]-2-methyl-benzamide; |

-continued

| M | Insecticides: |
|---|---|
| M.29.11p | N-[5-[[2-bromo-6-chloro-4-[1,2,2,2-tetrafluoro-1-(trifluoromethyl)ethyl]phenyl]-carbamoyl]-2-cyano-phenyl]-4-cyano-2-methyl-benzamide; |
| M.29.12a | 2-(1,3-Dioxan-2-yl)-6-[2-(3-pyridinyl)-5-thiazolyl]-pyridine; |
| M.29.12b | 2-[6-[2-(5-Fluoro-3-pyridinyl)-5-thiazolyl]-2-pyridinyl]-pyrimidine; |
| M.29.12c | 2-[6-[2-(3-Pyridinyl)-5-thiazolyl]-2-pyridinyl]-pyrimidine; |
| M.29.12d | N-Methylsulfonyl-6-[2-(3-pyridyl)thiazol-5-yl]pyridine-2-carboxamide; |
| M.29.12e | N-Methylsulfonyl-6-[2-(3-pyridyl)thiazol-5-yl]pyridine-2-carboxamide; |
| M.29.12f | N-Ethyl-N-[4-methyl-2-(3-pyridyl)thiazol-5-yl]-3-methylthio-propanamide; |
| M.29.12g | N-Methyl-N-[4-methyl-2-(3-pyridyl)thiazol-5-yl]-3-methylthio-propanamide; |
| M.29.12h | N,2-Dimethyl-N-[4-methyl-2-(3-pyridyl)thiazol-5-yl]-3-methylthio-propanamide; |
| M.29.12i | N-Ethyl-2-methyl-N-[4-methyl-2-(3-pyridyl)thiazol-5-yl]-3-methylthio-propanamide; |
| M.29.12j | N-[4-Chloro-2-(3-pyridyl)thiazol-5-yl]-N-ethyl-2-methyl-3-methylthio-propanamide; |
| M.29.12k | N-[4-Chloro-2-(3-pyridyl)thiazol-5-yl]-N,2-dimethyl-3-methylthio-propanamide; |
| M.29.12l | N-[4-Chloro-2-(3-pyridyl)thiazol-5-yl]-N-methyl-3-methylthio-propanamide; |
| M.29.12m | N-[4-Chloro-2-(3-pyridyl)thiazol-5-yl]-N-ethyl-3-methylthio-propanamide; or the compounds |
| M.29.14a | 1-[(6-Chloro-3-pyridinyl)methyl]-1,2,3,5,6,7-hexahydro-5-methoxy-7-methyl-8-nitro-imidazo[1,2-a]pyridine; |
| M.29.14b | 1-[(6-Chloropyridin-3-yl)methyl]-7-methyl-8-nitro-1,2,3,5,6,7-hexahydroimidazo[1,2-a]pyridin-5-ol; |
| M.29.16.a | 1-isopropyl-N,5-dimethyl-N-pyridazin-4-yl-pyrazole-4-carboxamide; or |
| M.29.16b | 1-(1,2-dimethylpropyl)-N-ethyl-5-methyl-N-pyridazin-4-yl-pyrazole-4-carboxamide; |
| M.29.16c | N,5-dimethyl-N-pyridazin-4-yl-1-(2,2,2-trifluoro-1-methyl-ethyl)pyrazole-4-carboxamide; |
| M.29.16d | 1-[1-(1-cyanocyclopropyl)ethyl]-N-ethyl-5-methyl-N-pyridazin-4-yl-pyrazole-4-carboxamide; |
| M.29.16e | N-ethyl-1-(2-fluoro-1-methyl-propyl)-5-methyl-N-pyridazin-4-yl-pyrazole-4-carboxamide; |
| M.29.16f | 1-(1,2-dimethylpropyl)-N,5-dimethyl-N-pyridazin-4-yl-pyrazole-4-carboxamide; |
| M.29.16g | 1-[1-(1-cyanocyclopropyl)ethyl]-N,5-dimethyl-N-pyridazin-4-yl-pyrazole-4-carboxamide; |
| M.29.16h | N-methyl-1-(2-fluoro-1-methyl-propyl)-5-methyl-N-pyridazin-4-yl-pyrazole-4-carboxamide; |
| M.29.16i | 1-(4,4-difluorocyclohexyl)-N-ethyl-5-methyl-N-pyridazin-4-yl-pyrazole-4-carboxamide; and |
| M.29.16j | 1-(4,4-difluorocyclohexyl)-N,5-dimethyl-N-pyridazin-4-yl-pyrazole-4-carboxamide; |
| M.29.17a | N-(1-methylethyl)-2-(3-pyridinyl)-2H-indazole-4-carboxamide; |
| M.29.17b | N-cyclopropyl-2-(3-pyridinyl)-2H-indazole-4-carboxamide; |
| M.29.17c | N-cyclohexyl-2-(3-pyridinyl)-2H-indazole-4-carboxamide; |
| M.29.17d | 2-(3-pyridinyl)-N-(2,2,2-trifluoroethyl)-2H-indazole-4-carboxamide; |
| M.29.17e | 2-(3-pyridinyl)-N-[(tetrahydro-2-furanyl)methyl]-2H-indazole-5-carboxamide; |
| M.29.17f | methyl 2-[[2-(3-pyridinyl)-2H-indazol-5-yl]carbonyl]hydrazinecarboxylate; |
| M.29.17g | N-[(2,2-difluorocyclopropyl)methyl]-2-(3-pyridinyl)-2H-indazole-5-carboxamide; |
| M.29.17h | N-(2,2-difluoropropyl)-2-(3-pyridinyl)-2H-indazole-5-carboxamide; |
| M.29.17i | 2-(3-pyridinyl)-N-(2-pyrimidinylmethyl )-2H-indazole-5-carboxamide; and |
| M.29.17j | N-[(5-methyl-2-pyrazinyl)methyl]-2-(3-pyridinyl)-2H-indazole-5-carboxamide; |
| M.29.18a | N-[3-chloro-1-(3-pyridyl)pyrazol-4-yl]-N-ethyl-3-(3,3,3-trifluoropropylsulfanyl)- propanamide; |
| M.29.18b | N-[3-chloro-1-(3-pyridyl)pyrazol-4-yl]-N-ethyl-3-(3,3,3-trifluoropropylsulfinyl)-propanamide; |
| M.29.18c | N-[3-chloro-1-(3-pyridyl)pyrazol-4-yl]-3-[(2,2-difluorocyclopropyl)-methylsulfanyl]-N-ethyl-propanamide; and |
| M.29.18d | N-[3-chloro-1-(3-pyridyl)pyrazol-4-yl]-3-[(2,2-difluorocyclopropyl)-methylsulfinyl]-N-ethyl-propanamide; |
| M.29.19 | sarolaner; |
| M.29.20 | lotilaner; |

| L | Biopesticides: |
|---|---|
| L.1 | Microbial pesticides with fungicidal, bactericidal, viricidal and/or plant defense activator activity: *Ampelomyces quisqualis, Aspergillus flavus,* |

| | |
|---|---|
| L | Biopesticides: |
| | *Aureobasidium pullulans, Bacillus altitudinis, B. megaterium, B. mojavensis, B. mycoides, B. simplex, B. solisalsi, B. subtilis, Candida oleophila, C. saitoana, Clavibacter michiganensis* (bacteriophages), *Coniothyrium minitans, Cryphonectria parasitica, Cryptococcus albidus, Dilophosphora alopecuri, Fusarium oxysporum, Clonostachys rosea* f. *catenulate* (also named *Gliocladium catenulatum*), *Gliocladium roseum, Lysobacter antibioticus, L. enzymogenes, Metschnikowia fructicola, Microdochium dimerum, Microsphaeropsis ochracea, Muscodor albus, Paenibacillus polymyxa, Pantoea vagans, Penicillium bilaiae, Phlebiopsis gigantea, Pseudomonas* sp., *Pseudomonas chloraphis, Pseudozyma flocculosa, Pichia anomala, Pythium oligandrum, Sphaerodes mycoparasitica, Streptomyces griseoviridis, S. lydicus, S. violaceusniger, Talaromyces flavus, T. asperellum, T. atroviride, T. fertile, T. gamsii, T. harmatum, T. harzianum, T. polysporum, T. stromaticum, T. virens, T. viride, Typhula phacorrhiza, Ulocladium oudemansii, Verticillium dahlia*, and zucchini yellow mosaic virus (avirulent strain); |
| L.2 | Biochemical pesticides with fungicidal, bactericidal, viricidal and/or plant defense activator activity: harpin protein, and *Reynoutria sachalinensis* extract; |
| L.3 | Microbial pesticides with insecticidal, acaricidal, molluscidal and/or nematicidal activity: *Agrobacterium radiobacter, Bacillus cereus, B. firmus, B. thuringiensis, B. thuringiensis* ssp. *aizawai*, B. t. ssp. *israelensis*, B. t. ssp. *galleriae*, B. t. ssp. *tenebrionis, Beauveria bassiana, B. brongniartii, Burkholderia* spp., *Chromobacterium subtsugae, Cydia pomonella* granulovirus (CpGV), *Cryptophlebia leucotreta* granulovirus (CrleGV), *Flavobacterium* spp., *Helicoverpa armigera* nucleopolyhedrovirus (HearNPV), *Helicoverpa zea* nucleopolyhedrovirus (HzNPV), *Helicoverpa zea* single capsid nucleopolyhedrovirus (HzSNPV), *Heterorhabditis bacteriophora, Isaria fumosorosea, Lecanicillium longisporum, L. muscarium, Metarhizium anisopliae, Metarhizium anisopliae* var. *anisopliae, M. anisopliae* var. *acridum, Nomuraea rileyi, Paecilomyces fumosoroseus, P. lilacinus, Paenibacillus popilliae, Pasteuria* spp., *P. nishizawae, P. penetrans, P. ramosa, P. thornea, P. usgae, Pseudomonas fluorescens, Spodoptera littoralis* nucleopolyhedrovirus (SpliNPV), *Steinernema carpocapsae, S. feltiae, S. kraussei, Streptomyces galbus*, and *S. microflavus*; |
| L.4 | Biochemical pesticides with insecticidal, acaricidal, molluscidal, pheromone and/or nematicidal activity: L-carvone, citral, (E,Z)-7,9-dodecadien-1-yl acetate, ethyl formate, (E,Z)-2,4-ethyl decadienoate (pear ester), (Z,Z,E)-7,11,13-hexadecatrienal, heptyl butyrate, isopropyl myristate, lavanulyl senecioate, 2-methyl 1-butanol, methyl eugenol, (E,Z)-2,13-octadecadien-1-ol, (E,Z)-2,13-octadecadien-1-ol acetate, (E,Z)-3,13-octadecadien-1-ol, R-1-octen-3-ol, pentatermanone, (E,Z,Z)-3,8,11-tetradecatrienyl acetate, (Z,E)-9,12-tetradecadien-1-yl acetate, Z-7-tetradecen-2-one, Z-9-tetradecen-1-yl acetate, Z-11-tetradecenal, Z-11-tetradecen-1-ol, extract of *Chenopodium ambrosiodes*, Neem oil, and Quillay extract; |
| L.5 | Microbial pesticides with plant stress reducing, plant growth regulator, plant growth promoting and/or yield enhancing activity: *A. lipoferum, A. irakense, A. halopraeferens, B. elkanii, B. liaoningense, B. lupini, Delftia acidovorans, Glomus intraradices, Mesorhizobium* spp., *Rhizobium leguminosarum* bv. *phaseoli*, R. l. bv. *trifolii*, R. l. bv. *viciae, R. tropici*, and *Sinorhizobium meliloti*; |

| | |
|---|---|
| F | Fungicides: |
| F.I | Respiration inhibitors |
| F.I1 | Inhibitors of complex III at $Q_o$ site: azoxystrobin, coumethoxystrobin, coumoxystrobin, dimoxystrobin, enestroburin, fenaminstrobin, fenoxystrobin/flufenoxystrobin, fluoxastrobin, kresoxim-methyl, mandestrobin, metominostrobin, orysastrobin, picoxystrobin, pyraclostrobin, pyrametostrobin, pyraoxystrobin, trifloxystrobin, 2-(2-(3-(2,6-dichlorophenyl)-1-methyl-allylideneaminooxymethyl)-phenyl)-2-methoxyimino-N-methyl-acetamide, pyribencarb, triclopyricarb/chlorodincarb, famoxadone, and fenamidone, methyl-N-[2-[(1,4-dimethyl-5-phenyl-pyrazol-3-yl)oxylmethyl]phenyl]-N-methoxy-carbamate, 1-[3-chloro-2-[[1-(4-chlorophenyl)-1H-pyrazol-3-yl]oxymethyl]phenyl]-4-methyl-tetrazol-5-one, 1-[3-bromo-2-[[1-(4-chlorophenyl)pyrazol-3-yl]oxymethyl]phenyl]-4-methyl-tetrazol-5-one, 1-[2-[[1-(4-chlorophenyl)pyrazol-3-yl]oxymethyl]-3-methyl-phenyl]-4-methyl-tetrazol-5-one, 1-[2-[[l-(4-chlorophenyl)pyrazol-3-yl]oxymethyl]-3-fluoro-phenyl]-4-methyl-tetrazol-5-one, 1-[2-[[1-(2,4-dichlorophenyl)pyrazol-3-yl]oxymethyl]-3-fluoro-phenyl]-4-methyl-tetrazol-5-one, 1-[2-[[4-(4-chlorophenyl)thiazol-2-yl]oxymethyl]-3-methyl-phenyl]-4-methyl-tetrazol-5-one, 1-[3-chloro-2-[[4-(p-tolyl)thiazol-2- |

| F | Fungicides: |
|---|---|
| | yl]oxymethyl]phenyl]-4-methyl-tetrazol-5-one, 1-[3-cyclopropyl-2-[[2-methyl-4-(1-methylpyrazol-3-yl)phenoxy]methyl]phenyl]-4-methyl-tetrazol-5-one, 1-[3-(difluoromethoxy)-2-[[2-methyl-4-(1-methylpyrazol-3-yl)phenoxy]methyl]phenyl]-4-methyl-tetrazol-5-one, 1-methyl-4-[3-methyl-2-[[2-methyl-4-(1-methylpyrazol-3-yl)phenoxy]methyl]phenyl]tetrazol-5-one, 1-methyl-4-[3-methyl-2-[[1-[3-(trifluoromethyl)phenyl]-ethylideneamino]oxy-methyl]phenyl]tetrazol-5-one, (Z,2E)-5-[1-(2,4-dichlorophenyl)pyrazol-3-yl]oxy-2-methoxyimino-N,3-dimethyl-pent-3-enamide, (Z,2E)-5-[1-(4-chlorophenyl)pyrazol-3-yl]oxy-2-methoxyimino-N,3-dimethyl-pent-3-enamide, and (Z,2E)-5-[1-(4-chloro-2-fluoro-phenyl)pyrazol-3-yl]oxy-2-methoxyimino-N,3-dimethyl-pent-3-enamide; |
| F.I2 | Inhibitors of complex III at Qi site: fenpicoxamid, cyazofamid, amisulbrom, [(3S,6S,7R,8R)-8-benzyl-3-[(3-acetoxy-4-methoxy-pyridine-2-carbonyl)amino]-6-methyl-4,9-dioxo-1,5-dioxonan-7-yl] 2-methylpropanoate, [(3S,6S,7R,8R)-8-benzyl-3-[[3-(acetoxymethoxy)-4-methoxy-pyridine-2-carbonyl]amino]-6-methyl-4,9-dioxo-1,5-dioxonan-7-yl] 2-methylpropanoate, [(3S,6S,7R,8R)-8-benzyl-3-[(3-isobut-oxycarbonyloxy-4-methoxy-pyridine-2-carbonyl)amino]-6-methyl-4,9-dioxo-1,5-dioxonan-7-yl] 2-methylpropanoate, [(3S,6S,7R,8R)-8-benzyl-3-[[3-(1,3-benzodioxol-5-ylmethoxy)-4-methoxy-pyridine-2-carbonyl]amino]-6-methyl-4,9-dioxo-1,5-dioxonan-7-yl] 2-methylpropanoate; (3S,6S,7R,8R)-3-[[(3-hydroxy-4-methoxy-2-pyridinyl)carbonyl]amino]-6-methyl-4,9-dioxo-8-(phenylmethyl)-1,5-dioxonan-7-yl 2-methylpropanoate, and (3S,6S,7R,8R)-8-benzyl-3-[3-[(isobutyryloxy)methoxy]-4-methoxypicolinamido]-6-methyl-4,9-dioxo-1,5-dioxonan-7-yl isobutyrate; |
| F.I3 | Inhibitors of complex II: pydiflumetofen, benodanil, benzovindiflupyr, bixafen, boscalid, carboxin, fenfuram, fluopyram, flutolanil, fluxapyroxad, furametpyr, isofetamid, isopyrazam, mepronil, oxycarboxin, penflufen, penthiopyrad, sedaxane, tecloftalam, thifluzamide, N-(4'-trifluoromethylthiobiphenyl-2-yl)-3-difluoromethyl-1-methyl-1H-pyrazole-4-carboxamide, N-(2-(1,3,3-trimethyl-butyl)-phenyl)-1,3-dimethyl-5-fluoro-1H-pyrazole-4-carboxamide, 3-(difluoromethyl)-1-methyl-N-(1,1,3-trimethylindan-4-yl)pyrazole-4-carboxamide, 3-(trifluoromethyl)-1-methyl-N-(1,1,3-trimethylindan-4-yl)pyrazole-4-carboxamide, 1,3-dimethyl-N-(1,1,3-trimethylindan-4-yl)pyrazole-4-carboxamide, 3-(trifluoromethyl)-1,5-dimethyl-N-(1,1,3-trimethylindan-4-yl)pyrazole-4-carboxamide, 1,3,5-trimethyl-N-(1,1,3-trimethylindan-4-yl)pyrazole-4-carboxamide, N-(7-fluoro-1,1,3-trimethyl-indan-4-yl)-1,3-dimethyl-pyrazole-4-carboxamide, and N-[2-(2,4-dichlorophenyl)-2-methoxy-1-methyl-ethyl]-3-(difluoromethyl)-1-methyl-pyrazole-4-carboxamide; |
| F.I4 | Other respiration inhibitors: diflumetorim, (5,8-difluoroquinazolin-4-yl)-{2-[2-fluoro-4-(4-trifluoromethylpyridin-2-yloxy)-phenyl]-ethyl}-amine; nitrophenyl derivates: binapacryl, dinobuton, dinocap, fluazinam, ferimzone; organometal compounds: fentin-acetate, fentin chloride, and fentin hydroxide; ametoctradin; and silthiofam; |
| F.II | Sterol biosynthesis inhibitors: |
| F.II1 | C14 demethylase inhibitors: triazoles: azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, mefentrifluconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole, 1-[rel-(2S;3R)-3-(2-chlorophenyl)-2-(2,4-difluorophenyl)-oxiranylmethyl]-5-thiocyanato-1H-[1,2,4]triazolo, 2-[rel-(2S;3R)-3-(2-chlorophenyl)-2-(2,4-difluorophenyl)-oxiranylmethyl]-2H-[1,2,4]triazole-3-thiol, 2-[2-chloro-4-(4-chlorophenoxy)phenyl]-1-(1,2,4-triazol-1-yl)pentan-2-ol, 1-[4-(4-chlorophenoxy)-2-(trifluoro-methyl)phenyl]-1-cyclopropyl-2-(1,2,4-triazol-1-yl)ethanol, 2-[4-(4-chloro-phenoxy)-2-(trifluoromethyl)phenyl]-1-(1,2,4-triazol-1-yl)butan-2-ol, 2-[2-chloro-4-(4-chlorophenoxy)phenyl]-1-(1,2,4-triazol-1-yl)butan-2-ol, 2-[4-(4-chlorophenoxy)-2-(trifluoromethyl)phenyl]-3-methyl-1-(1,2,4-triazol-1-yl)butan-2-ol, 2-[4-(4-chlorophenoxy)-2-(trifluoromethyl)phenyl]-1-(1,2,4-triazol-1-yl)propan-2-ol, 2-[2-chloro-4-(4-chlorophenoxy)phenyl]-3-methyl-1-(1,2,4-triazol-1-yl)butan-2-ol, 2-[4-(4-chlorophenoxy)-2-(trifluoromethyl)phenyl]-1-(1,2,4-triazol-1-yl)pentan-2-ol, 2-[4-(4-fluorophenoxy)-2-(trifluoromethyl)phenyl]-1-(1,2,4-triazol-1-yl)propan-2-ol, 2-[2-chloro-4-(4-chlorophenoxy)phenyl]-1-(1,2,4-triazol-1-yl)pent-3-yn-2-ol; imidazoles: imazalil, pefurazoate, prochloraz, triflumizol; pyrimidines, pyridines and piperazines: fenarimol, nuarimol, pyrifenox, triforine, and [3-(4-chloro-2-fluoro-phenyl)-5-(2,4-difluorophenyl)isoxazol-4-yl]-(3-pyridyl)methanol; |
| F.II2 | Delta14-reductase inhibitors: aldimorph, dodemorph, dodemorph-acetate, fenpropimorph, tridemorph, fenpropidin, piperalin, and spiroxamine; |

| F | Fungicides: |
|---|---|
| F.II3 | Inhibitors of 3-keto reductase: fenhexamid; |
| F.III | Nucleic acid synthesis inhibitors |
| F.III1 | phenylamides or acyl amino acid fungicides: benalaxyl, benalaxyl-M, kiralaxyl, metalaxyl, metalaxyl-M (mefenoxam), ofurace, and oxadixyl; |
| F.III2 | others: hymexazole, octhilinone, oxolinic acid, bupirimate, 5-fluorocytosine, 5-fluoro-2-(p-tolylmethoxy)pyrimidin-4-amine, and 5-fluoro-2-(4-fluorophenyl-methoxy)pyrimidin-4-amine; |
| F.IV | Inhibitors of cell division and cytoskeleton |
| F.IV1 | tubulin inhibitors from the class of benzimidazoles, and thiophanates: benomyl, carbendazim, fuberidazole, thiabendazole, and thiophanate-methyl; triazolopyrimidines: 5-chloro-7-(4-methylpiperidin-1-yl)-6-(2,4,6-trifluoro-phenyl)-[1,2,4]triazolo[1,5-a]pyrimidine; and |
| F.IV2 | other cell division inhibitors: diethofencarb, ethaboxam, pencycuron, fluopicolide, zoxamide, metrafenone, pyriofenone; |
| F.V | Inhibitors of amino acid and protein synthesis: |
| F.V1 | methionine synthesis inhibitors from the class of anilino-pyrimidines: cyprodinil, mepanipyrim, and pyrimethanil; and |
| F.V2 | protein synthesis inhibitors: blasticidin-S, kasugamycin, kasugamycin hydrochloride-hydrate, mildiomycin, streptomycin, oxytetracyclin, polyoxine, and validamycin A; |
| F.VI | Signal transduction inhibitors: |
| F.VII | MAP/histidine kinase inhibitors: fluoroimid, iprodione, procymidone, vinclozolin, fenpiclonil, and fludioxonil; and |
| F.VI2 | G protein inhibitors: quinoxyfen; |
| F.VII | Lipid and membrane synthesis inhibitors: |
| F.VII1 | Phospholipid biosynthesis inhibitors: edifenphos, iprobenfos, pyrazophos, isoprothiolane; |
| F.VII2 | lipid peroxidation: dicloran, quintozene, tecnazene, tolclofos-methyl, biphenyl, chloroneb, and etridiazole; |
| F.VII3 | phospholipid biosynthesis and cell wall deposition: dimethomorph, flumorph, mandipropamid, pyrimorph, benthiavalicarb, iprovalicarb, valifenalate, and N-(1-(1-(4-cyano-phenyl)ethanesulfonyl)-but-2-yl) carbamic acid-(4-fluorophenyl) ester; |
| F.VII4 | compounds affecting cell membrane permeability and fatty acides: propamocarb; and |
| F.VII5 | fatty acid amide hydrolase inhibitors: oxathiapiprolin, 2-{3-[2-(1-{[3,5-bis(difluoromethyl-1H-pyrazol-1-yl]acetyl}piperidin-4-yl)-1,3-thiazol-4-yl]-4,5-dihydro-1,2-oxazol-5-yl}phenyl methanesulfonate, 2-{3-[2-(1-{[3,5-bis(difluoromethyl)-1H-pyrazol-1-yl]acetyl}piperidin-4-yl), and 1,3-thiazol-4-yl]-4,5-dihydro-1,2-oxazol-5-yl}-3-chlorophenyl methanesulfonate; |
| F.VIII | Inhibitors with Multi Site Action: |
| F.VIII1 | inorganic active substances: Bordeaux mixture, copper acetate, copper hydroxide, copper oxychloride, basic copper sulfate, and sulfur; |
| F.VIII2 | thio- and dithiocarbamates: ferbam, mancozeb, maneb, metam, metiram, propineb, thiram, zineb, and ziram; |
| F.VIII3 | organochlorine compounds from the class of phthabmides, sulfamides, and chloronitriles: anilazine, chlorothalonil, captafol, captan, folpet, dichlofluanid, dichlorophen, hexachlorobenzene, pentachlorphenole and its salts, phthalide, tolylfluanid, and N-(4-chloro-2-nitro-phenyl)-N-ethyl-4-methyl-benzenesulfonamide; and |
| F.VIII4 | guanidines and others: guanidine, dodine, dodine free base, guazatine, guazatine-acetate, iminoctadine, iminoctadine-triacetate, iminoctadine-tris(albesilate), dithianon, and 2,6-dimethyl-1H,5H-[1,4]dithiino[2,3-c:5,6-c']dipyrrole-1,3,5,7(2H,6H)-tetraone; |
| F.IX | Cell wall synthesis inhibitors: |
| F.IX1 | inhibitors of glucan synthesis: validamycin, and polyoxin B; |
| F.IX2 | melanin synthesis inhibitors: pyroquilon, tricyclazole, carpropamid, dicyclomet, and fenoxanil; |
| F.X | Plant defence inducers: |
| F.X1 | acibenzolar-S-methyl, probenazole, isotianil, tiadinil, prohexadione-calcium; |
| F.X2 | phosphonates: fosetyl, fosetyl-aluminum, phosphorous acid and its salts; potassium or sodium bicarbonate; and |
| F.XI | Unknown mode of action: bronopol, chinomethionat, cyflufenamid, cymoxanil, dazomet, debacarb, diclomezine, difenzoquat, difenzoquat-methylsulfate, diphenylamin, fenpyrazamine, flumetover, flusulfamide, flutianil, methasulfocarb, nitrapyrin, nitrothal-isopropyl, oxathiapiprolin, tolprocarb, oxin-copper, proquinazid, tebufloquin, tecloftalam, triazoxide, 2-butoxy-6-iodo-3-propylchromen-4-one, 2-[3,5-bis(difluoromethyl)-1H-pyrazol-1-yl]-1-[4-(4-{5-[2-(prop-2-yn-1-yloxy)phenyl]-4,5-dihydro-1,2-oxazol-3-yl}-1,3-thiazol-2-yl)piperidin-1-yl]ethanone, 2-[3,5-bis(difluoromethyl)-1H-pyrazol-1-yl]-1-[4-(4-{5-[2-fluoro-6-(prop-2-yn-1-yloxy)phenyl]-4,5-dihydro-1,2-oxazol-3-yl}-1,3-thiazol-2-yl)piperidin-1-yl]ethanone, 2-[3,5-bis(difluoromethyl)-1H-pyrazol-1-yl]-1-[4-(4-{5-[2-chloro-6-(prop-2-yn-1- |

| | |
|---|---|
| F | Fungicides:<br>yloxy)phenyl]-4,5-dihydro-1,2-oxazol-3-yl}-1,3-thiazol-2-yl)piperidin-1-yl]ethanone, N-(cyclopropylmethoxyimino-(6-difluoro-methoxy-2,3-difluoro-phenyl)-methyl)-2-phenyl acetamide, N'-(4-(4-chloro-3-trifluoromethyl-phenoxy)-2,5-dimethyl-phenyl)-N-ethyl-N-methyl formamidine, N'-(4-(4-fluoro-3-trifluoromethyl-phenoxy)-2,5-dimethyl-phenyl)-N-ethyl-N-methyl formamidine, N'-(2-methyl-5-trifluoromethyl-4-(3-trimethylsilanyl-propoxy)-phenyl)-N-ethyl-N-methyl formamidine, N'-(5-difluoromethyl-2-methyl-4-(3-trimethylsilanyl-propoxy)-phenyl)-N-ethyl-N-methyl formamidine, methoxy-acetic acid 6-tert-butyl-8-fluoro-2,3-dimethyl-quinolin-4-yl ester, 3-[5-(4-methylphenyl)-2,3-dimethyl-isoxazolidin-3-yl]-pyridine, 3-[5-(4-chloro-phenyl)-2,3-dimethyl-isoxazolidin-3-yl]-pyridine (pyrisoxazole), N-(6-methoxy-pyridin-3-yl) cyclopropanecarboxylic acid amide, 5-chloro-1-(4,6-dimethoxy-pyrimidin-2-yl)-2-methyl-1H-benzoimidazole, 2-(4-chloro-phenyl)-N-[4-(3,4-dimethoxy-phenyl)-isoxazol-5-yl]-2-prop-2-ynyloxy-acetamide, ethyl (Z)-3-amino-2-cyano-3-phenyl-prop-2-enoate, picarbutrazox, pentyl N-[6-[[(Z)-[(1-methyltetrazol-5-yl)-phenyl-methylene]amino]oxymethyl]-2-pyridyl]carbamate, 2-[2-[(7,8-difluoro-2-methyl-3-quinolyl)oxy]-6-fluoro-phenyl]propan-2-ol, 2-[2-fluoro-6-[(8-fluoro-2-methyl-3-quinolyl)oxy]-phen-yl]propan-2-ol, 3-(5-fluoro-3,3,4,4-tetramethyl-3,4-dihydroiso-quinolin-1-yl)quinoline, 3-(4,4-difluoro-3,3-dimethyl-3,4-dihydroisoquinolin-1-yl)quinoline, 3-(4,4,5-trifluoro-3,3-dimethyl-3,4-dihydroisoquinolin-1-yl)quinoline, and 9-fluoro-2,2-dimethyl-5-(3-quinolyl)-3H-1,4-benzoxazepine. |

3. The pesticidal mixture of claim 2, wherein component C is selected from the group consisting of cyclaniliprole, carbofuran, oxamyl, thiodicarb, fipronil, bifenthrin, cyfluthrin, beta-cyfluthrin, alpha-cypermethrin, tefluthrin, acetamiprid, clothianidin, imidacloprid, thiacloprid, thiamethoxam, abamectin, chlorantraniliprole, cyantraniliprole, tetraniliprole, broflanilide, sulfoxaflor, tioxazafen, triflumezopyrim and the *Bacillus thuringiensis* proteins Cry1Ab, Cry1Ac, Cry1Fa, Cry2Ab, mCry3A, Cry3Ab, Cry3Bb and Cry34/35Ab1.

4. The pesticidal mixture of claim 2, wherein component C is selected from the group consisting of *Bacillus firmus, Pasteuria nishizawae, Pasteuria penetrans, Rhizobium leguminosarum* bv. *phaseoli, Rhizobium leguminosarum* bv. *trifolii, Rhizobium leguminosarum* bv. *viciae, Burkholderia* spp. and *Rhizobium tropici*.

5. The pesticidal mixture of claim 2, wherein component C is selected from the group consisting of azoxystrobin, pyraclostrobin, trifloxystrobin, fluopyram, fluxapyroxad, penflufen, sedaxane, fluazinam, difenoconazole, ipconazole, prothioconazole, tebuconazole, triticonazole, metalaxyl, metalaxyl-M (mefenoxam), mefentrifluconazole, thiabendazole, fludioxonil, benzovindiflupyr, picarbutrazox, ethaboxam, pydiflumetofen, fenpicoxamid, thiophanate-methyl, myclobutanil and oxathiapiprolin.

6. The pesticidal mixture of claim 2, comprising at least two components C.

7. The pesticidal mixture of claim 6, comprising at least two components C selected from the group consisting of thiamethoxam, cyazypyr, rynaxypyr, fludioxonil, metalaxyl-M (mefenoxam), mefentrifluconazole, azoxystrobin, pyraclostrobin, fluxapyroxad, thiabendazole, clothianidine, prothioconazole, penflufen, metalaxyl and imidacloprid.

8. A method for controlling pests, which method comprises the application of the pesticidal mixture of claim 1 to plants, plant propagation material, or the locus of growth of the plants; the pests or their food supply, habitat or breeding grounds.

9. The method of claim 8, wherein the pests are nematodes.

10. The method claim 9, wherein the nematodes are selected from the group consisting of *Meloidogyne* spp., *Heterodera* spp., *Pratylenchus* spp., *Longidorus* spp., *Belonolaimus* spp. and *Globodera* spp.

11. The method of claim 8, wherein the pesticidal mixture is applied to plant propagation material.

12. The method of claim 8, wherein the pesticidal mixture is applied to plants or their propagation material selected from the group consisting of agicultural, silvicultural and horticultural plants, each its natural or genetically modified form.

13. An agrochemical composition comprising at least one auxiliary and the mixture of claim 1.

14. Plant propagation material comprising the pesticidal mixture of claim 1.

15. Plant propagation material treated with the agrochemical composition of claim 13.

\* \* \* \* \*